(12) United States Patent
Foroohar

(10) Patent No.: US 10,121,135 B1
(45) Date of Patent: Nov. 6, 2018

(54) SYSTEMS AND METHODS FOR INTEGRATING AN E-COMMERCE PLATFORM WITH POINT-OF-SALE TECHNOLOGY

(71) Applicant: RELABLD LLC, Chicago, IL (US)

(72) Inventor: Sina Foroohar, Chicago, IL (US)

(73) Assignee: RELABLD LLC, Chicago, IL (US)

( * ) Notice: Subject to any disclaimer, the term of this patent is extended or adjusted under 35 U.S.C. 154(b) by 297 days.

(21) Appl. No.: 15/208,058

(22) Filed: Jul. 12, 2016

Related U.S. Application Data

(60) Provisional application No. 62/191,883, filed on Jul. 13, 2015, provisional application No. 62/191,907, filed on Jul. 13, 2015, provisional application No. 62/191,924, filed on Jul. 13, 2015.

(51) Int. Cl.
  *G06Q 20/20* (2012.01)
  *G06Q 30/06* (2012.01)
(52) U.S. Cl.
  CPC ....... *G06Q 20/202* (2013.01); *G06Q 30/0601* (2013.01)
(58) Field of Classification Search
  CPC .................................................. G06Q 30/00
  USPC ............................................................ 705/21
  See application file for complete search history.

(56) References Cited

U.S. PATENT DOCUMENTS

2013/0006720 A1* 1/2013 Monoyudis ........ G06Q 30/0641
  705/12

\* cited by examiner

*Primary Examiner* — Russell S Glass
(74) *Attorney, Agent, or Firm* — Invention Mine LLC

(57) ABSTRACT

Presently disclosed are systems and methods for integrating an e-commerce platform with point-of-sale technology. In an embodiment, an e-commerce platform receives fashion-article-registration messages that each include an article identifier and a set of article-characteristic data that correspond to the respective wearable fashion article. The e-commerce platform uses the article-characterization data to determine an appraised quantity of platform credit for the corresponding fashion article, and stores that appraised quantity of platform credit in association with the corresponding article identifier. The e-commerce platform receives consumer-query messages from consumer devices, and responsively uses article identifiers from the consumer-query messages to retrieve the respective stored appraised quantities of platform credit for the corresponding fashion articles, and transmits consumer-reply messages to the consumer devices, conveying the retrieved appraised quantities of platform credit for the fashion articles.

20 Claims, 21 Drawing Sheets

SYSTEMS AND METHODS FOR INTEGRATING AN E-COMMERCE PLATFORM WITH POINT-OF-SALE TECHNOLOGY

CROSS-REFERENCE TO RELATED APPLICATIONS

This application claims the benefit of the following three U.S. provisional patent applications, the entire contents of each of which are hereby incorporated herein by reference: (i) U.S. Provisional Patent Application No. 62/191,883, filed Jul. 13, 2015 and entitled "Systems and Methods for Providing an E-Commerce Platform for Credit-Based Appraisals and Exchanges of Wearable Fashion Articles;" (ii) U.S. Provisional Patent Application No. 62/191,907, filed Jul. 13, 2015 and entitled "Systems and Methods for Providing an E-Commerce Platform for Credit-Based Appraisals of Wearable Fashion Articles;" and (iii) U.S. Provisional Patent Application No. 62/191,924, filed Jul. 13, 2015 and entitled "Systems and Methods of Integrating an E-Commerce Platform with Point-of-Sale Technology."

BACKGROUND

Every year, consumers spend billions of dollars to purchase wearable fashion articles, which are also referred to by terms such as fashion items, fashion product (or products), and the like. Some examples of types of wearable fashion articles include clothing, footwear, jewelry, accessories, and the like. With respect to clothing, some example subtypes of wearable fashion articles include shirts, pants, tops, skirts, dresses, suits, and the like. With respect to footwear, some example subtypes of wearable fashion articles include shoes, sandals, boots, and the like. With respect to jewelry, some example subtypes of wearable fashion articles include necklaces, rings, earrings, brooches, pins, and the like. With respect to accessories, some example subtypes of wearable fashion articles include purses, messenger bags, backpacks, and the like. And certainly numerous other examples of types and subtypes of fashion articles could be listed as well.

Many of the transactions by which consumers purchase fashion articles occur at retail locations; such transactions are often referred to as "brick-and-mortar" transactions. It is becoming increasingly common, however, for consumers to purchase fashion articles by engaging in what are often referred to as electronic-commerce (e-commerce) transactions, which are quite often conducted using web browsers and/or other applications (apps) running on what are referred to herein as computing-and-communication devices (CCDs), and indeed are quite often conducted using web browsers and/or other apps running on a certain type of CCD that is referred to herein as a client device. Some example client devices include desktop computers, laptops, tablets, cell phones, smart phones, personal digital assistants (PDAs), and the like.

Consumers typically conduct these e-commerce transactions using their respective client devices (and/or client devices that are available at locations such as coffee shops, Internet cafes, libraries, kiosks, and the like). The electronic data communications that are involved in the conducting of such transactions typically traverse one or more packet-switched data networks such as cellular networks, Wi-Fi networks, the Internet, and the like, and are typically conducted using, among other data-communication protocols, the network-layer (i.e., layer 3 of the Open Systems Interconnected (OSI) reference model (a.k.a. the OSI stack)) protocol known as the Internet Protocol (IP), usually together with a transport-layer (i.e., layer-4) protocol such as the Transmission Control Protocol (TCP) or the User Datagram Protocol (UDP), as examples.

When a consumer purchases a fashion article—whether by way of a brick-and-mortar transaction, an e-commerce transaction, or some other type of transaction, that consumer may or may not be the first consumer to purchase that fashion article (i.e., the first consumer to purchase that fashion article from its original manufacturer, designer, or the like). To wit, the consumer may be the first purchaser of that fashion article, or the consumer may be a subsequent purchaser (e.g., the second purchaser, the third purchaser, the fourth purchaser, etc.) of that fashion article.

Moreover, it is noted that, even in the context of a subsequent purchaser (e.g., a second purchaser that purchases a fashion article from the first purchaser), the corresponding fashion article could still be regarded as new. For example, if a given purse had never been used by its first purchaser, and perhaps even still had the retailer and/or manufacturer tags attached thereto, that purse may still be regarded as new. In other cases of subsequent purchasing, the corresponding fashion article may be considered used. Moreover, even fashion articles that are considered to be used can be in a variety of different conditions: some example condition designations include mint, very good, and good. And certainly numerous other possible condition designations could be used in reference to one or more used (or new) fashion articles.

There are some companies that engage (typically via their respective websites) in e-commerce transactions that involve subsequent purchases of fashion articles: examples include eBay Inc. of San Jose, Calif.; TheRealReal, Inc. of San Francisco, Calif.; Twice of San Francisco, Calif.; Threadflip of San Francisco, Calif.; thredUP Inc. of San Francisco, Calif.; Poshmark, Inc. of Menlo Park, Calif.; Vaunte, Inc. of New York, N.Y.; Tradesy Inc. of Santa Monica, Calif.; Shop Hers, Inc. of Santa Monica, Calif.; Material Wrld, Inc. of New York, N.Y.; Fashion Project of Boston, Mass.; Bib and Tuck, Inc. of New York, N.Y.; Snobswap Inc. of Washington, D.C.; and Vestaire Collective of Paris, France. Moreover, some companies engage in brick-and-mortar reselling of, among other things, fashion articles: examples include Second Time Around of Boston, Mass. and Buffalo Exchange, LTD of Tucson, Ariz. Some companies engage in fashion-related e-commerce with a focus on saving money for the consumer: examples include Rent the Runway, Inc. of New York, N.Y.; Le Tote of San Francisco, Calif.; and Gilt Groupe Holdings, Inc. of New York, N.Y. Some companies engage in business-to-business (B2B) exchanges (i.e., bartering) of goods and services: one example is Bartercard USA Inc. of Charleston, S.C.

OVERVIEW OF CERTAIN DISCLOSED EMBODIMENTS

Presently disclosed are systems and methods for integrating an e-commerce platform with point-of-sale technology.

One embodiment takes the form of a method carried out by an e-commerce platform executing stored program instructions. The method includes receiving fashion-article-registration messages, where each received fashion-article-registration message includes (i) a respective article identifier that corresponds to a respective wearable fashion article and (ii) a respective set of article-characteristic data that also corresponds to the respective wearable fashion article. The method also includes using the respective sets of article-characteristic data to determine respective appraised quantities of platform credit for the corresponding fashion articles. The method also includes storing the respective appraised quantities of platform credit in association with the respective article identifiers. The method also includes receiving consumer-query messages from respective consumer devices, wherein the respective consumer-query messages include respective article identifiers, and responsively (i) using the respective article identifiers from the respective consumer-query messages to retrieve the respective stored appraised quantities of platform credit for the corresponding fashion articles and (ii) transmitting respective consumer-reply messages to the respective consumer devices, where the respective consumer-reply messages include the respective retrieved appraised quantities of platform credit for the corresponding fashion articles.

Another embodiment takes the form of an e-commerce platform that includes a communication interface, a processor, and data storage containing instructions executable by the processor for causing the e-commerce platform to carry out a set of functions, where the set of functions includes the method steps that are recited in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, receiving the fashion-article-registration messages includes receiving the fashion-article-registration messages from respective merchant systems.

In at least one embodiment, one or more of the respective article identifiers are respective bar codes.

In at least one embodiment, one or more of the respective article identifiers are respective Quick Response (QR) codes.

In at least one embodiment, one or more of the respective article identifiers are respective Universal Product Codes (UPCs).

In at least one embodiment, one or more of the respective sets of article-characterization data include one or more of an article-type indication, an article-subtype indication, an article-designer indication, an article-condition indication, an article-size indication, an article-season indication, an article-color indication, an article-material indication, and an article-made-in-location indication.

In at least one embodiment, at least one of the respective consumer devices is a device selected from the group consisting of a cell phone, a smart phone, and a tablet.

In at least one embodiment, at least one of the respective consumer devices is a merchant-provided consumer device; in at least one such embodiment, at least one of the merchant-provided consumer devices is a device selected from the group consisting of a kiosk, a bar-code scanner, a QR-code scanner, a cell phone, a smart phone, and a tablet.

In at least one embodiment, the method further includes receiving a consumer-article-acquisition message that includes (i) a given user-account identifier associated with a given user account and (ii) a given article identifier associated with a given wearable fashion article for which a corresponding appraised quantity of platform credit has been determined and stored by the e commerce platform, and responsively posting a listable article record associated with the given wearable fashion article to the given user account. Such embodiments are referred to for brevity and clarity in the ensuing paragraphs as article-acquisition embodiments.

In at least one article-acquisition embodiment, receiving the consumer-article-acquisition message includes receiving the consumer-article-acquisition message from a merchant retail location. In at least one such article-acquisition embodiment, the given wearable fashion article was presented at the merchant retail location in association with both a monetary price and with the determined corresponding appraised quantity of platform credit. In at least one such article-acquisition embodiment, the given wearable fashion article was further presented at the merchant retail location in association with a post-purchase time period for which the determined corresponding appraised quantity of platform credit is awarded for listing the corresponding fashion article in an online catalog. In at least one such article-acquisition embodiment, a corresponding depreciation schedule was further presented at the merchant retail location in association with the post-purchase time period. In at least one such article-acquisition embodiment, the depreciation schedule was based on one or more of item type, designer, passage of time, and condition change. In at least one other such article-acquisition embodiment, the depreciation schedule presented multiple different depreciation values based on multiple different combinations of passage of time and condition change.

In at least one article-acquisition embodiment, receiving the consumer-article-acquisition message includes receiving the consumer-article-acquisition message from a merchant website. In at least one such article-acquisition embodiment, the merchant website included a listing of the given wearable fashion article in association with both a monetary price and with the determined corresponding appraised quantity of platform credit. In at least one such article-acquisition embodiment, the given wearable fashion article was further presented on the merchant website in association with a post-purchase time period for which the determined corresponding appraised quantity of platform credit is awarded for listing the corresponding fashion article in an online catalog. In at least one such article-acquisition embodiment, a corresponding depreciation scheduled was further presented on the merchant website in association with the post-purchase time period. In at least one such article-acquisition embodiment, the depreciation schedule was based on one or more of item type, designer, passage of time, and condition change. In at least one other such article-acquisition embodiment, the depreciation schedule presented multiple different depreciation values based on multiple different combinations of passage of time and condition change.

In at least one article-acquisition embodiment, the method further includes receiving a list-article message associated with the listable article record, and responsively listing the given wearable fashion article in an online catalog as being acquirable for corresponding appraised quantity of platform credit.

In at least one article-acquisition embodiment, receiving the consumer-article-acquisition message includes receiving the consumer-article-acquisition message as a result of a particular form of payment being used to acquire the given wearable fashion article. In at least one such article-acquisition embodiment, the particular form of payment involves a particular payment card. In at least one other such article-acquisition embodiment, the particular form of payment involves a particular payment-facilitation application. In still at least one other such article-acquisition embodiment, the particular form of payment involves a particular payment-facilitation website.

In at least one article-acquisition embodiment, the method further includes receiving a monetary payment associated with the consumer-article-acquisition message. In at least one such article-acquisition embodiment, the consumer-article-acquisition message is associated with an acquisition of the given wearable fashion article at a given monetary price, and the received monetary payment corresponds to a predetermined percentage of the given monetary price.

In at least one embodiment, the method further includes (i) receiving fashion-article-listing requests that are each associated with a respective user account and that each include a respective set of article-characteristic data that corresponds to a respective wearable fashion article, (ii) using the respective sets of article-characteristic data from the fashion-article-listing requests to determine respective appraised quantities of platform credit for the respective corresponding wearable fashion articles, (iii) transmitting fashion-article-listing replies corresponding respectively to the received fashion-article-listing requests, where each transmitted fashion-article-listing reply offers the respective determined appraised quantity of platform credit in exchange for listing the corresponding wearable fashion article in a browseable and searchable online catalog, and (iv) receiving fashion-article-listing acceptances corresponding to at least some of the transmitted fashion-article-listing replies and, for each received fashion-article-listing acceptance, responsively listing the corresponding fashion article in the online catalog as being acquirable for the corresponding appraised quantity of platform credit. In at least one such embodiment, with respect to substantially identical fashion articles, respective appraised quantities of platform credit resulting from received fashion-article-registration messages exceed respective appraised quantities of platform credit resulting from received fashion-article-listing requests.

In at least one embodiment, the respective consumer-reply messages further include respective indications of post-purchase time periods for which the respective retrieved appraised quantities of platform credit are awarded for listing the corresponding fashion articles in an online catalog. In at least one such embodiment, at least one such post-purchase time period has a duration of one week. In at least one such embodiment, at least one such post-purchase time period has a duration of two weeks. In at least one such embodiment, at least one such post-purchase time period has a duration of thirty days. In at least one such embodiment, at least one such post-purchase time period has a duration of one month.

In at least one embodiment, at least one of the respective consumer-reply messages includes a depreciation schedule corresponding to listing the corresponding fashion article in an online catalog. In at least one such embodiment, the depreciation schedule is based on one or more of item type, designer, passage of time, and condition change. In at least one other such embodiment, the depreciation schedule presents multiple different depreciation values based on multiple different combinations of passage of time and condition change.

In at least one embodiment, the respective retrieved appraised quantity of platform credit for at least one fashion article corresponds according to a platform-credit-and-currency exchange rate with a predetermined percentage of a monetary retail price being charged for the corresponding fashion article.

It should be understood that the above-listed overview of disclosed embodiments is meant to be illustrative and is not meant to be exhaustive, comprehensive, or otherwise limiting. Those of skill in the relevant art will understand this and will further understand that variations and modifications of the above-listed embodiments, and indeed of any of the disclosed embodiments, can be made without departing from the spirit or scope of the present disclosure.

Moreover, before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in the below detailed description of the drawings.

DETAILED DESCRIPTION OF THE DRAWINGS

Figure 1:
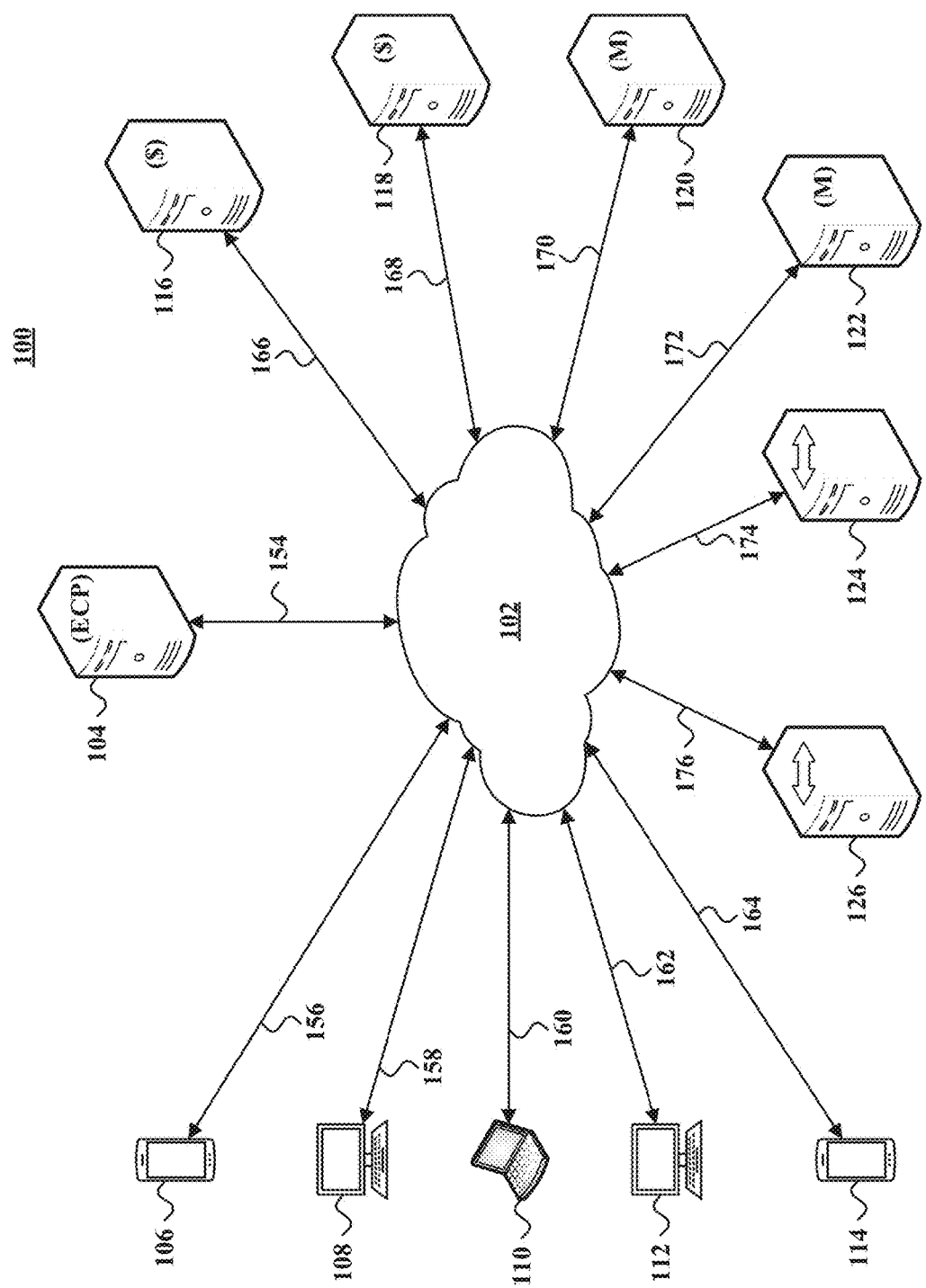
FIG. 1 depicts an example communication system, which includes an example network and an example e-commerce platform, and in which at least one embodiment can be carried out.

FIG. 1 depicts an example communication system, which includes an example network and an example e-commerce platform, and in which at least one embodiment can be carried out. The communication system 100 includes a network 102, an e-commerce platform 104 (which is indicated as such in FIG. 1 with an "ECP" designation), client devices 106-114, financial-institution servers 116 and 118 (which are indicated as such in FIG. 1 with respective dollar-sign symbols), merchant servers 120 and 122 (which are indicated as such in FIG. 1 with respective "M" designations), courier servers 124 and 126 (which are indicated as such in FIG. 1 with respective double-arrow symbols), and communication links 154-176. The e-commerce platform 104 is communicatively connected to the network 102 via the communication link 154. The client devices 106-114 are respectively communicatively connected to the network 102 via the communication links 156-164. The financial-institution servers 116 and 118 are respectively communicatively connected to the network 102 via the communication links 166 and 168. The merchant servers 120 and 122 are respectively communicatively connected to the network 102 via the communication links 170 and 172. The courier servers 124 and 126 are respectively communicatively connected to the network 102 via the communication links 174 and 176.

The e-commerce platform 104, each of the client devices 106-114, each of the financial-institution servers 116 and 118, each of the merchant servers 120 and 122, and each of the courier servers 124 and 126 are or at least include one or more CCDs such as the example CCD 600 that is described below in connection with FIG. 6. As such, each such device may include a respective (wireless and/or wired) communication interface, a respective processor, and respective data storage containing respective instructions executable by the respective processor for carrying out the functions described herein in connection with the respective CCD. Any one or more of those entities could take the form of or include multiple devices; as examples, one or more of the e-commerce platform 104 and/or a given server 116-126 could take the form of or include a system of multiple servers. Any one or more of the communication links 154-176 (as well as any one or more of any of the communication links that are described in connection with any of the other figures) could, unless context dictates otherwise, take the form of or include one or more wireless-communication links, one or more wired-communication links, one or more networks, and/or one or more devices and/or connections of any type deemed suitable by those having skill in the relevant art for a given implementation.

Figure 2:
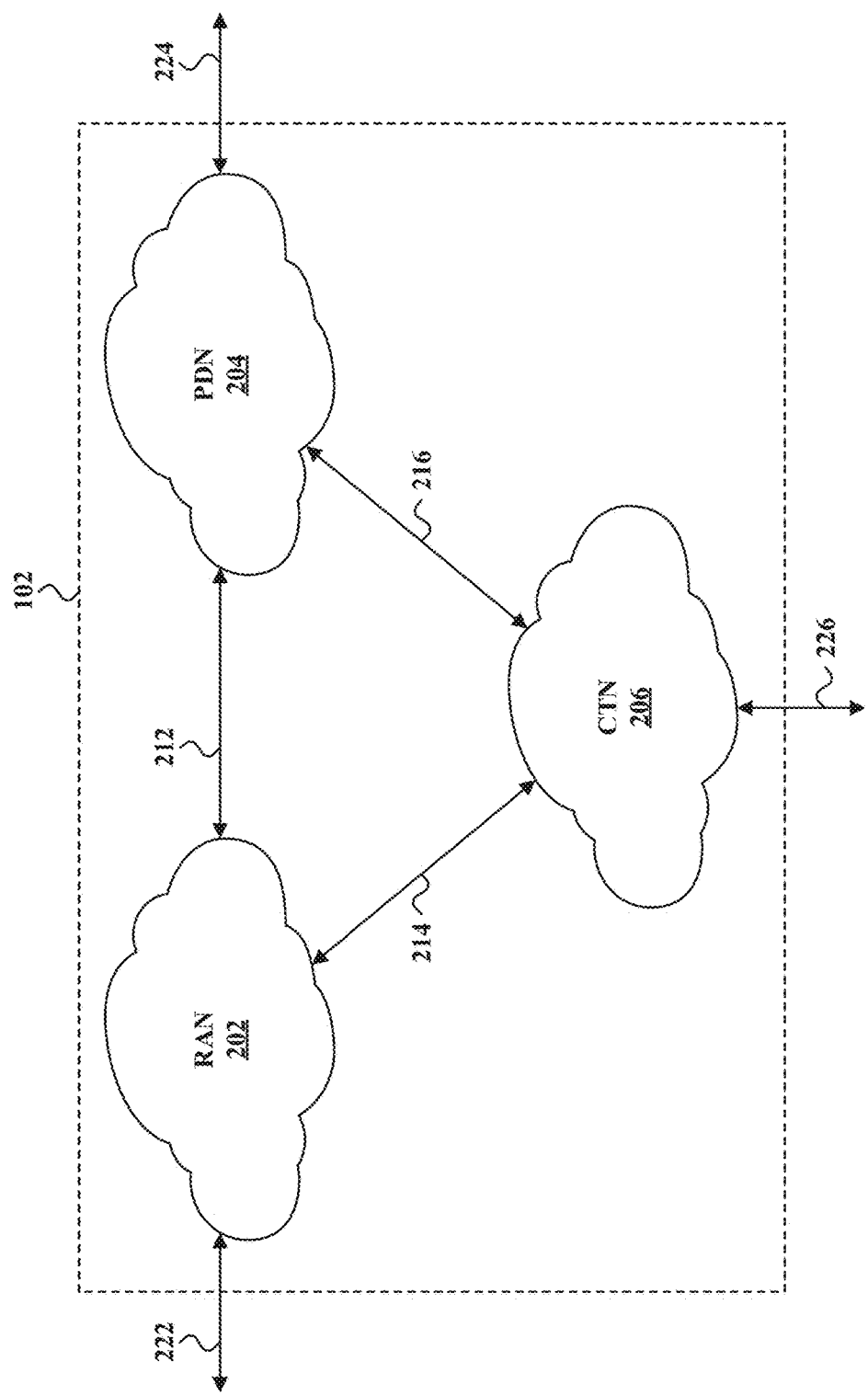
FIG. 2 depicts an example arrangement of the example network of FIG. 1, where that example arrangement includes an example radio access network (RAN), an example packet-switched data network (PDN), and an example circuit-switched telephone network (CTN), in accordance with at least one embodiment.

FIG. 2 depicts an example arrangement of the example network of FIG. 1, where that example arrangement includes an example RAN, an example PDN, and an example CTN, in accordance with at least one embodiment. That is, FIG. 2 depicts an example arrangement in which the network 102 includes multiple networks 202, 204, and 206. In accordance with at least one embodiment, the network 202 is a RAN, and as such is referred to hereinafter as the RAN 202. Moreover, in accordance with at least one embodiment, the network 204 is a PDN, and as such is referred to hereinafter as the PDN 204. Furthermore, in accordance with at least one embodiment, the network 206 is a CTN, and as such is referred to hereinafter as the CTN 206. It is also noted that, in various different embodiments, the network 102 may include any number of RANs, any number of PDNs, and any number of CTNs, and that one of each is shown by way of example.

The RAN 202 and the PDN 204 are connected via a communication link 212; the RAN 202 and the CTN 206 are connected via a communication link 214, and the PDN 204 and the CTN 206 are connected via a communication link 216. Moreover, a communication link 222 connects the RAN 202—and therefore the network 102—with one or more entities external to the network 102; a communication link 224 connects the PDN 204—and therefore the network 102—with one or more entities external to the network 102; and a communication link 226 connects the CTN 206—and therefore the network 102—with one or more entities external to the network 102. In various different embodiments, any one or more of the communication links 222-226 of FIG. 2 could be or include any one or more of the communication links 154-176 of FIG. 1. In general, then, any CCD discussed in this disclosure can communicate with any other CCD by way of any suitable communication paths that include one or more networks of any suitable types and/or one or more communication links of any suitable types.

Figure 3:
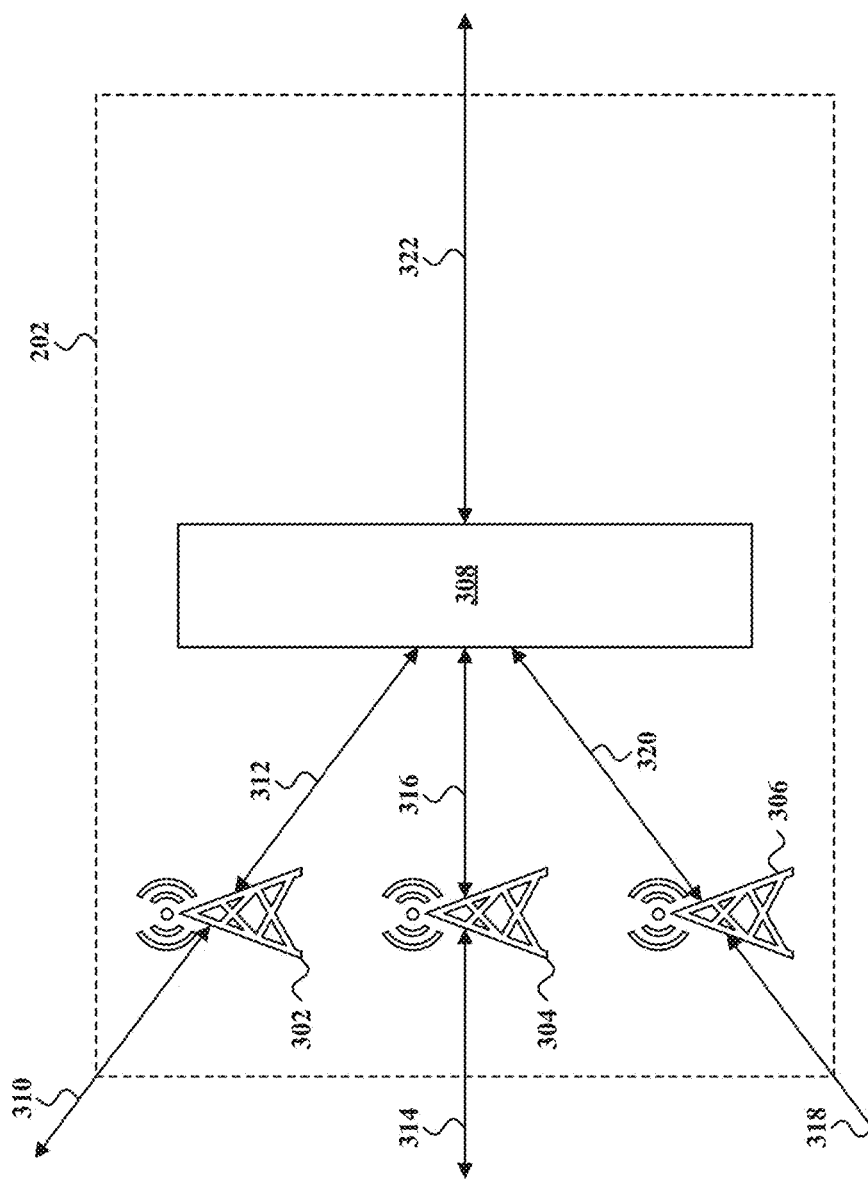
FIG. 3 depicts an example arrangement of the example RAN of FIG. 2, in accordance with at least one embodiment.

FIG. 3 depicts an example arrangement of the example RAN of FIG. 2, in accordance with at least one embodiment. In the depiction that is shown in FIG. 3, the RAN 202 includes three base stations 302, 304, and 306, as well as a core network 308. In various different embodiments, the RAN 202 could include any number of base stations or other access points deemed suitable by those having skill in the relevant art for a given implementation. Any one or more of the base stations 302, 304, and 306 could be or include entities known in the relevant art as a base transceiver station (BTS), an eNodeB, a Wi-Fi access point, and/or any other suitable entity that provides wireless access to one or more client devices.

The core network 308 may not be present in some implementations, and when it is present, may take the form of or include one or more CCDs that are equipped, programmed, and configured to carry out functions including but not limited to providing backhaul connectivity to one or more other networks via a communication link 322, providing registration, mobility-management, authentication, and/or one or more other functions typically provided and carried out by a RAN and/or its associated mobile-network infrastructure.

The base station 302 provides an air interface 310 and has a backhaul connection 312 to the core network 308; the base station 304 provides an air interface 314 and has a backhaul connection 316 to the core network 308; and the base station 306 provides an air interface 318 and has a backhaul connection 320 to the core network 308. In various different embodiments, the various air interfaces 310, 314, and 318 could operate according to time division multiple access (TDMA), code division multiple access (CDMA), frequency division multiple access (FDMA), orthogonal frequency division multiple access (OFDMA), Long Term Evolution (LTE), Wi-Fi, and/or one or more other types and/or protocols for wireless communication. Moreover, any one or more of the communication links 310, 314, 318, and 322 of FIG. 3 could represent or correspond with any one or more of the communication links 212, 214, and 222 of FIG. 2.

Figure 4:
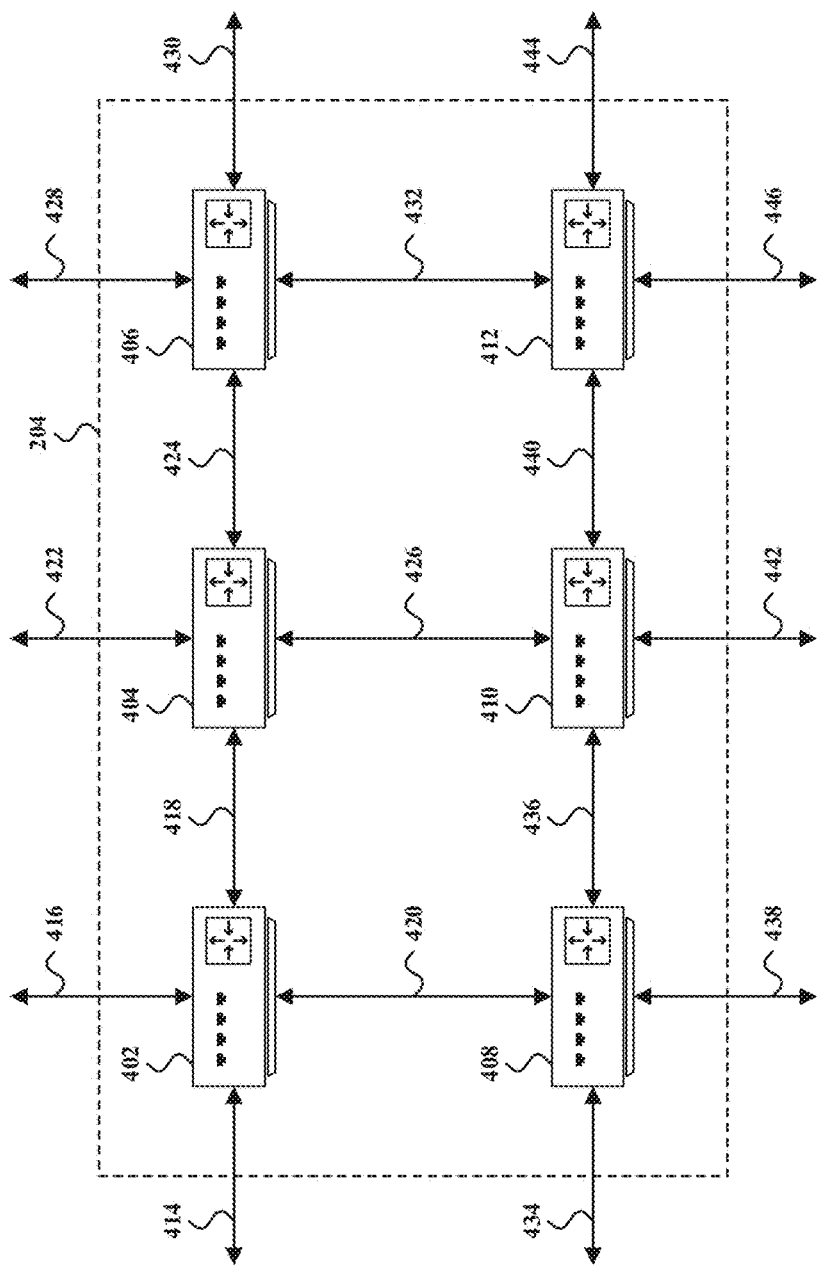
FIG. 4 depicts an example arrangement of the example PDN of FIG. 2, in accordance with at least one embodiment.

FIG. 4 depicts an example arrangement of the example PDN of FIG. 2, in accordance with at least one embodiment. In the depiction of FIG. 4, the PDN 204 includes routers 402, 404, 406, 408, 410, and 412. Each of these routers 402-412 could be or include a network entity that is typically referred to as a switch, a server, and/or one or more other entities, and are referred to herein as the routers 402-412 by way of convenience and example and not by way of limitation. Moreover, a given PDN could include any number of routers deemed suitable by those having skill in the relevant art for a given implementation. Each of the routers 402-412 is depicted as being able to communicate via a respective set of four communication links. This, too, is by way of example, as any one or more of the routers 402-412 could be arranged to be able to communicate via any suitable number of communication links. In at least one embodiment, each router is equipped with a respective communication module (e.g., Ethernet card) for each communication link via which that router is arranged to be able to communicate.

The router 402 is arranged to communicate with entities external to the PDN 204 via communication links 414 and 416, with the router 404 via a communication link 418, and with the router 408 via a communication link 420. The router 404 is arranged to communicate with entities external to the PDN 204 via a communication link 422, with the router 402 via the communication link 418, with the router 406 via a communication link 424, and with the router 410 via a communication link 426. The router 406 is arranged to communicate with entities external to the PDN 204 via communication links 428 and 430, with the router 404 via the communication link 424, and with the router 412 via a communication link 432. The router 408 is arranged to communicate with entities external to the PDN 204 via communication links 434 and 438, with the router 402 via the communication link 420, and with the router 410 via a communication link 436. The router 410 is arranged to communicate with entities external to the PDN 204 via a communication link 442, with the router 404 via the communication link 426, with the router 408 via the communication link 436, and with the router 412 via a communication link 440. The router 412 is arranged to communicate with entities external to the PDN 204 via communication links 444 and 446, with the router 406 via the communication link 432, and with the router 410 via the communication link 440. Moreover, any one or more of the communication links 414, 416, 422, 428, 430, 434, 438, 442, 444, and 446 of FIG. 4 could represent or correspond with any one or more of the communication links 212, 216, and 224 of FIG. 2.

Figure 5:
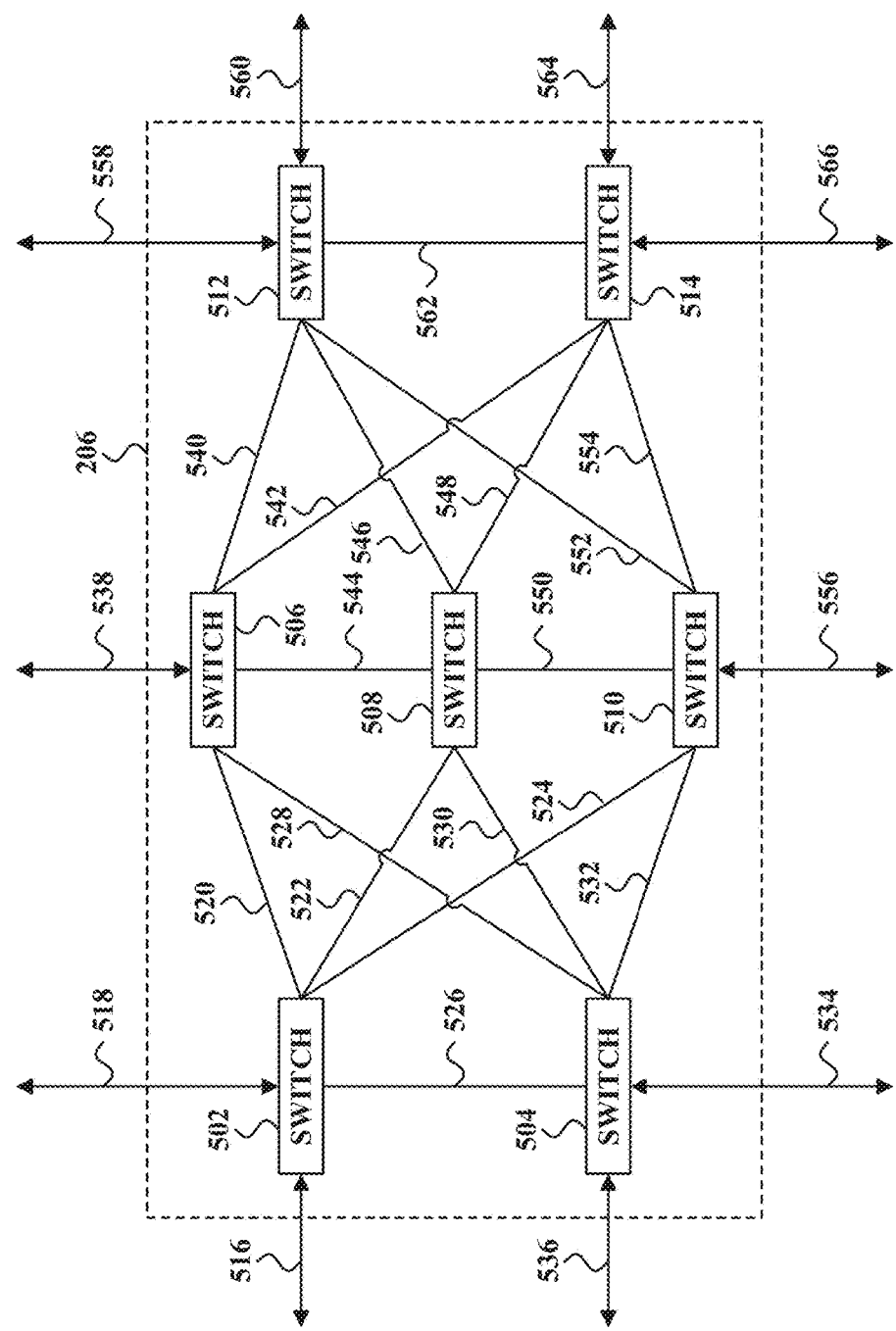
FIG. 5 depicts an example arrangement of the example CTN of FIG. 2, in accordance with at least one embodiment.

FIG. 5 depicts an example arrangement of the example CTN of FIG. 2, in accordance with at least one embodiment. In the depiction of FIG. 5, the CTN 206 includes telephone switches 502, 504, 506, 508, 510, 512, and 514. This depiction of the CTN 206 as including seven telephone switches is purely by way of example and not limitation, as the CTN 206 could include any number of telephone switches deemed suitable by those of skill in the relevant art for a given implementation. Moreover, although the telephone switches 502-514 are referred to as such in this description, this is for simplification and convenience of explanation and not by way of limitation, as any one or more of the telephone switches 502-514 could be or include one or more other entities that carry out one or more respective functions for routing and connecting circuit-switched communication sessions such as but not limited to telephone voice calls. As one example, one or more of the telephone switches 502-514 could be or include a signaling entity (e.g., a signaling transfer point (STP), as known in the art). Moreover, one or more of the telephone switches 502-514 could be or include a central or local exchange, as known in the art.

The telephone switch 502 is arranged to communicate with entities external to the CTN 206 via communication links 516 and 518, with the telephone switch 504 via a communication link 526, with the telephone switch 506 via a communication link 520, with the telephone switch 508 via a communication link 522, and with the telephone switch 510 via a communication link 524. The telephone switch 504 is arranged to communicate with entities external to the CTN 206 via communication links 534 and 536, with the telephone switch 502 via the communication link 526, with the telephone switch 506 via a communication link 528, with the telephone switch 508 via a communication link 530, and with the telephone switch 510 via a communication link 532.

The telephone switch 506 is arranged to communicate with entities external to the CTN 206 via a communication link 538, with the telephone switch 502 via the communication link 520, with the telephone switch 504 via the communication link 528, with the telephone switch 508 via a communication link 544, with the telephone switch 512 via a communication link 540, and with the telephone switch 514 via a communication link 542. The telephone switch 508 is arranged to communicate with the telephone switch 502 via the communication link 522, with the telephone switch 504 via the communication link 522, with the telephone switch 506 via the communication link 544, with the telephone switch 510 via a communication link 550, with the telephone switch 512 via a communication link 546, and with the telephone switch 514 via a communication link 548. The telephone switch 510 is arranged to communicate with entities external to the CTN 206 via a communication link 556, with the telephone switch 502 via the communication link 524, with the telephone switch 504 via the communication link 532, with the telephone switch 508 via the communication link 550, with the telephone switch 512 via a communication link 552, and with the telephone switch 514 via a communication link 554.

The telephone switch 512 is arranged to communicate with entities external to the CTN 206 via communication links 558 and 560, with the telephone switch 506 via the communication link 540, with the telephone switch 508 via the communication link 546, with the telephone switch 510 via the communication link 552, and with the telephone switch 514 via a communication link 562. The telephone switch 514 is arranged to communicate with entities external to the CTN 206 via communication links 564 and 566, with the telephone switch 506 via the communication link 542, with the telephone switch 508 via the communication link 548, with the telephone switch 510 via a communication link 554, and with the telephone switch 512 via the communication link 562. Moreover, any one or more of the communication links 516, 518, 534, 536, 538, 556, 558, 560, 564, and 566 of FIG. 5 could represent or correspond with any one or more of the communication links 214, 216, and 226 of FIG. 2.

Figure 6:
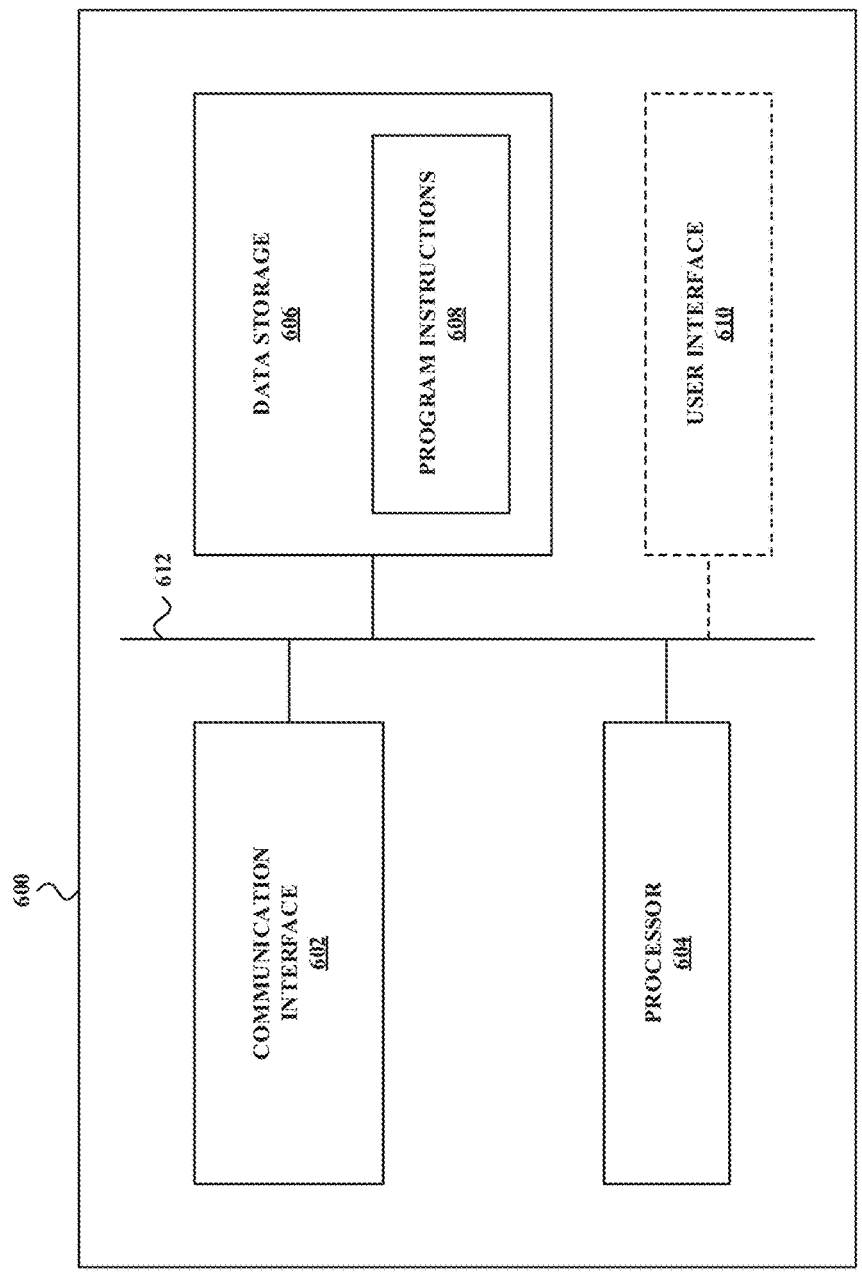
FIG. 6 depicts an example CCD, in accordance with at least one embodiment.

FIG. 6 depicts an example CCD, in accordance with at least one embodiment. In the depicted embodiment, the example CCD 600 includes a communication interface 602, a processor 604, data storage 606 containing program instructions 608, and an optional user interface 610, all of which are communicatively connected by a system bus 612 (or other data connection, network, or the like). Other architectures for CCDs could be used as well, as the provided and described architecture is presented herein by way of example and not limitation.

The communication interface 602 may include one or more wireless-communication interfaces (for communicating according to, e.g., LTE, Wi Fi, Bluetooth, and/or the like) and/or one or more wired-communication interfaces (for communicating according to, e.g., Ethernet, USB, and/or the like). As such, the communication interface 602 may include any necessary hardware (e.g., chipsets, antennas, Ethernet cards, etc.), any necessary firmware, and any necessary software for conducting one or more forms of communication with one or more other entities as described herein.

The processor 604 may include one or more processors of any type deemed suitable by those of skill in the relevant art, some examples including a general-purpose microprocessor and a dedicated digital signal processor (DSP).

The data storage 606 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The data storage 606 contains program instructions 608 that are executable by the processor 604 for carrying out various functions described herein.

The optional user interface 610 may be present in CCDs that are client devices, and may or may not be present in CCDs that are servers. When present, the optional user interface 610 may include one or more input devices (a.k.a. components and the like) and/or one or more output devices (a.k.a. components and the like). With respect to input devices, the optional user interface 610 may include one or more touchscreens, buttons, switches, knobs, microphones, and the like. With respect to output devices, the optional user interface 610 may include one or more displays, speakers, light emitting diodes (LEDs), and the like. Moreover, one or more components (e.g., an interactive touchscreen-and-display component) of the optional user interface 610 could provide both user-input and user-output functionality. And certainly other user-interface components could be used in a given context, as known to those of skill in the art.

Figure 7:
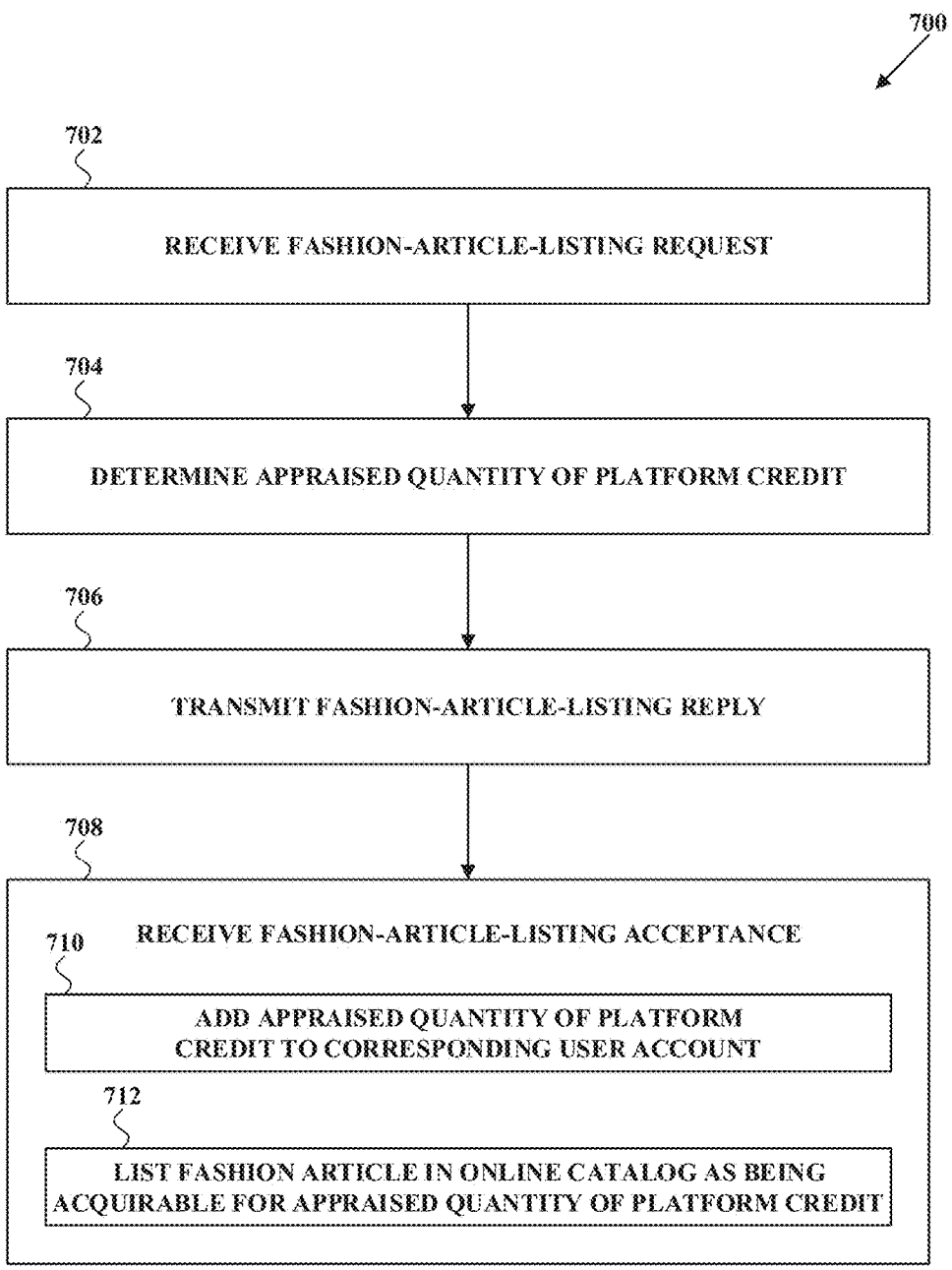
FIG. 7 depicts a first example method, in accordance with at least one embodiment.
Figure 8:
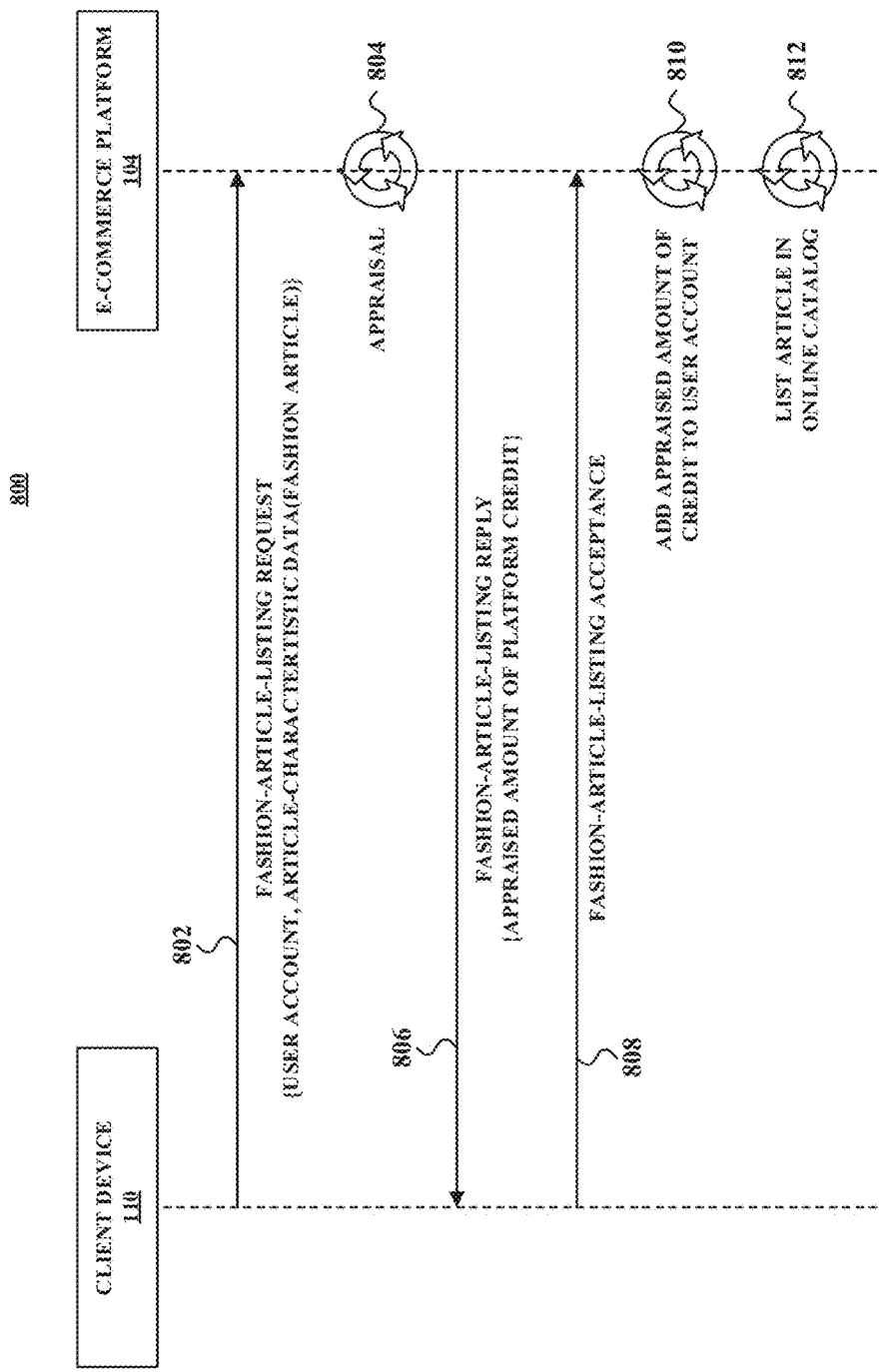
FIG. 8 is a call-flow diagram that corresponds with the example method of FIG. 7, in accordance with at least one embodiment.

FIG. 7 depicts a first example method, in accordance with at least one embodiment, and FIG. 8 is a call-flow diagram that corresponds with the example method of FIG. 7, in accordance with at least one embodiment. In at least one embodiment, the example method 700 of FIG. 7 is carried out by the e-commerce platform 104 executing stored program instructions.

At step 702, the e-commerce platform 104 receives fashion-article-listing requests that are each associated with a respective user account and that each include a respective set of article-characteristic data that corresponds to a respective wearable fashion article. The receipt of one such fashion-article-listing request is depicted at 802 in the example call-flow 800 of FIG. 8; in that example, the fashion-article-listing request is received by the e-commerce platform 104 from the client device 110. In accordance with the described embodiments, each respective user account has a respective platform-credit balance that is maintained by the e-commerce platform 104.

At step 704, the e-commerce platform 104 uses the respective sets of article-characteristic data that are received at step 702 to determine respective appraised quantities of platform credit for the respective corresponding wearable fashion articles. One such instance of this is depicted at function 804 in FIG. 8. Various different ways in which the e-commerce platform 104 carries out step 704 are discussed herein.

At step 706, the e-commerce platform 104 transmits fashion-article-listing replies that correspond respectively to the fashion-article-listing requests that the e-commerce platform 104 received at step 704. One such instance of this is depicted at message 806 in FIG. 8, where the e-commerce platform 104 transmits the fashion-article-listing reply 806 to the client device 110. In at least one embodiment, each such transmitted fashion-article-listing reply offers the respective determined appraised quantity of platform credit in exchange for listing the corresponding wearable fashion article in a browseable and searchable online catalog that is maintained and operated by the e-commerce platform 104.

At step 708, the e-commerce platform 104 receives fashion-article-listing acceptances corresponding to at least some of the fashion-article-listing replies that the e-commerce platform 104 transmitted at step 706. One such instance of this is depicted at message 808 in FIG. 8, where the e-commerce platform 104 receives the fashion-article-listing acceptance 808 from the client device 110. As depicted in FIG. 7, part of the e-commerce platform 104 carrying out step 708 is that, for each fashion-article-listing acceptance that the e-commerce platform 104 receives, the e-commerce platform 104 responsively carries out the below-described steps 710 and 712.

At step 710, the e-commerce platform 104 adds the corresponding appraised quantity of platform credit that was determined at step 704 to the respective platform-credit balance of the corresponding user account. One such instance of this is depicted at function 810 of FIG. 8. At step 712, the e-commerce platform 104 lists the corresponding fashion article in the online catalog as being acquirable for the corresponding appraised quantity of platform credit. One such instance of this is depicted at function 812 of FIG. 8. So, if at 704/804, the e-commerce platform 104 determines that the appraised quantity of platform credit for the particular fashion article is 300 credits, then the message 806 would convey that amount of credit as an offer at 706/806; furthermore, at 710/810, 300 credits would be added to the user account associated with the appraisal submission of 702/802; and at 712/812, that fashion article would be listed in the online catalog of the e-commerce platform 104 as being acquirable for 300 platform credits.

It is noted that the amounts of time that pass between various steps of the example method 700 could vary. In some instances, the entire method 700 might be performed over a matter of minutes or hours on a particular day, or perhaps over a span of two or three days. In other instances, a user may submit a fashion-article-listing request in step 702 and thereafter physically send the corresponding fashion article to a location at which appraisal takes place in step 704; in such instances, it could be days or weeks between the carrying out of step 702 and the carrying out of step 704 (or perhaps both 704 and 706). In some instances, days or weeks may pass between the carrying out of steps 706 and 708. Indeed, appraisals may be valid for a certain amount of time during which a user could accept the appraisal and list the item, and after which the appraisal may expire and perhaps need to be redone. And certainly many other possible example implementations could be listed here. Moreover, this observation that various different amounts of time could pass between execution of the various steps of the method 700 apply equally to the other methods 1300 and 2100 described herein as well.

In at least one embodiment, the e-commerce platform 104 includes a web server. In such embodiments, the various messages that are mentioned in FIG. 7 and depicted at 802, 806, and 808 in FIG. 8 are HTML messages; furthermore, in such embodiments, the online catalog includes a web interface that can be accessed from various different types of client devices such as laptops, tablets, smartphones, and the like. And this is not to the exclusion of the online catalog being accessible in other ways, such as via one or more apps on one or more types of client devices such as tablets, smartphones, and the like. And certainly other configurations are possible.

Figure 9:
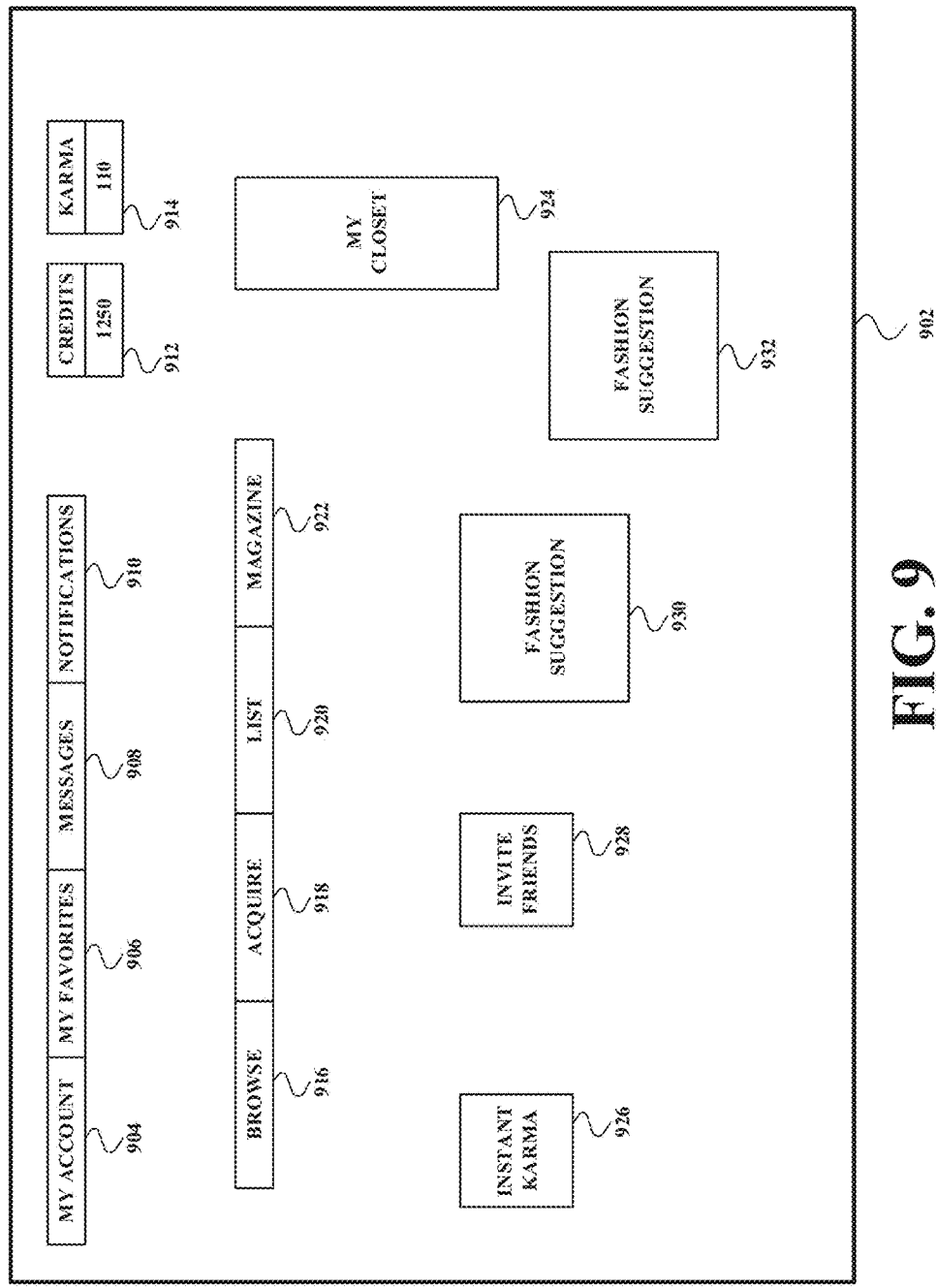
FIG. 9 depicts a first example screenshot presented by the e-commerce platform of FIG. 1, in accordance with at least one embodiment.

FIG. 9 depicts a first example screenshot presented by the e-commerce platform of FIG. 1, in accordance with at least one embodiment. This screenshot, as is the case with all example screenshots presented herein by way of example, could be a webpage viewable via a web browser, a visual user interface presented by an app, and/or one or more other options deemed suitable by those having skill in the art for a given implementation.

The example screenshot 900 of FIG. 9 is a welcome or home screen, and includes a My Account button 904, a My Favorites button 906, a Messages button 908, a Notifications button 910, a Credits display 912, a Karma display 914, a Browse button 916, an Acquire button 918, a List button 920, a Magazine button 922, a My Closet display 924, an Instant Karma button 926, an Invite Friends button 928, a first Fashion Suggestion button 930, and a second Fashion Suggestion button 932. These user-interface elements and their associated functions are presented herein by way of example, and certainly various other sets of user-interface display elements could be selected for any given implementation by those having skill in the relevant art.

The My Account button 904 may be a typical type of link that takes a user to another interface at which the user can manage their account information, such as personal information, payment information, contact information, user preferences, and the like. The My Favorites button 906 may be a link to a page or set of pages showing fashion items that are listed in the online catalog that the user had previously marked as being a favorite. In various different embodiments, users may be able to mark as favorite one or more of particular designers, particular other users, and particular fashion articles. And certainly other possibilities could be listed here as well. The Messages button 908 may link to a messaging module with which the user can communicate with other users, platform administrators, and/or the like. The Notifications button 910 may be a typical user-interface notifications element showing the user various alerts deemed pertinent to that user by the e-commerce platform 104 in various different circumstances. And certainly other example implementations could be listed here as well.

The Credits display 912 may show a current balance of the user's platform credits. As explained herein, in some embodiments, platform credits may include what are termed herein as verified credits and unverified credits. As such, the Credits display 912 may accordingly show multiple numbers with suitable labels associated respectively therewith. The Karma display 914 may show a user's balance of what are referred to herein as karma points, which are akin to a loyalty and/or bonus program that may be provided by the e-commerce platform 104, as is more fully described herein.

The Browse button 916 and the Acquire button 918 may both be present, or may be replaced in some embodiments with a single button; either way, the function here is to take the user to another screen at which the user can search and/or browse the online catalog for various listed fashion articles, as is more fully described below. The List button 920 may take the user to a screen at which the user can begin the process of potentially listing one of their own fashion articles in the online catalog, as is more fully described below.

The Magazine button 922 may take the user to a screen or set of screens at which the user can view, for example, pop-culture-related content and/or fashion-industry-related content provided by an online and/or print magazine that may be associated with the e-commerce platform 104. The My Closet display 924 may take the user to a screen or set of screens that show fashion items that the user has already submitted for appraisal in accordance with the present systems and methods; these items may have already been listed in the online catalog, or may have been posted to the user's closet in a listable state by the user or indirectly by the user as a result of a purchase transaction at a retail or online merchant, as is more fully described below.

In general, the My Closet display 924 could include fashion items (e.g., links to listings of fashion items) of any sort deemed suitable by those of skill in the art for a given implementation. Some representative examples include fashion items purchased by the corresponding user at a brick-and-mortar location associated with the e-commerce platform 104, fashion items purchased by the corresponding user at a website associated with the e-commerce platform 104, fashion items purchased by the corresponding user at a third party's brick-and-mortar location, fashion items purchased by the corresponding user at a third party's website, fashion items that the corresponding user had previously acquired via the e-commerce platform 104 (and may wish at some point to relist), and fashion items sold (e.g., recently sold) by the corresponding user via the e-commerce platform 104. And certainly numerous other examples could be listed as well. Moreover, various users of the e-commerce platform 104 may at various times browse other users' My Closet displays, and as explained above may also bookmark one or more such other users' My Closet displays as part of their My Favorites portion of their own home page on the e-commerce platform 104. As some representative examples, a given user may browse another user's My Closet display to view that other user's posted items, sold (e.g., recently sold) items, purchased items, and the like. And certainly many other example implementations could be listed here as well.

The Instant Karma button 926 may offer the user opportunities to earn karma points, which can then be converted into spendable platform credits according to an exchange rate that is programmed into the e-commerce platform 104 (e.g., 100 karma points could equal 1 credit). These opportunities to earn karma points could include viewing newly listed items, viewing featured items, taking surveys, and/or the like. The Invite Friends button 928 may take the user to a screen at which the user could invite others to become members of the e-commerce platform 104, perhaps by specifying e-mail addresses, Facebook® accounts, Twitter® handles, and/or the like. In some embodiments, users earn karma for inviting friends, for having invited friends actually register an account, for having friends that actually register an account list their first fashion article in the online catalog, and/or the like. Moreover, in some embodiments, certain activities (events, and the like) may cause users to lose karma; some examples of these types of activities may include not having a fashion item available for pickup when scheduled as promised, misrepresenting a listed item in one or more ways, and/or the like. And certainly numerous other such examples could be listed here as well. The first and second Fashion Suggestion buttons 930 and 932 may present the user with links to one or more listings of fashion articles in the online catalog, where perhaps such listings were selected by the e-commerce platform 104 for presentation to the particular user based on the user's browsing history, indicated preferences, and/or the like; or the listings could be randomly selected; and certainly numerous other possibilities could be listed here with respect to filters that the e-commerce platform 104 could use to select one or more listings for presentation to the user via, e.g., displays such as the Fashion Suggestion buttons 930 and 932 that are discussed here by way of example.

Figure 10:
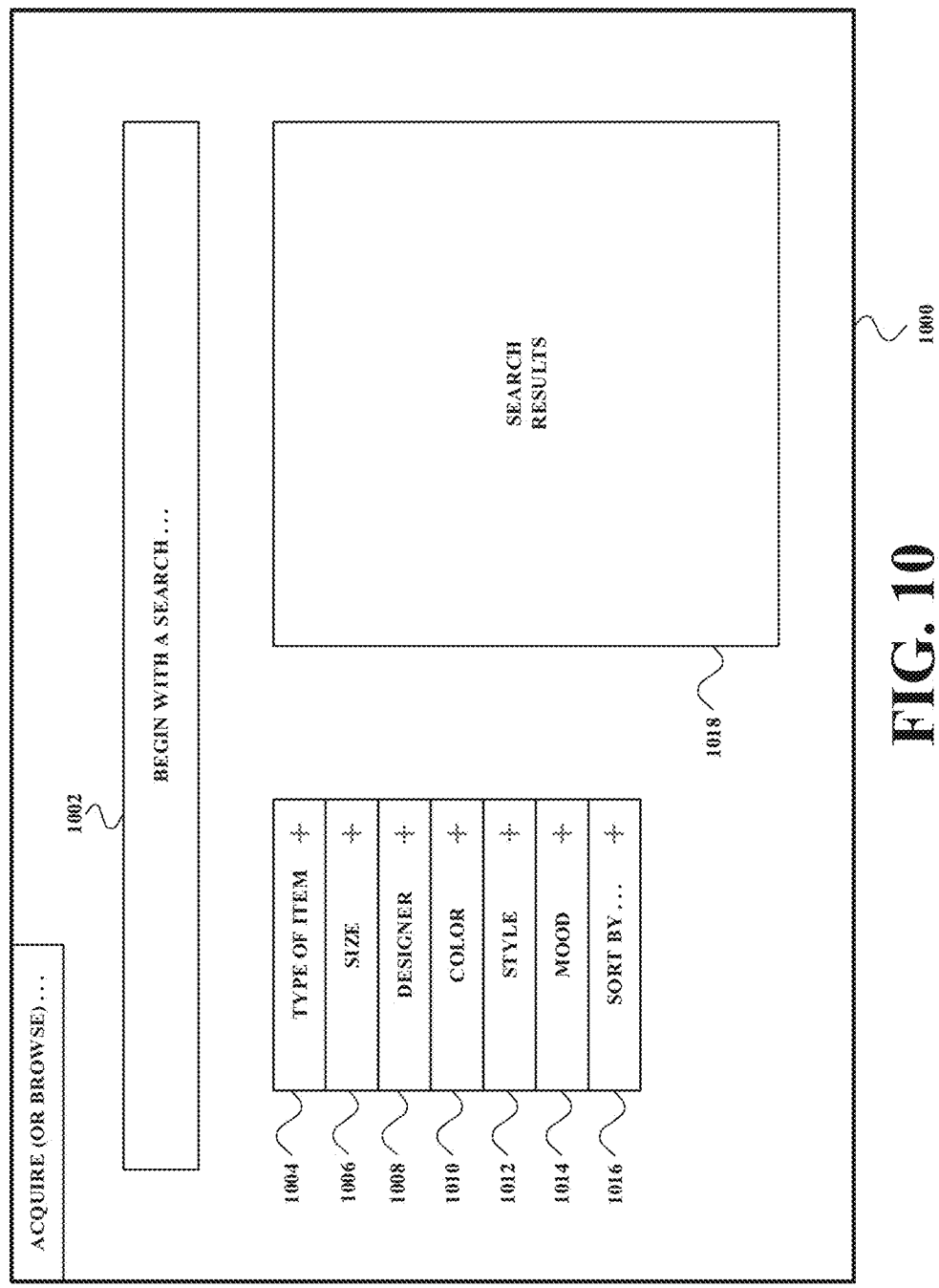
FIG. 10 depicts a second example screenshot presented by the e-commerce platform of FIG. 1, in accordance with at least one embodiment.

FIG. 10 depicts a second example screenshot presented by the e-commerce platform of FIG. 1, in accordance with at least one embodiment. In particular, FIG. 10 depicts a screen that the e-commerce platform 104 may present to a user responsive to the user selecting, as examples, the Browse button 916 or the Acquire button 918. The example search screen 1000 includes a free-text field 1002 into which search terms can be entered, and also includes browsing buttons including a Type of Item button 1004, a Size button 1006, a Designer button 1008, a Color button 1010, a Style button 1012, a Mood button 1014, and a Sort By button 1016. And certainly numerous other example fashion-article-attribute buttons could be described here, as those in FIG. 10 are presented by way of example and not limitation. Moreover, as is more fully described below, fashion articles that are listed in the online catalog may be indexed by any number of what are referred to herein as attribute tags and/or by any number of what are referred to herein as energy tags. Attribute tags correspond to browsing according to things like type of item, size, designer, color, material, and the like, while energy tags correspond to categorizations made by the e-commerce platform 104 with respect to an assigned style of an article, an assigned mood of an article, an occasion to which an article may typically be worn, and/or the like. In actual implementations, numerous other types of attribute tags and/or energy tags could be used as well, as those listed and described herein are provided by way of example and not limitation. In a manner known in the art, each of the buttons 1004-1016 may be expandable to offer enhanced browsing by subcategory. Moreover, search results may be dynamically displayed in a Search Results window 1018. And certainly numerous other example implementations could be listed here.

Figure 11:
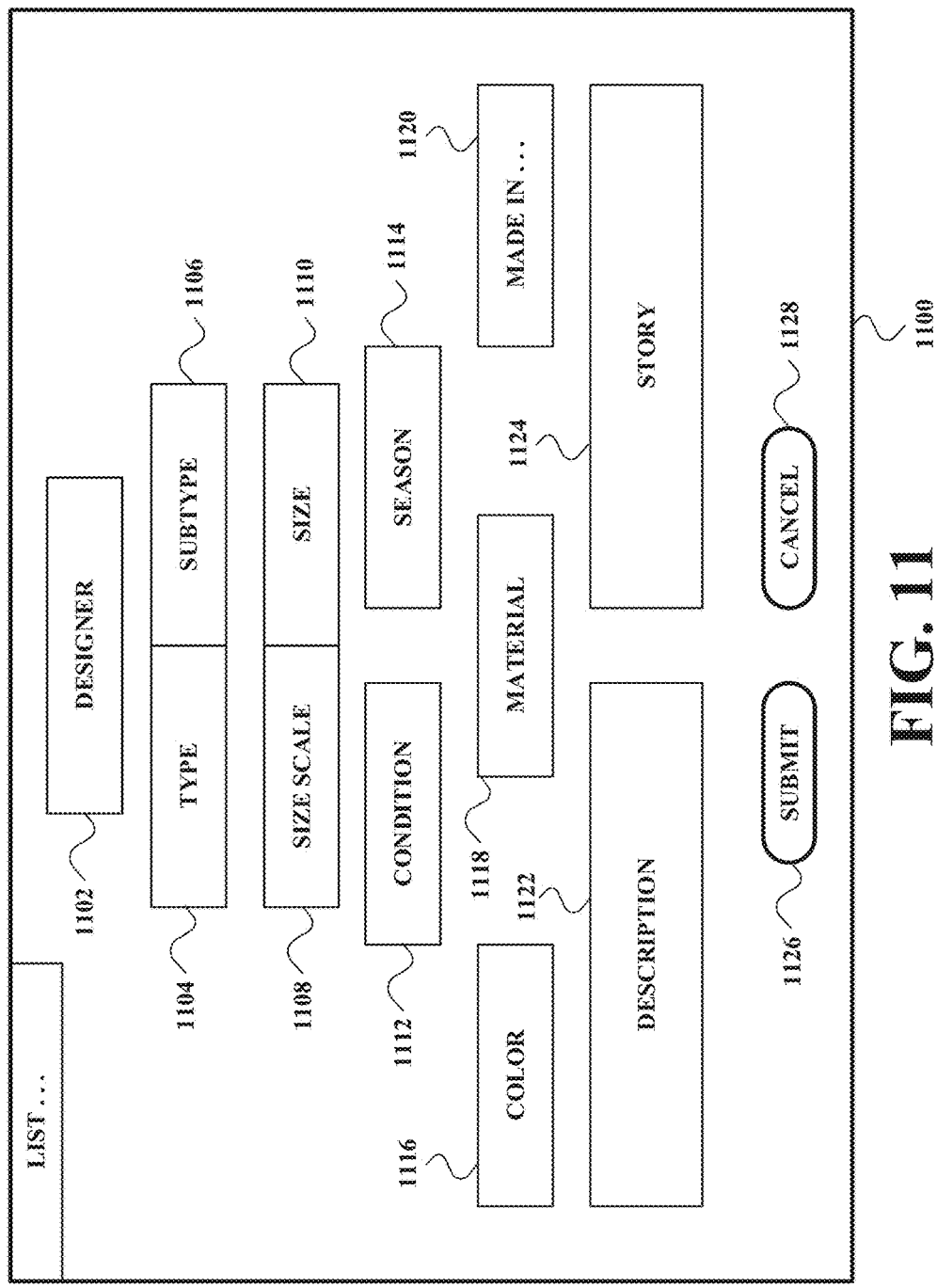
FIG. 11 depicts a third example screenshot presented by the e-commerce platform of FIG. 1, in accordance with at least one embodiment.
Figure 12:
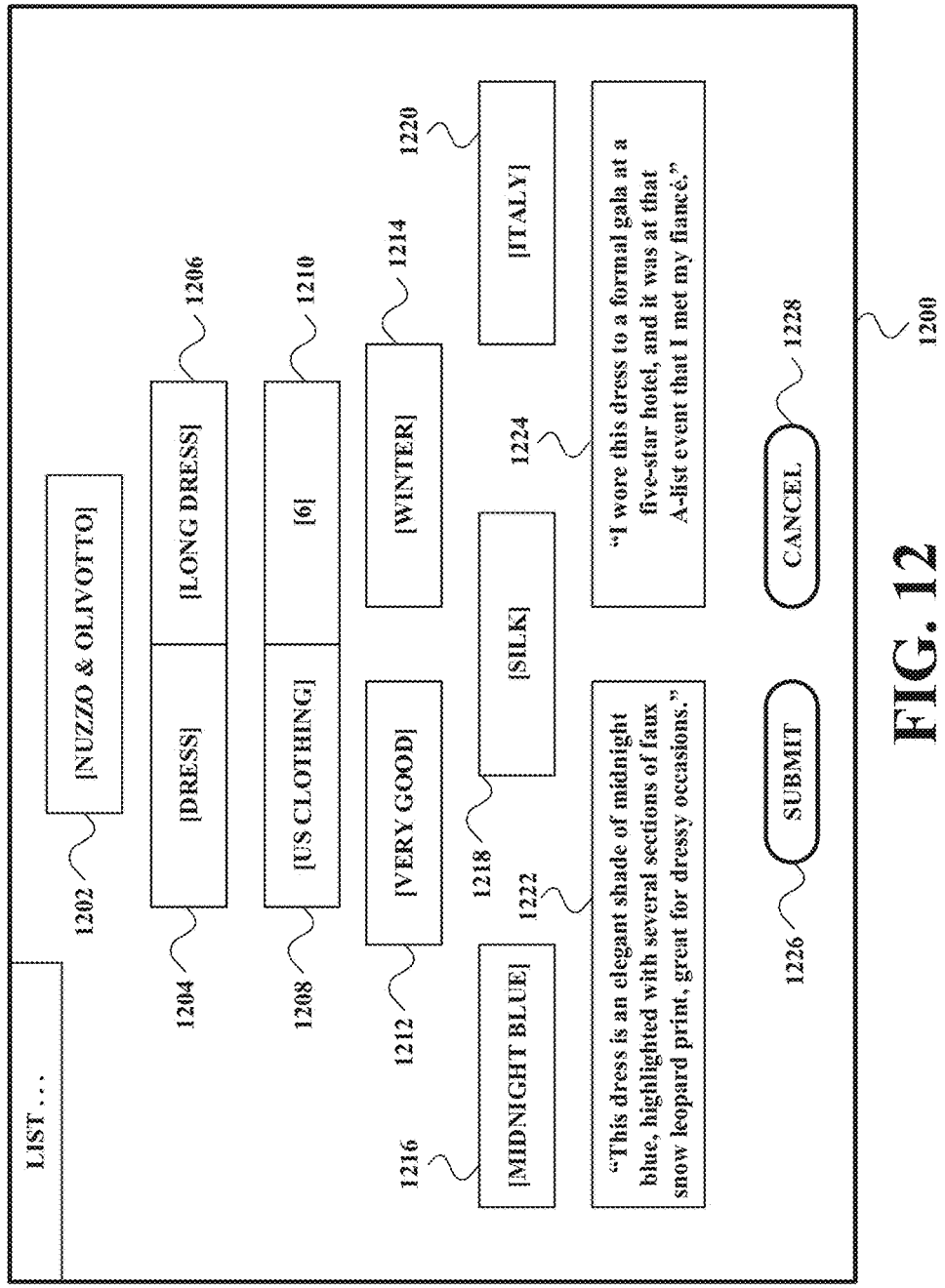
FIG. 12 depicts the third example screenshot of FIG. 11 with some sample data values, in accordance with at least one embodiment.

FIG. 11 depicts a third example screenshot presented by the e-commerce platform of FIG. 1, in accordance with at least one embodiment, and FIG. 12 depicts the third example screenshot of FIG. 11 with some sample data values, in accordance with at least one embodiment. The screenshot 1100 may be presented to a user by the e-commerce platform 104 in response to a user selecting the List button 920. The screenshot 1100 has a number of selectable and/or fillable data fields that are presented to the user. These include a Designer field 1102, a Type field 1104, a Subtype field 1106, a Size Scale field 1108, a Size field 1110, a Condition field 1112, a Season field 1114, a Color field 1116, a Material field 1118, a Made In field 1120, a Description field 1122, and a Story field 1124. The screenshot 1100 also has a Submit button 1126 and a Cancel button 1128. And certainly numerous other example buttons, data fields, dropdowns, and/or other user-interface elements could be depicted and described here, as those shown and described are provided by way of example and not limitation.

In at least one embodiment, from top to bottom and left to right with respect to the fields 1102-1120, which may be dropdowns, a user selection in a given field has a cascading effect of automatically modifying the choices available in one or more subsequent fields. Thus, for example, selection of a given designer in the Designer field 1102 may result in the e-commerce platform 104 accessing a database that correlates various designers with lists of item types that are associated with those respective designers, and then only making items types correlated with the specified designer selectable via the Type field 1104. And certainly numerous other such example implementations could be listed here. In at least one embodiment, the Description field 1122 and the Story field 1124 are free-text fields into which the user can enter respective free-text narratives. The screenshot 1200 of FIG. 12 shows the same data fields that are shown in the screenshot 1100 of FIG. 11, though with example data values filled in for the various data fields. These example data values are referenced below in describing additional aspects of the e-commerce platform 104.

As mentioned above, in at least one embodiment, the fashion-article-listing reply that is received by the e-commerce platform 104 at 802 (and at 702—for brevity and clarity of explanation, the corresponding example steps in FIG. 8 are mentioned hereinafter with the understanding that each such reference is also a reference to the corresponding step in FIG. 7) includes a set of article-characteristic data that is descriptive in various ways of a wearable fashion article that a user associated with the user account from which the message 802 was sent wishes to submit to the e-commerce platform 104 for appraisal and potentially for listing in the browseable and searchable online catalog.

This set of article-characteristic data may include one or more data fields that are respectively reflective of one or more properties (i.e., characteristics) of that wearable fashion article. In at least one embodiment, the received set of article-characteristic data for at least one of the wearable fashion articles includes an article-type indication (e.g., [DRESS]), an article-designer indication (e.g., [NUZZO & OLIVOTTO]), and an article-condition indication (e.g., [VERY GOOD]). The article-type indication could, as examples, be any of [CLOTHING], [FOOTWEAR], [DRESS], [TOP], [SKIRT], [BELT], [PANTS], [SHORTS], [JUMPSUIT], [OUTERWEAR], [SUIT], [JEANS], [SWIMWEAR], [BAG], [ACCESSORY], [JEWELRY], and/or any other suitable examples. And certainly numerous other examples could be given with respect to article-designer indications and/or article-condition indications.

The received set of article-characteristic data for at least one of the wearable fashion articles may further include an article-subtype indication (e.g., [LONG DRESS]). The received set of article-characteristic data for at least one of the wearable fashion articles may further include one or more of an article-size indication (e.g., [6] where an article-size-scale indication equals, e.g., [US CLOTHING]), an article-season indication (e.g., [WINTER]), an article-color indication (e.g., [MIDNIGHT BLUE]), an article-material indication (e.g., [SILK]), and an article-made-in-location indication (e.g., [ITALY]). These are merely examples presented for illustration, and certainly numerous others could be presented here.

The received set of article-characteristic data for at least one of the wearable fashion articles may further include one or more free-text narratives. In the example of FIG. 12, the set of article-characteristic data includes both a free-text narrative corresponding to the Description field 1222 and a free-text narrative corresponding to the Story field 1224. As known in the relevant art, these two free-text narratives could be concatenated and therefore considered to be a single free-text narrative. In this example, the user has entered the following free text in the Description field 1222: "This dress is an elegant shade of midnight blue, highlighted with several sections of faux snow leopard print, great for dressy occasions."; and has further entered the following free text in the Story field 1224: "I wore this dress to a formal gala at a five-star hotel, and it was at that A-list event that I met my fiancé." In the depicted example, all of the data shown in the various data fields 1202-1224 are submitted to (i.e., are received by) the e-commerce platform 104 as article-characteristic data associated with a particular fashion article that the user wants to have appraised and may thereafter decide to actually list in the online catalog.

In at least one embodiment, the received set of article-characteristic data for at least one of the wearable fashion articles further includes at least one image of the corresponding fashion article, and the e-commerce platform lists the corresponding fashion article in the online catalog in association with the at least one image of the corresponding fashion article. In at least one such embodiment, the at least one image of the corresponding fashion article includes at least one authenticating image of the corresponding fashion article. The at least one authenticating image of the corresponding fashion article could include one or more of an image of a purchase receipt of the corresponding fashion article, an image of a certificate of authenticity (perhaps along with the article itself), an image of the tags that came with the corresponding fashion article, an image of a distinctive logo or other marking that authenticates the fashion article, and/or one or more images of other aspects, documents, and/or the like that serve to verify the authenticity of the fashion article. Moreover, as additional examples, the various article-condition indications available for selection by the user when using the e-commerce platform 104 could include values such as [NEW WITH TAGS], [NEW], [MINT], [VERY GOOD], [GOOD], [VINTAGE], and/or the like. And certainly numerous other examples of images and/or article-condition indications could be listed here, as those that are described are provided by way of example and not by way of limitation.

Furthermore, there are various innovative financial aspects of the presently disclosed systems and methods. Thus, while, as further described below, users are able to acquire fashion articles from the e-commerce platform 104 (e.g., from other users of e-commerce platform 104), using platform credits in their respective platform-credit balances, it is also the case that users can use currency (e.g., U.S. dollars) to purchase platform credits at an exchange rate (e.g., 1 credit per U.S. dollar), and then spend those platform credits to acquire one or more fashion articles. Moreover, in some embodiments, the e-commerce platform 104 provides acquisition options at different price points; as but one example, the e-commerce platform 104 may make a given fashion article acquirable for 500 credits or for $400.00 at the option of the acquiring user. And certainly numerous other examples could be described here.

In at least one embodiment, the e-commerce platform 104 maintains a reserve-liquidity monetary account, and also maintains a charitable-donations monetary account of funds that are designated for donation to one or more charitable organizations. In at least one such embodiment, the e-commerce platform 104 divides each received monetary payment between the reserve-liquidity monetary account and the charitable-donations monetary account according to a predetermined ratio, which in some embodiments is 1:1 and in other embodiments is not 1:1. Thus, as an example, in embodiments where the ratio is 1:1, users get the benefit of knowing that they can shop with credits, and furthermore than they can shop with money, and if they do the latter, half of the money they spend will go to charity. Moreover, this principle is extendable to cash flows for purposes other than charitable donations. For example, in various different embodiments, received monetary payments may be split according to a 1:1 ratio between a reserve-liquidity monetary account and an investment-return account, cash flow, or the like. In some cases, investors and/or fashion-article donors may receive returns via such an account or cash flow. And certainly numerous other possible example implementations could be described here.

The reserve-liquidity monetary account may be a monetary account of funds that are designated for a first set of uses that includes purchasing inventory of wearable fashion articles for listing in the online catalog. Thus, liquidity can be managed in connection with the e-commerce platform 104. For example, if a relatively high number of users are buying credits and acquiring items and thereby reducing inventory, the reserve-liquidity monetary account is available for purchasing new inventory to maintain smooth operation of the e-commerce platform 104. The first set of uses for the funds in the reserve-liquidity monetary account may further include issuing refunds in instances of fraud. Moreover, some or all of the funds that are collected to enforce purchasing of fraudulently spent platform credit may be added to the reserve-liquidity monetary account. Thus, if a user receives credits for listing an item that turns out to be a fake, damaged, or otherwise fraudulent, and then spends those credits, that user may then be charged monetarily to account for that instance of perpetrating fraud on other users. And certainly numerous other examples could be listed here as well.

From time to time, in some embodiments, some or all of the funds in the charitable-donations monetary account are transferred to one or more charitable organizations. In some cases, these charitable organizations are selected by individuals and/or organizations that may have donated fashion articles to the e-commerce platform 104. Thus, in at least one embodiment, the e-commerce platform 104 maintains a plurality of donor user accounts having what are referred to herein as respective charity-pool-share balances. The e-commerce platform 104 receives donor-user-account-specific charitable-organization data specifying sets of one or more charitable organizations designated by respective different donor user accounts. Then, when transferring funds from the charitable-donations monetary account to the one or more charitable organizations, those one or more charitable organizations include those specified by one or more of the donors of fashion articles, thus providing a benefit to those donors and to the users of the e-commerce platform 104 as well. And in some embodiments, the more articles (or perhaps the more aggregate value of articles) a donor donates, the greater will be that donor's percentage of the overall number of charity-pool shares, and thus the greater the monetary donation to that donor's designated charitable organizations will be. In some embodiments, multiple different donor accounts can be considered "bundled" under the umbrella of a given "parent" donor account, in order to aggregate their respective donations, resulting in an increase in the donations made to the charitable organizations designated by the given "parent" donor account. And certainly numerous other possibilities could be implemented and listed here as well.

Another innovation realized by the present methods and systems pertains to the demarcation in some embodiments of platform credits into verified platform credits and unverified platform credits, where particular sets or amounts of unverified platform credits (e.g., corresponding respectively to different articles, orders, transactions, and/or the like) are converted by the e-commerce platform 104 into verified platform credits automatically in response to detection by the e-commerce platform 104 of each and every credit-verifying event in a set of one or more credit-verifying events. In at least one embodiment, the salient difference between verified platform credits and unverified platform credits is that verified platform credit is redeemable for acquiring one or more fashion articles listed in the online catalog while unverified credit is not.

In at least one other embodiment, the salient difference between verified platform credits and unverified platform credits is that verified platform credit is redeemable for acquiring one or more fashion articles listed in the online catalog without creating a corresponding credit debt while unverified platform credit is redeemable for acquiring one or more fashion articles listed in the online catalog with creation of a corresponding credit debt. That is, in some embodiments, users may be extended a "credit line" of sorts, which may take the form of a limit of unverified platform credit that the e-commerce platform 104 permits respective users to spend. Certainly such a limit could be modified up or down at various times for various different users and for various different reasons. In at least one embodiment, a given user may be considered by the e-commerce platform 104 to have an available amount of spendable platform credit that is equal to the sum of (i) the verified-platform-credit balance of the corresponding user account and (ii) the lesser of (a) the unverified-platform-credit balance of the corresponding user account and (b) the unverified-platform-credit limit. And certainly other implementations could be chosen as well.

In at least one embodiment, the set of one or more credit-verifying events, all of which need to occur for a particular segment of credits to be converted by the e-commerce platform 104 from unverified platform credit to verified platform credit, include an acquisition event associated with a listed fashion article that itself is associated with that particular segment of credits. Thus, if a first user lists a fashion article for an appraised quantity of 100 credits, that first user may be awarded 100 unverified credits. Those credits may remain unverified until such a time that a second user actually spends credits to acquire that fashion article for themselves. The e-commerce platform 104 may additionally require one or more of a confirmed delivery of that fashion article to the second user, a confirmed surrender of that fashion article by the first user, an elapsing of a fraud-complaint time period that begins at a time of the confirmed delivery of the listed fashion article, and/or one or more other credit-verifying events deemed suitable for a given context. And certainly numerous other example implementations could be listed here.

Moreover, it should be understood that not all embodiments involve both verified credits and unverified credits. In addition, even in embodiments that do involve both verified credits and unverified credits, certain transactions may not involve a stage during which the credits associated with that transaction are unverified. As an example, in a situation in which a user physically conveys (e.g., ships, couriers, hand delivers, and/or the like) a fashion article to a location at which an appraisal takes place, or in a situation in which a user surrenders physical possession and control of a fashion article to an entity associated with the e-commerce platform 104 prior to the appraisal process taking place, a user may be awarded verified credits as soon as an appraisal is conducted, an offer is tendered, and the user accepts that offer. In other words, it is not necessary that credits be unverified for a time period and then perhaps be converted to being verified: that is to say, credits can be verified at the time they are issued.

Moreover, in at least one embodiment, upon detecting an acquisition event from an acquiring user account associated with a corresponding fashion article, the e-commerce platform 104 responsively debits the platform-credit balance of the acquiring user account in the amount of platform credit for which that fashion article is at that time listed in the online catalog that is provided by the e-commerce platform 104. Typically, a given fashion article will initially be listed as being acquirable for the appraised quantity of platform credit that the listing user was awarded upon listing the article. Quite often the corresponding fashion article will remain listed for this appraised quantity of platform credit right up until that article is acquired. It may, occur, however, that an administrator of the e-commerce platform 104 changes (e.g., reduces) the listing price of a given fashion article prior to that article being acquired by a given user. This might occur in instances in which the given fashion article has not been acquired in a certain amount of time, though certainly many other example situations could be described here. The platform credit that the e-commerce platform 104 debits from the acquiring user account may be verified platform credit. The e-commerce platform 104 may, in instances in which a given fashion article is acquired (either for an initial listing price or an updated listing price), also engage in one or more of delivery-arrangement messaging with the acquiring user account, delivery-arrangement messaging with a courier, delivery-confirmation messaging with a courier, pickup-arrangement messaging with the corresponding user account, pickup-arrangement messaging with a courier, and pickup-confirmation messaging with a courier. And other possibilities could be listed here as well.

As described above, at 812, the e-commerce platform 104 lists a fashion article in its online catalog. This occurs after, at 802, the e-commerce platform 104 receives a fashion-article-listing request that includes a respective set of article-characteristic data for the corresponding fashion article. In at least one embodiment, listing the corresponding fashion article in the online catalog includes indexing the corresponding fashion article in the online catalog.

In at least one such embodiment, the e-commerce platform 104 populates an attribute-tag set for the corresponding fashion article with one or more attribute tags for the corresponding fashion article; in such embodiments, indexing the corresponding fashion article in the online catalog includes indexing the corresponding fashion article in the online catalog according to the populated attribute-tag set. In at least one embodiment, the e-commerce platform 104 also populates an energy-tag set for the corresponding fashion article with one or more energy tags for the corresponding fashion article; in such embodiments, indexing the corresponding fashion article in the online catalog includes indexing the corresponding fashion article in the online catalog according to the populated energy-tag set.

Each of the energy tags in the populated energy-tag set may have an energy-tag category selected from the group consisting of <style>, <mood>, and <occasion>. It is noted that <style>, <mood>, and <occasion> are listed here merely as examples of categories of energy tags that could be used in a given implementation, and that certainly numerous other examples could be listed here. Moreover, in at least one embodiment, the e-commerce platform 104 indexes the corresponding fashion article in the online catalog such that the indexing of the corresponding fashion article according to the populated energy-tag set is weighted more heavily with respect to search-result relevance than the indexing of the corresponding fashion article according to the populated attribute-tag set.

In at least one embodiment, when indexing a given corresponding fashion article in the online catalog, the e-commerce platform 104 may initialize both the attribute-tag set and the energy-tag set to be empty. The e-commerce platform 104 may then populate the attribute-tag set based at least in part on the respective set of article-characteristic data for the corresponding fashion article, and may also populate the energy-tag set for the corresponding fashion article based at least in part on the populated attribute-tag set.

Using the example data in FIG. 12 for illustration, the e-commerce platform 104 may include in the attribute-tag set for that particular dress an attribute tag having a category equal to <color> and a value equal to [MIDNIGHT BLUE]. In another instance, depending on item type, the e-commerce platform 104 may add to the attribute-tag set an attribute tag having a category equal to <print> and a value equal to a provided article-print indication. As another example, the e-commerce platform 104 may add to the attribute-tag set an attribute tag having a category equal to <material> and a value equal to [SILK]. As yet another example, the e-commerce platform 104 may add to the attribute-tag set an attribute tag having a category equal to <season> and a value equal to [WINTER]. And certainly numerous other similar examples could be listed.

Thus, in an example, after being initialized to be empty, the attribute-tag set may reach a state in which it includes the following example set of attribute tags: {<designer>= [NUZZO & OLIVOTTO], <type>=[DRESS], <subtype>= [LONG DRESS], <size>=[US06], <condition>=[VERY GOOD], <season>=[WINTER], <color>=[MIDNIGHT BLUE], <material>=[SILK], <madeIn>=[ITALY]}.

The e-commerce platform 104 may also process the received free text and responsively add one or more additional attribute tags to the attribute tag set. Thus, the e-commerce platform 104 may parse the received free-text narrative or narratives to identify therein one or more narrative attribute tags for the corresponding fashion article, and proceed to further add the one or more identified narrative attribute tags to the attribute-tag set. As an example, the e-commerce platform 104 may identify and add the following narrative attribute tags to the attribute-tag set: {<type>= [DRESS], <color>=[MIDNIGHT BLUE], <color>= [BLUE], <print>=[LEOPARD], <print>=[SNOW LEOPARD], <print>=[FAUX SNOW LEOPARD]}. It is noted that, in some embodiments, this parsing is done in an item-type-specific manner. Thus, the e-commerce platform 104 may use the received article-type indication (i.e., [DRESS]) to retrieve a dress-specific list of candidate attribute tags, and then only pull out those narrative attribute tags that match entries on that list. Moreover, an article-type indication as a key for retrieving a list of candidate attribute tags is presented here by way of example; indeed, in some examples, the e-commerce platform 104 may use one or more other attributes (such as designer and/or one or more others) to retrieve a particular list of candidate attribute tags, and then pull out those narrative attribute tags that match entries on that list. And certainly other implementations are possible as well.

After removing duplicates, the attribute-tag set would be as follows: {<designer>=[NUZZO & OLIVOTTO], <type>=[DRESS], <subtype>=[LONG DRESS], <size>= [US06], <condition>=[VERY GOOD], <season>=[WINTER], <color>=[MIDNIGHT BLUE], <material>=[SILK], <madeIn>=[ITALY], <color>=[BLUE], <print>=[LEOPARD], <print>=[SNOW LEOPARD], <print>=[FAUX SNOW LEOPARD]}.

In some embodiments, the e-commerce platform 104 uses the one or more identified narrative attribute tags to identify a set of sibling attribute tags of the one or more narrative attribute tags, and further adds the identified set of sibling attribute tags to the attribute-tag set. In this example, a relatively simple illustration of this is offered as such: the e-commerce platform 104 may look up the attribute tag <print>=[LEOPARD] and retrieve two sibling tags equal to <print>=[ANIMAL] and <print>=[SPOTTED], and further add those tags to the attribute-tag set. This makes the attribute-tag set then equal to {<designer>=[NUZZO & OLIVOTTO], <type>=[DRESS], <subtype>=[LONG DRESS], <size>=[US06], <condition>=[VERY GOOD], <season>=[WINTER], <color>=[MIDNIGHT BLUE], <material>=[SILK], <madeIn>=[ITALY], <color>= [BLUE], <print>=[LEOPARD], <print>=[SNOW LEOPARD], <print>=[FAUX SNOW LEOPARD], <print>= [ANIMAL], <print>=[SPOTTED]}.

In at least one embodiment, the e-commerce platform 104 then segments the attribute-tag set into what are referred to herein as (i) a core attribute-tag set of one or more attribute tags and (ii) a non-core attribute-tag set of one or more attribute tags, where the attribute tags in the non-core attribute-tag set are less specific than respective attribute tags in the core attribute-tag set with respect to one or more attributes of the corresponding fashion article. To illustrate, in this example, the core attribute-tag set would be: {<designer>=[NUZZO & OLIVOTTO], <type>=[DRESS], <subtype>=[LONG DRESS], <size>=[US06], <condition>=[VERY GOOD], <season>=[WINTER], <color>= [MIDNIGHT BLUE], <material>=[SILK], <madeIn>= [ITALY], <print>=[FAUX SNOW LEOPARD], <print>= [ANIMAL], <print>=[SPOTTED]}. And the non-core attribute-tag set would be {<color>=[BLUE], <print>= [LEOPARD], <print>=[SNOW LEOPARD]}.

The e-commerce platform 104 may then populate the energy-tag set based on the one or more attribute tags in the core attribute-tag set and not on the one or more attribute tags in the non-core attribute-tag set. Thus, the e-commerce platform 104 may reference correlation data using each of the attributes in the core attribute-tag set, thereby identifying one or more energy tags that are stored in association with each of those attributes from the core attribute-tag set. The e-commerce platform 104 may then add all of those identified energy tags to the energy-tag set for the corresponding fashion article. Thereafter, the e-commerce platform 104 may carry out a process of streamlining and weighting that energy-tag set, at least in part by counting respective occurrences of respective energy tags in the populated energy-tag set, removing duplicate energy tags from the populated energy-tag set, and weighting the remaining energy tags in the populated energy-tag set according to respective number of removed duplicate energy tags, the weighting being with respect to search-result relevance; in such embodiments, the e-commerce platform 104 indexes the corresponding fashion article in the online catalog according to the weighted populated energy-tag set.

With respect to the attribute tags and the energy tags, the e-commerce platform 104 may provide drop-down, click-on matching via a user interface between (i) the one or more attribute tags in the core attribute-tag set and (ii) the corresponding fashion article, and instead provide keyword-entry matching via the user interface between (i)(a) the one or more attribute tags in the core attribute-tag set and (b) the one or more attribute-tags in the non-core attribute-tag set and (ii) the corresponding fashion article. To accomplish the providing of this keyword matching, the e-commerce platform 104 may undergo the steps of tokenizing (i.e., parsing into individual words) any multiword attribute tags and any multiword energy tags.

Thus, in the Search window 1002 of FIG. 10, as a user types text, some items in the online catalog having matching core attribute tags may be displayed below that Search window 1002, which the user could then click on to be taken to a page having more information about the clicked-on article. If, instead of clicking on a dropped-down match, the user hits the Enter or Return button (or the like), the e-commerce platform 104 may perform a Boolean keyword-matching search and provide results, somewhat analogous to a search engine. In doing so, the e-commerce platform 104 may treat specified attributes within a given attribute category according to an "OR" operator and may place an "AND" operator between attribute-tag categories. However, many other possible keyword-matching approaches could be used.

The e-commerce platform 104 may further populate the energy-tag set for the fashion article based at least in part on the respective article-type indication and at least in part on the respective article-designer indication. Thus, the e-commerce platform 104 may map the respective article-type indication to a stored first set of energy tags, and add that stored first set of energy tags to the energy-tag set. In addition or instead, the e-commerce platform 104 may map the respective article-designer indication to a stored second set of energy tags, and add that stored second set of energy tags to the energy-tag set. The e-commerce platform 104 may conduct a similar process to populate energy tags into the energy-tag set for the corresponding fashion article using one, some, or all of the attributes in the attribute-tag set. Alternatively, the e-commerce platform 104 may conduct an attribute-tag-category-limited population of the energy-tag set based on the one or more attribute tags in the core attribute-tag set. As an example, the e-commerce platform 104 may only retrieve energy tags and add them to the energy-tag set using attribute tags having attribute-tag categories that match one or more of <item type>, <designer>, <color>, and <material>. And certainly numerous other possible approaches could be listed here as well.

As stated above, some energy tags are style energy tags, and are searchable as such. Some examples of these include [Feminine], [Chic], [Sophisticated], [European], [Trendy], [Contemporary], [Classic], [Sexy], [Avant Garde], [Casual], [Edgy], [Understated], [Funky], [Conservative], [Elegant], [Bohemian], [Smart], and [Glamorous]. Moreover, some energy tags are mood energy tags, and are searchable as such. Some examples of these include [Free], [Confident], [Playful], [Sensual], [Flirty], [Calm], [Indulging], [Party], [Empowered], [Risky], and [Incognito]. Furthermore, some energy tags are occasion energy tags, and are searchable as such. Some examples of these include [Day-to-Play], [Cocktail], [Basics], [Evening], [Office], [Black Tie], [Daytime], [Resort], [Red Carpet], and [Black Carpet]. And certainly numerous other examples of one or more of these energy-tag types could be listed here. Moreover, and as noted above, <style>, <mood>, and <occasion> are listed here merely as examples of categories of energy tags that could be used in a given implementation, and certainly numerous other examples could be listed here.

Figure 13:
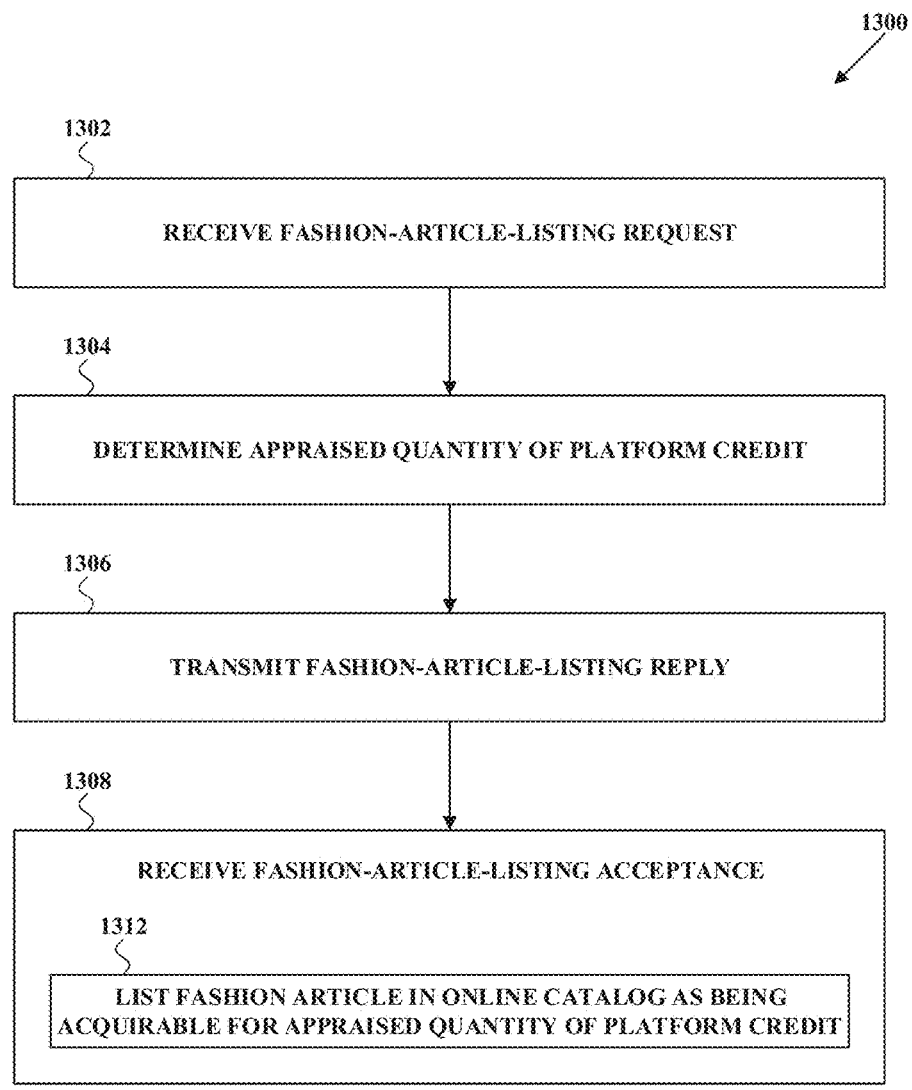
FIG. 13 depicts a second example method, in accordance with at least one embodiment.

FIG. 13 depicts a second example method, in accordance with at least one embodiment. As is evident in FIGS. 7 and 13, the example method 1300 of FIG. 13 is quite similar to the example method 700 of FIG. 7, and thus is not described herein in as great of detail. Essentially, the method 1300 is the method 700 without step 710 and with the remaining steps having been renumbered to match the 1300-series numbering of FIG. 13 rather than the 700-series numbering of FIG. 7.

The method 1300 is included in the present disclosure for at least two reasons. The first of those reasons is to illustrate that an embodiment of the present systems and methods takes the form of a method that includes only the steps that are depicted in the example method 1300 of FIG. 13. The second of those reasons is to set up the ensuing discussion of a number of different ways that the appraisal process can be carried out in various different embodiments. Moreover, although not discussed extensively in this disclosure, and in particular not discussed in connection with the ensuing discussion of the example method 1300, it is contemplated that crowdsourcing approaches to the fashion-article-appraisal process could be used in some embodiments.

Returning to the discussion of FIG. 13, the appraisal process as discussed herein corresponds at least to step 1304 of the example method 1300 of FIG. 13 and to step 704 of the example method 700 of FIG. 7. The remaining steps of method 1300 (i.e., steps 1302, 1306, 1308, and 1312) are not explicitly described in the ensuing balance of this description of FIG. 13, though it is understood that these steps could be carried out in the manner described above with respect to the parallel-numbered steps of method 700 (i.e., steps 702, 706, 708, and 712). Briefly, like the method 700, the method 1300 is carried out in at least one embodiment by an e-commerce platform (e.g., the e-commerce platform 104) executing stored program instructions. And to provide context for the ensuing description of step 1304 in more detail, the next paragraph provides a brief statement of each of the steps of the method 1300.

At step 1302, the e-commerce platform 104 receives fashion-article-listing requests that are each associated with a respective user account and that each include a respective set of article-characteristic data that corresponds to a respective wearable fashion article, where each respective user account has a respective platform-credit balance. At step 1304, the e-commerce platform 104 uses the respective sets of article-characteristic data to determine respective appraised quantities of platform credit for the respective corresponding wearable fashion articles. At step 1306, the e-commerce platform 104 transmits fashion-article-listing replies corresponding respectively to the received fashion-article-listing requests, where each transmitted fashion-article-listing reply offers the respective determined appraised quantity of platform credit in exchange for listing the corresponding wearable fashion article in a browseable and searchable online catalog. At step 1308, the e-commerce platform 104 receives fashion-article-listing acceptances corresponding to at least some of the transmitted fashion-article-listing replies. And, at step 1312, for each fashion-article-listing acceptance that is received at step 1308, the e-commerce platform 104 responsively lists the corresponding fashion article in the online catalog as being acquirable for the corresponding appraised quantity of platform credit.

What follows is a more detailed discussion of a number of ways in which step 1304 of the method 1300 could be carried out by the e-commerce platform 104. And it should be understood that this discussion applies equally as being a number of ways in which the e-commerce platform 104 could carry out step 704 of the method 700. Moreover, although step 1304 is stated using plural language (i.e., using the respective sets of article-characteristic data to determine respective appraised quantities of platform credit for the respective corresponding wearable fashion articles), the ensuing description of a number of ways in which step 1304 could be carried out is stated in singular language—i.e., it is a description of a number of different ways in which a single instance of step 1304 could be carried out. This is for simplicity and clarity of explanation and not by way of limitation, as will be understood by those having skill in the relevant art.

Figure 14:
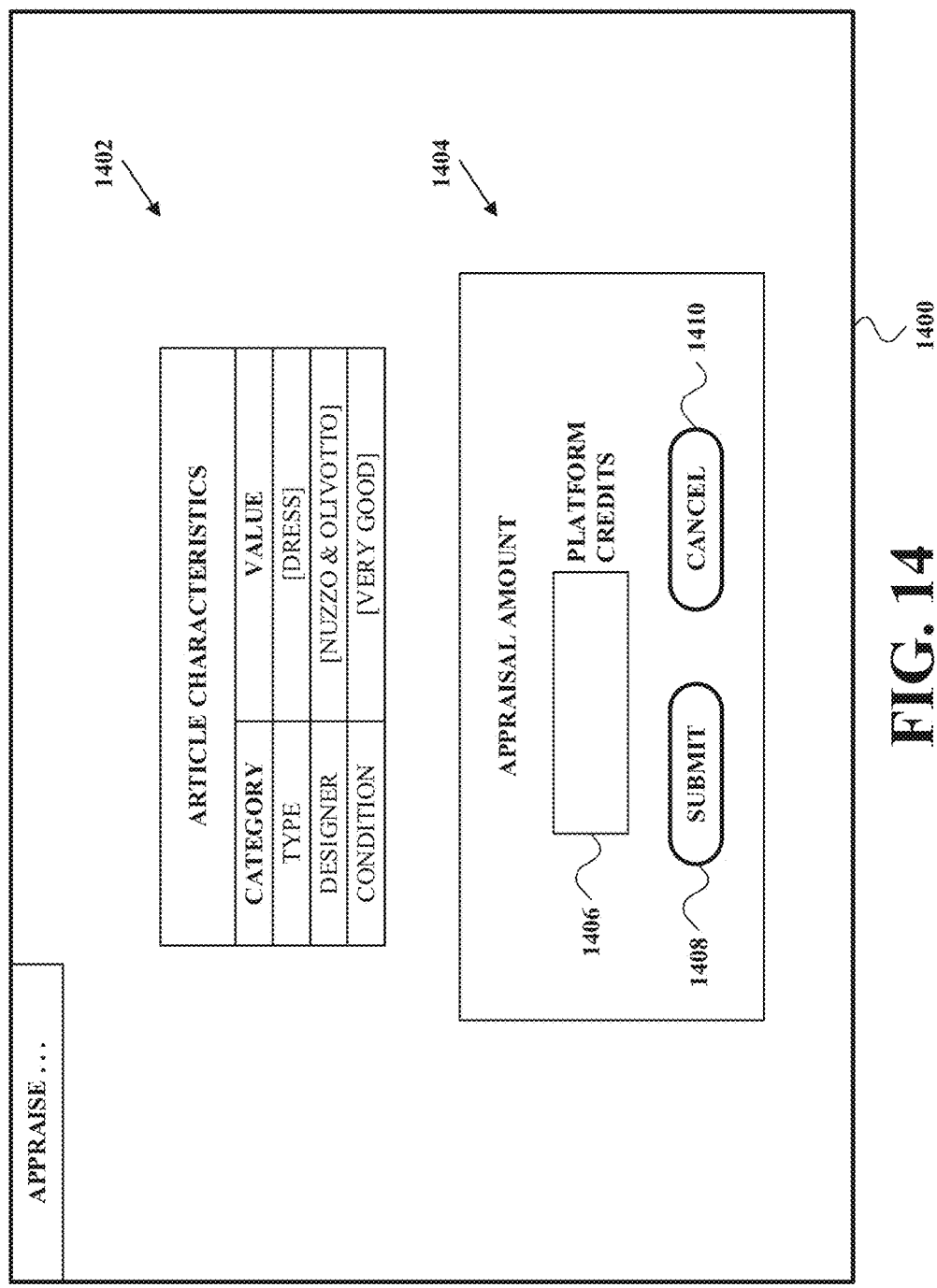
FIG. 14 depicts a fourth example screenshot presented by the e-commerce platform of FIG. 1, in accordance with at least one embodiment.

FIG. 14 depicts a fourth example screenshot presented by the e-commerce platform of FIG. 1, in accordance with at least one embodiment. In particular, FIG. 14 depicts an example screenshot that the e-commerce platform 104 may present on an appraisal-tool user interface. Thus, in at least one embodiment, after a fashion-article-listing request is received by the e-commerce platform 104 at step 702, where that received fashion-article-listing request includes a respective set of article-characteristic data that corresponds to a respective wearable fashion article, the e-commerce platform 104 may carry out step 1304 at least in part by (i) presenting at least some of the respective set of article-characteristic data via an appraisal-tool user interface and (ii) receiving the respective appraised quantity of platform credit for the respective wearable fashion article via the appraisal-tool user interface.

In the example that is depicted in FIG. 14, the respective set of article-characteristic data for the respective wearable fashion article included a respective article-type indication, a respective article-designer indication, and a respective article-condition indication. And, as can be seen in FIG. 14, all three of those data items are presented via the appraisal-tool user interface, using the example data values that are depicted in FIG. 12 as being submitted for appraisal. As can be seen in FIG. 14, the example screenshot 1400 includes an article-characteristics display element 1402 that includes a first column for article-characteristic category and a second column showing the corresponding value for the article characteristic in the respective row. In the presented example, the appraisal-tool user interface shows that the article type is [DRESS], that the article designer is [NUZZO & OLIVOTTO], and the article condition is [VERY GOOD].

Also included in the example screenshot 1400 is an appraisal-entry display element 1404, which includes a data field 1406 via which an appraised quantity of platform credit for the respective wearable fashion article can be received by the e-commerce platform 104 via the appraisal-tool user interface. The appraisal-entry data element 1404 further includes a Submit button 1408 and a Cancel button 1410.

Figure 15:
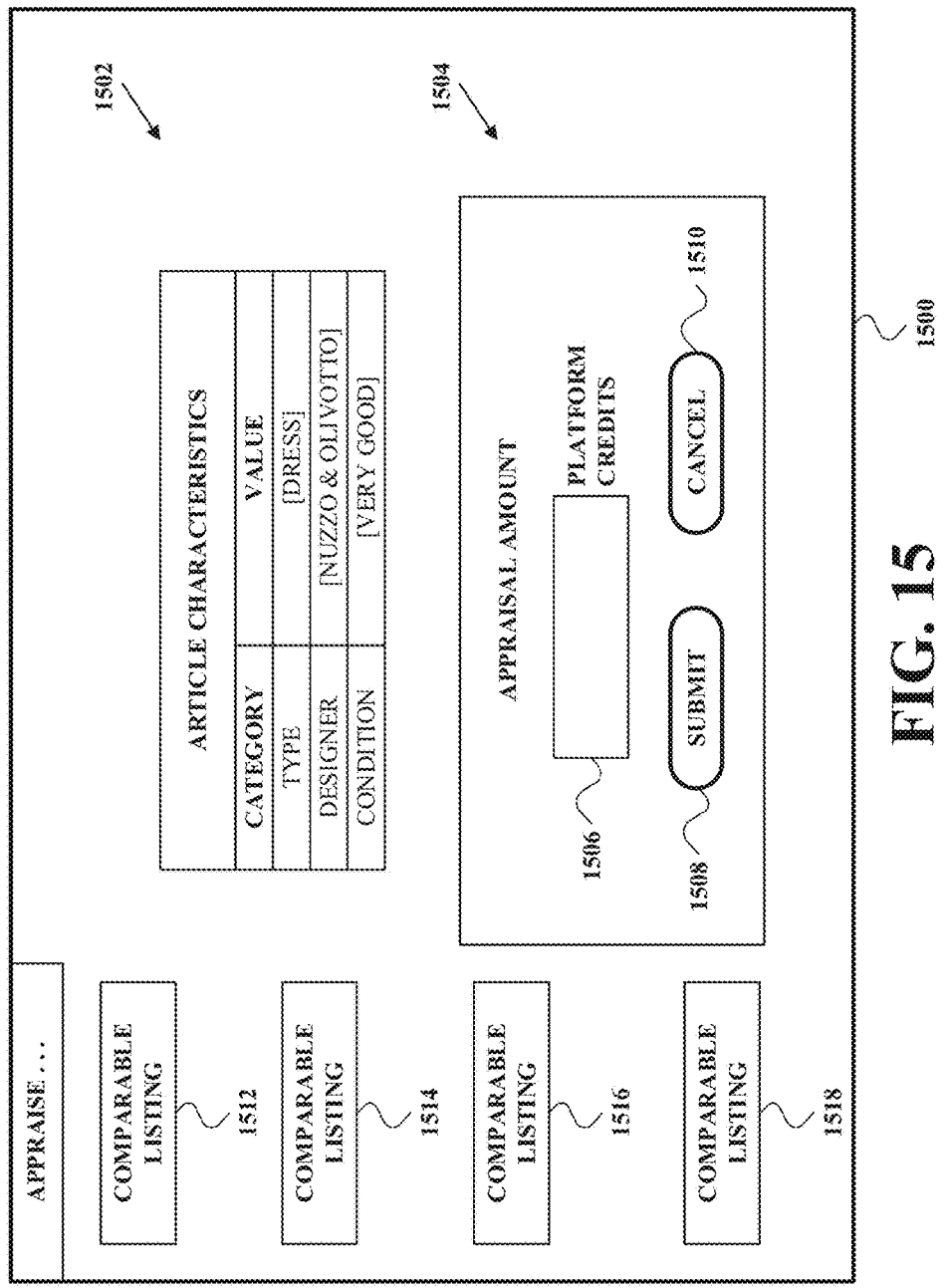
FIG. 15 depicts a fifth example screenshot presented by the e-commerce platform of FIG. 1, in accordance with at least one embodiment.

FIG. 15 depicts a fifth example screenshot presented by the e-commerce platform of FIG. 1, in accordance with at least one embodiment. The example screenshot 1500 is similar in a number of ways to the example screenshot 1400. As such, elements that are common to both example screenshots (and indeed numbered in parallel other than being in the 1400 series or the 1500 series) are not redundantly described in connection with FIG. 15. This approach is also taken with respect to the descriptions below of various screenshots. In an embodiment, prior to receiving the respective appraised quantity of platform credit for the respective wearable fashion article via the appraisal-tool user interface, the e-commerce platform 104 (i) uses the respective set of article-characteristic data to identify one or more listings in the online catalog of wearable fashion articles that are comparable to the respective wearable fashion article and (ii) presents the one or more identified comparable listings via the appraisal-tool user interface.

In this example, the e-commerce platform 104 identifies at least four listings that match the type, designer, and condition that are depicted in the article-characteristics display element 1502, and displays four of those comparable listings at comparable-listing display elements 1512, 1514, 1516, and 1518. In an embodiment, each such comparable-listing display element would include a picture of the respective associated listed (or at least appraised) article, along with the respective quantity of platform credits at which the respective article was appraised, perhaps along with a date at which such an appraisal was made, and/or the like. In an embodiment, each such comparable-listing display element would include an embedded hyperlink to a page containing additional information about the respective previously appraised article. Moreover, in connection with FIG. 15 and/or any of the other similar screenshot figures presented herein, and in general with respect to at least one embodiment, a user mousing over (or otherwise similarly at least temporarily selecting) a given listing (i.e., comparable listing, favorite listing, and/or the like) may result in the e-commerce platform 104 presenting a pop-up or other similar display showing one or more attributes of the given article and/or listing (e.g., item type, designer, condition, listed price (e.g., in platform credits), and/or the like). And certainly numerous other implementation examples could be described here.

Figure 16:
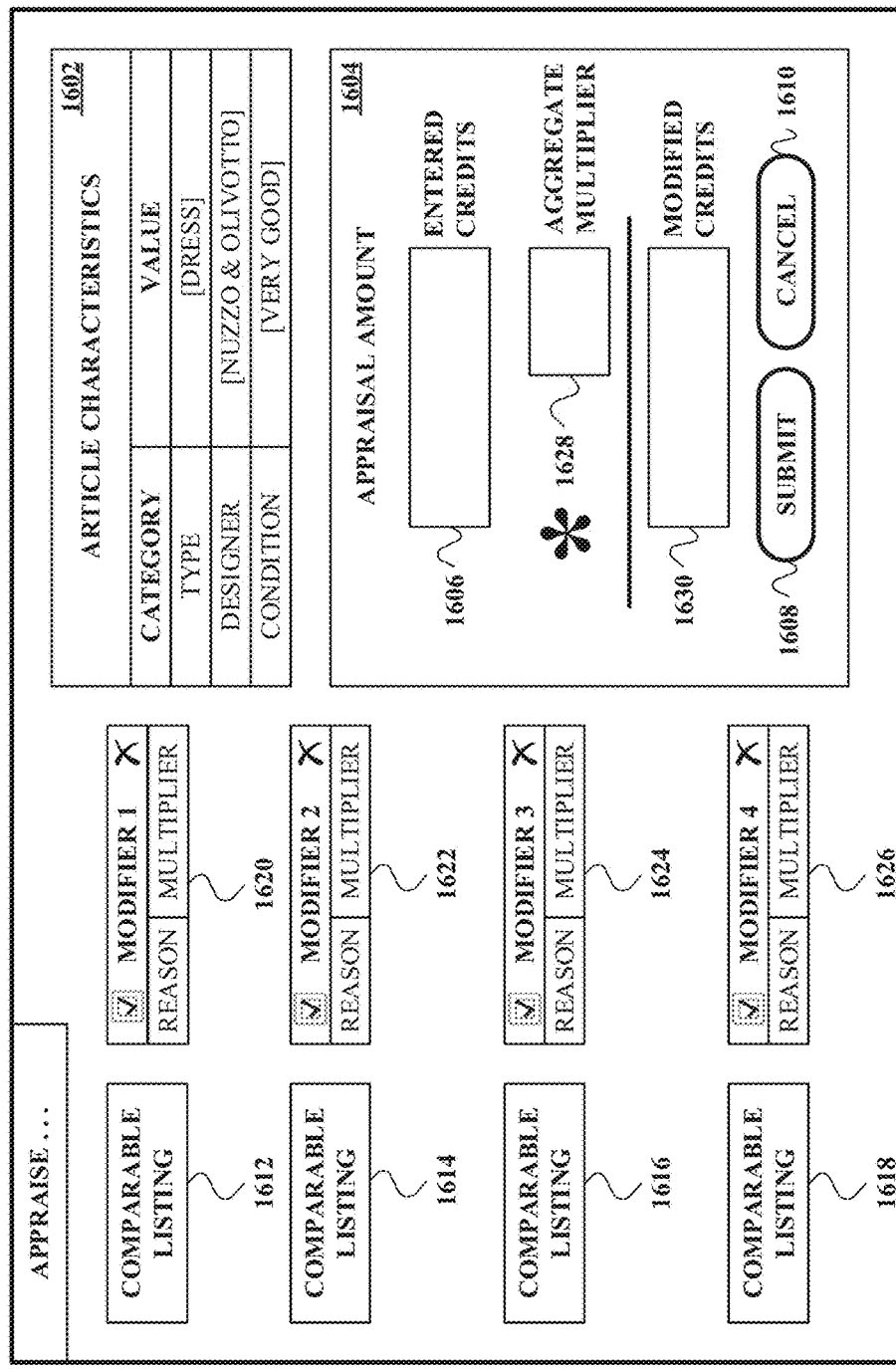
FIG. 16 depicts a sixth example screenshot presented by the e-commerce platform of FIG. 1, in accordance with at least one embodiment.

FIG. 16 depicts a sixth example screenshot presented by the e-commerce platform of FIG. 1, in accordance with at least one embodiment. In at least one embodiment, prior to receiving the respective appraised quantity of platform credit for the respective wearable fashion article via the appraisal-tool user interface, the e-commerce platform 104 presents one or more candidate appraisal-modification values via the appraisal-tool user interface. In the example screenshot 1600, four such candidate appraisal-modification values are depicted at 1620, 1622, 1624, and 1626.

In the depicted embodiment, each such candidate appraisal-modification value includes a selectable checkbox, a selectable Remove icon, a Reason field, and a Multiplier field. With respect to each particular candidate appraisal-modification value, the Reason field may include a textual explanation for the application (or at least possible application) of the given candidate appraisal-modification value. As examples, various respective Reason fields could include text such as "Designer Premium," "Condition Bonus," and/or the like. Moreover, the Multiplier field may contain a numerical multiplier (e.g., 1.05) or a textual and/or symbolic equivalent thereof (e.g., "+5%," "Add 5%," "Subtract 10%," and/or the like). The selectable checkbox, when selected, may indicate that the particular checked candidate appraisal-modification value is currently designated as being applied to the current appraisal, whereas the checkbox being not selected may indicate that the particular checked candidate appraisal-modification value is not currently designated as being applied to the current appraisal. Moreover, when actuated, the Remove icon may delete that particular candidate appraisal-modification value from consideration for being applied to the current appraisal; and certainly, as is known in the art, an "Undo" function could be made available to an appraisal user. Moreover, when deleted, a given candidate appraisal-modification value could be replaced by another, or not, depending on the implementation. And certainly other possible implementations could be listed here as well.

Furthermore, the appraisal-entry display element 1604 of FIG. 16 is different than both the appraisal-entry display element 1404 of FIG. 14 and the appraisal-entry display element 1504 of FIG. 15 in that the appraisal-entry display element 1604 includes not only an Entered Credits field 1606 where an appraisal user could enter an initial appraised amount of platform credits, a Submit button 1608, and a Cancel button 1610, but the appraisal-entry display element 1604 further includes an Aggregate Multiplier field 1628 and a Modified Credits field 1630. In the depicted embodiment, the Aggregate Multiplier field 1628 contains the sum of the various selected candidate appraisal-modification values, while the Modified Credits field contains the product of the Entered Credits field 1606 and the Aggregate Multiplier field 1628.

In the embodiments depicted in FIG. 14 and FIG. 15, whatever the appraisal user enters in the respective Platform Credits field 1406 or Platform Credits field 1506 is what gets submitted to the e-commerce platform 104 as the appraised quantity of platform credit for that respective fashion article. By contrast, in the embodiment depicted in FIG. 16, it is the value contained in the Modified Credits field 1630 that gets submitted to the e-commerce platform 104 as the appraised quantity of platform credit for that respective fashion article. And certainly numerous other example implementations could be depicted and described herein.

In at least one embodiment, the e-commerce platform 104 uses the received set of article-characteristic data to identify one or more of the candidate appraisal-modification values. Thus, the respective set of article-characteristic data for the respective wearable fashion article may include respective article-attribute data specifying one or more attributes of the respective wearable fashion article, and the e-commerce platform 104 may use that article-attribute data to identify one or more of the candidate appraisal-modification values that the e-commerce platform 104 displays to the appraisal user as described herein. As examples, the e-commerce platform 104 may store certain system parameters that associate various candidate appraisal-modification values with various article types, article designers, article colors, article details, article materials, article prints, article seasons, article silhouettes, and the like. In at least one embodiment, an article silhouette refers to the outline or shape of the article, somewhat akin to the shadow that the article would cast on a wall; some example designations of silhouettes with respect to sleeves as an example are ¾ sleeves, batwing sleeves, and butterfly sleeves, though certainly numerous others could be listed here, as could numerous examples of silhouettes of various other articles or parts of articles, as sleeves (e.g., of a blouse) are mentioned here by way of example only and not limitation. And when such article attributes are specified by the received set of article-characteristic data, the e-commerce platform 104 may use those specified values as keys into its database to retrieve one or more candidate appraisal-modification values for display and potential selection via the appraisal-tool user interface. Moreover, one or more such article attributes could be specified in—and parsed from—one or more free-text narratives regarding the corresponding fashion article, as described above. In at least one embodiment, a given attribute of a given fashion article may restrict the candidate modifiers that the e-commerce platform 104 may select for presentation via the appraisal-tool user interface. As but one example, if a given article is associated with a given designer that only produces leather fashion articles, it would not make sense for the e-commerce platform 104 to present "<material>=leather" as a candidate appraisal-modification value for articles produced by that designer. And certainly numerous other example implementations could be listed here.

Moreover, as described herein, the respective set of article-characteristic data for the respective wearable fashion article may include a respective article-type indication. In at least some such embodiments, the e-commerce platform 104 uses the respective article-type indication to identify an article-type-specific set of attributes, and then parses a received free-text narrative to identify one or more attributes of the respective wearable fashion article that are attributes in the identified article-type-specific set of attributes. As an example, if the respective set of article-characteristic data includes an article-type indication that specifies that the corresponding fashion article is of type [DRESS], the e-commerce platform 104 may access a stored database in which a certain set of attributes is stored as corresponding to the article type being equal to [DRESS]. The e-commerce platform 104 would then only consider words and phrases in the user-provided free-text narrative to be specified attributes of the corresponding fashion article if those words and phrases matched entries on that retrieved article-type-specific set of attributes. And certainly other possible implementations could be listed here as well.

Moreover, as also described herein, the respective set of article-characteristic data for the respective wearable fashion article may include a respective article-designer indication. In at least some such embodiments, the e-commerce platform 104 uses the respective article-designer indication to identify an article-designer-specific set of attributes, and then parses a received free-text narrative to identify one or more attributes of the respective wearable fashion article that are attributes in the identified article-designer-specific set of attributes. As an example, if the respective set of article-characteristic data includes an article-designer indication that specifies that the designer of the corresponding fashion article is [NUZZO & OLIVOTTO], the e-commerce platform 104 may access a stored database in which a certain set of attributes is stored as corresponding to the article designer being equal to [NUZZO & OLIVOTTO]. The e-commerce platform 104 would then only consider words and phrases in the user-provided free-text narrative to be specified attributes of the corresponding fashion article if those words and phrases matched entries on that retrieved article-designer-specific set of attributes. And certainly other possible implementations could be listed here as well.

Moving on to other possible embodiments with respect to the various different ways in which the e-commerce platform 104 could carry out step 1304: in at least one embodiment, the e-commerce platform 104 (i) uses the received set of article-characteristic data to identify a base appraisal amount of platform credit for the respective wearable fashion article, (ii) selects one or more appraisal-modification values for the respective wearable fashion article, and (iii) determines the respective appraised quantity of platform credit for the respective wearable fashion article to be the identified base appraisal amount of platform credit as modified by the one or more selected appraisal-modification values.

In at least one embodiment, the respective set of article-characteristic data for the respective wearable fashion article includes a respective article-type indication, a respective article-designer indication, and a respective article-condition indication, and using the respective set of article-characteristic data to identify the base appraisal amount of platform credit for the respective wearable fashion article includes using the respective article-type indication, the respective article-designer indication, and the respective article-condition indication to identify the base appraisal amount of platform credit for the respective wearable fashion article. In at least one such embodiment, the respective set of article-characteristic data for the respective wearable fashion article further includes a respective article-subtype indication, and using the respective set of article-characteristic data to identify the base appraisal amount of platform credit for the respective wearable fashion article further includes using the respective article-subtype indication to identify the base appraisal amount of platform credit for the respective wearable fashion article.

Regardless of which article characteristics are used by the e-commerce platform 104 to identify the base appraisal amount of platform credit, the e-commerce platform 104 could do this in a number of different ways. As one example, the e-commerce platform 104 could present these article characteristics via an appraisal-tool user interface and then receive the base appraisal amount via the appraisal-tool user interface in a manner similar to the manner in which the actual appraisal amount is described as being received by the e-commerce platform 104 in connection with the example that is depicted in FIG. 14. As another example, the e-commerce platform 104 could do a database lookup of all (or some number of recent) past appraisals having matching values with respect to a particular set of article characteristics (e.g., type, subtype, designer, and condition), and could then perform an averaging calculation of those retrieved appraised values to arrive at the base appraisal amount of platform credit for the respective wearable fashion article that is currently being appraised by the e-commerce platform 104. And certainly numerous other example implementations could be listed here.

In addition to there being a number of different ways that the e-commerce platform 104 could identify the base appraisal amount of platform credit for the respective wearable fashion article that is currently being appraised, there are also a number of ways that the e-commerce platform 104 could select the one or more appraisal-modification values that the e-commerce platform 104 uses in some embodiments to modify the identified base appraisal amount in order to determine the appraised quantity of platform credit for the respective wearable fashion article.

In some embodiments, the e-commerce platform 104 receives appraisal-modification-selection user input via an appraisal-tool user interface, where the received appraisal-modification-selection user input specifies the one or more selected appraisal-modification values. Indeed, in a manner that is similar to what is depicted in and described above in connection with FIG. 16, the e-commerce platform 104 may (i) identify one or more candidate appraisal-modification values for the respective wearable fashion article and (ii) present the one or more identified candidate appraisal-modification values via the appraisal-tool user interface; in such an embodiment, the appraisal-modification-selection user input specifies the one or more selected appraisal-modification values from among the one or more presented candidate appraisal-modification values. As described above, the identification of the candidate appraisal-modification values to present via the appraisal-tool user interface could be conducted based on data that specifies one or more attributes of the particular fashion article that is being appraised. In some embodiments, this data is received at least in part in one or more free-text narratives that describe the article.

Figure 17:
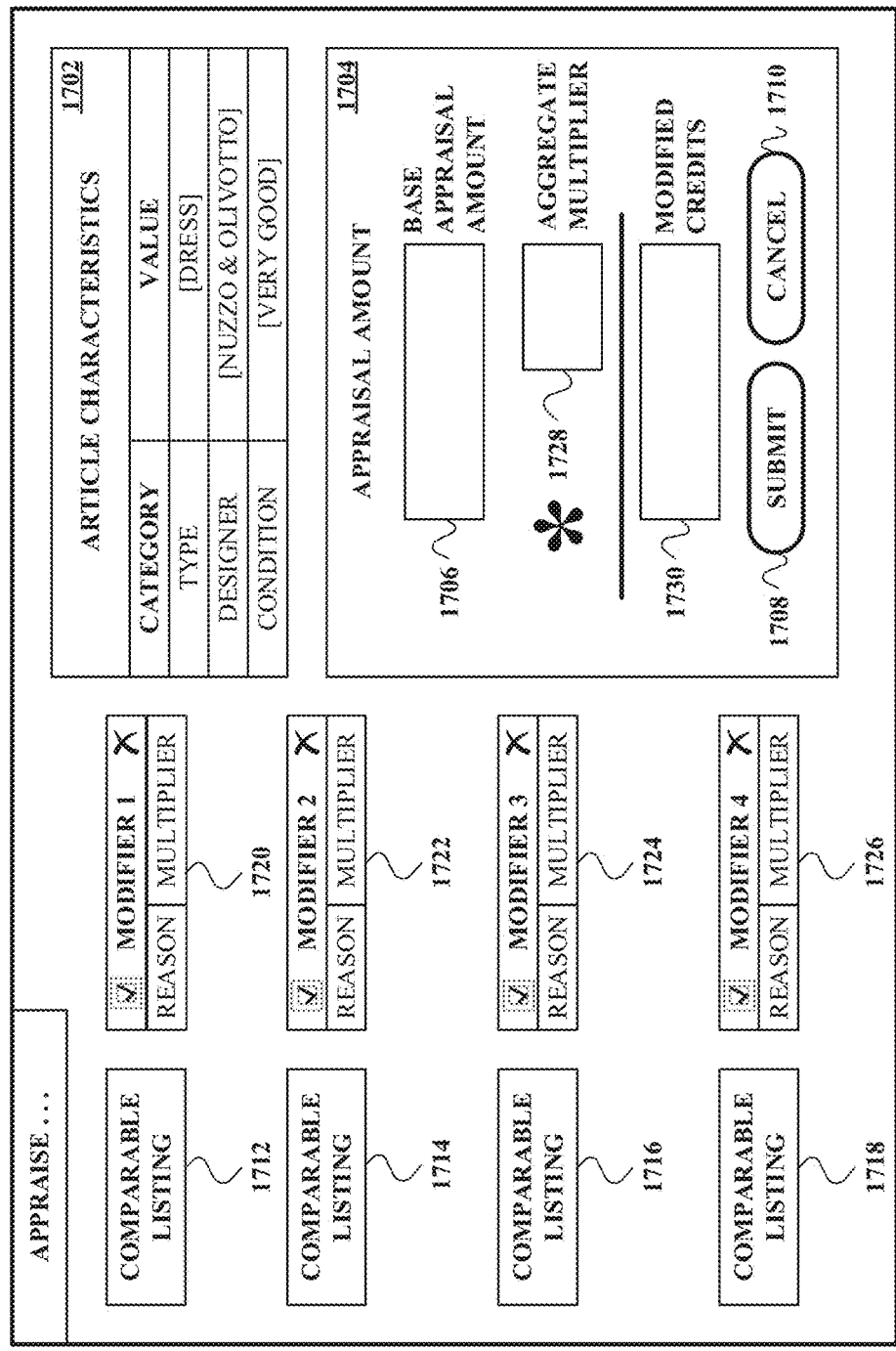
FIG. 17 depicts a seventh example screenshot presented by the e-commerce platform of FIG. 1, in accordance with at least one embodiment.

FIG. 17 depicts a seventh example screenshot presented by the e-commerce platform of FIG. 1, in accordance with at least one embodiment. In particular, FIG. 17 shows an example screenshot 1700 that illustrates an example embodiment that involves determination by the e-commerce platform 104 of a base appraisal amount, as well as presentation by the e-commerce platform 104 of several identified candidate appraisal-modification values that are then selectable via the appraisal-tool user interface for application to (i.e., modification of) that determined base appraisal amount of platform credits. Furthermore, it is noted that, in at least one embodiment, the determined base appraisal amount of platform credits is referred to as a predicted amount of platform credits, a predicted appraisal amount, and/or the like. It can be seen by inspection that the example screenshot 1700 of FIG. 17 is quite similar to the example screenshot 1600 of FIG. 16, other than the Entered Credits field 1606 having been replaced by a Base Appraisal Amount field 1706. As such, the common aspects of the two example screenshots are not redundantly described herein. And it is further noted that this similarity of the two example screenshots 1600 and 1700 is provided for illustration purposes only and not by way of limitation.

Figure 18:
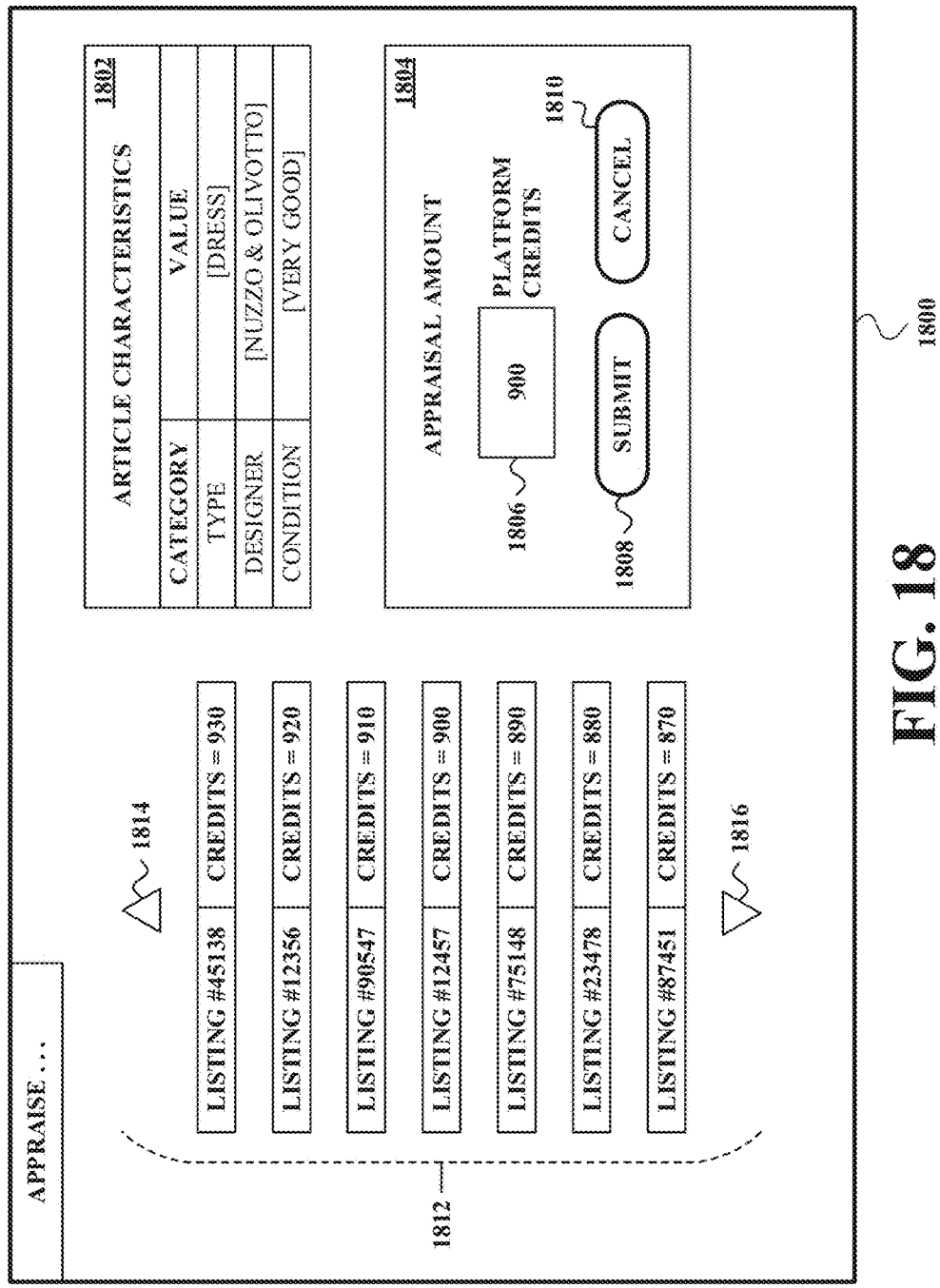
FIG. 18 depicts an eighth example screenshot presented by the e-commerce platform of FIG. 1, in accordance with at least one embodiment.

FIG. 18 depicts an eighth example screenshot presented by the e-commerce platform of FIG. 1, in accordance with at least one embodiment. In particular, FIG. 18 shows an example screenshot 1800 that illustrates a further example embodiment of a possible appearance of an appraisal-tool user interface that could be presented by the e-commerce platform 104. Similar to the example screenshot 1700, the example screenshot 1800 includes an article-characteristics display element 1802 showing article type, designer, and condition, and further includes an appraisal-amount display element 1804 having a Platform Credits field 1806, a Submit button 1808, and a Cancel button 1810. In an embodiment, the Platform Credits field is a free-text data field into which numerical amounts can be entered, and is also a dynamically displayed data field that responds to user manipulation of certain other user-interface elements, as explained below.

The example screenshot 1800 further includes a comparable-listing display region 1812, a scroll-up arrow 1814, and a scroll-down arrow 1816. In between the scroll-up arrow 1814 and the scroll-down arrow 1816, seven comparable listings are displayed by way of example, as certainly any number of comparable listings could be displayed. In at least one embodiment, the e-commerce platform 104 selected listings having matching or at least comparable attributes along dimensions such as article type, designer, and condition. Moreover, in at least one embodiment, the e-commerce platform 104 maintains its database of listings (e.g., previously appraised, previously listed and sold, presently listed, and/or the like) in a manner that is indexed at least by the amount at which the corresponding articles were appraised.

Moreover, in at least one embodiment, including the embodiment that is depicted in and described in connection with FIGS. 18-20, the set of comparable listing that are displayed in the comparable-listing display region 1812 and the amount of platform credits that is currently displayed in the Platform Credits field 1806 are dynamically codependent on one another. For starters, it can be seen that, in the example screenshot 1800, the amount of 900 credits is presently displayed in the Platform Credits field 1806, and that same amount (900 credits) corresponds to the most centrally displayed example listing that is presently displayed in the comparable-listing display region 1812. Moreover, it is noted that the five-digit listing numbers that are shown in FIGS. 18-20 are arbitrarily chosen and carry no specific significance other than as shorthand that each such listing is for a different article than each other such listing.

Figure 19:
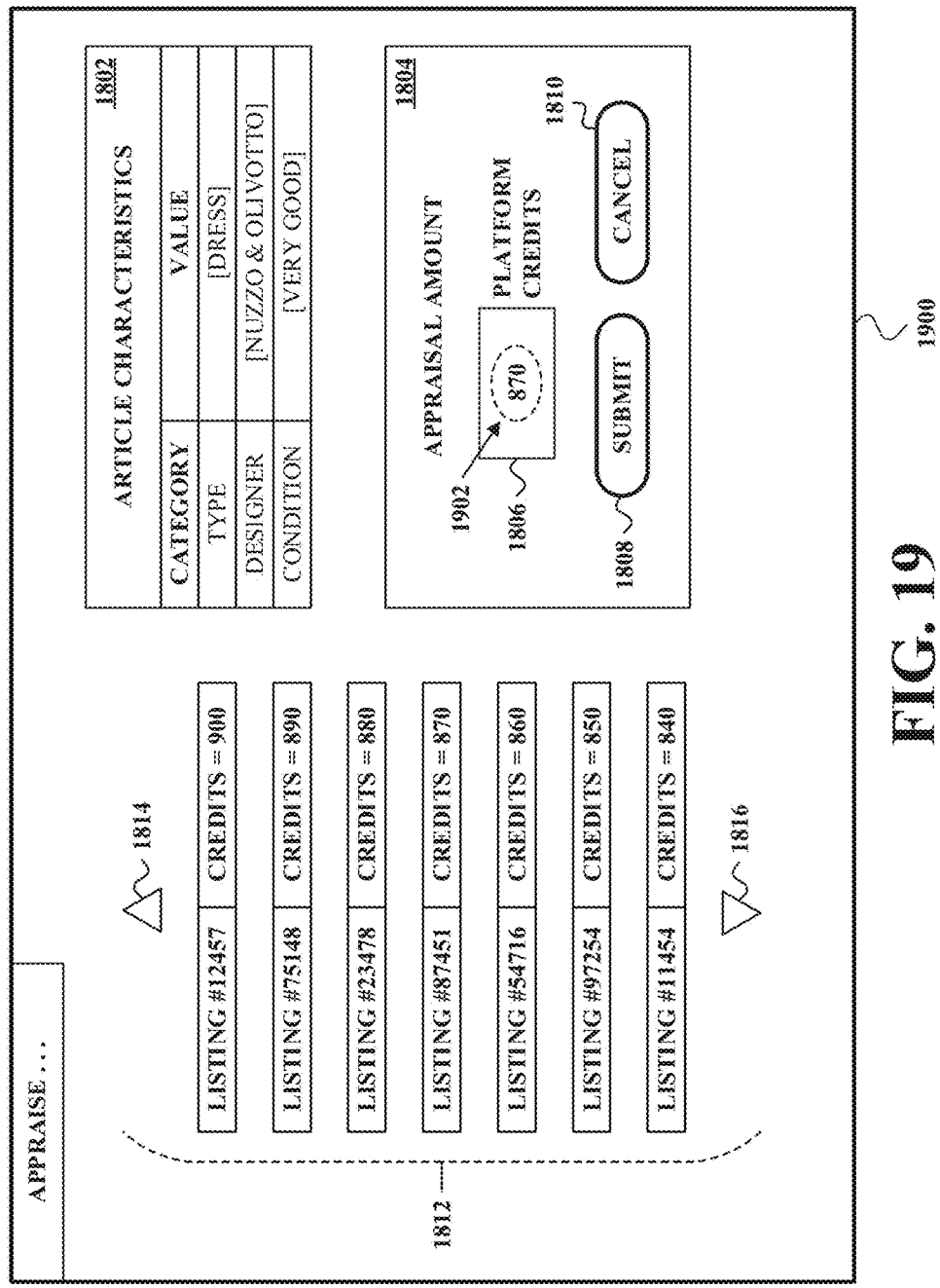
FIG. 19 depicts a ninth example screenshot presented by the e-commerce platform of FIG. 1, in accordance with at least one embodiment.

FIG. 19 depicts a ninth example screenshot presented by the e-commerce platform of FIG. 1, in accordance with at least one embodiment. Continuing the discussion from the above description of FIG. 18, FIG. 19 shows an example screenshot 1900 showing how the example screenshot 1800 changes in at least one embodiment if the amount of credits is changed in the Platform Credits field from 900 to 870, as highlighted in FIG. 19 at 1902. It can be seen that the set of listings displayed in the comparable-listing display region 1812 has dynamically scrolled to now be centered on a comparable listing having a matching previous-appraisal amount of 870 credits. As such, the appraisal-tool user interface that is presented by the present e-commerce platform 104 enhances the accuracy of the appraisal process and the protection and promotion of well-tuned relative appraised and listed values of the corresponding fashion articles.

Figure 20:
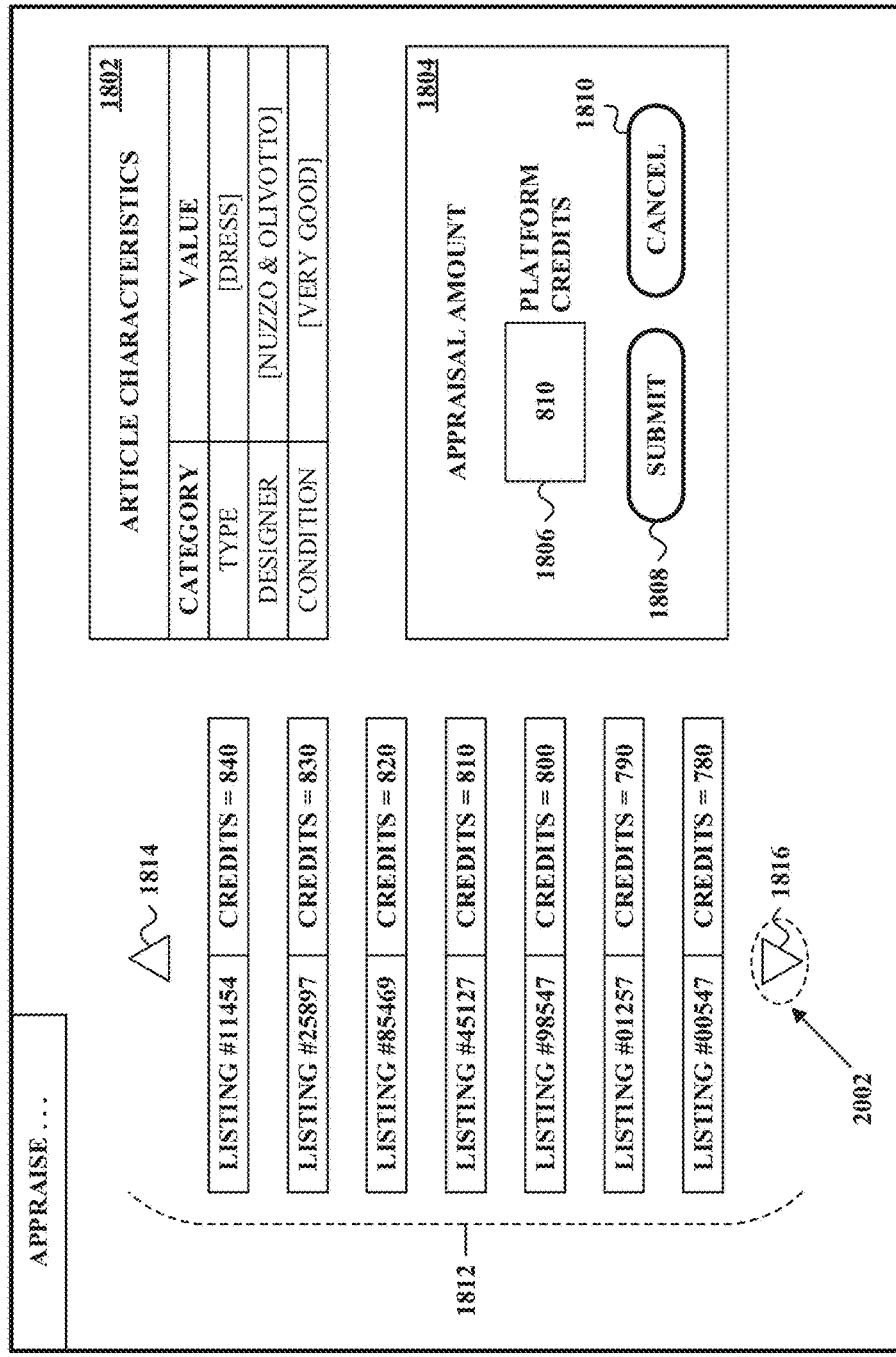
FIG. 20 depicts a tenth example screenshot presented by the e-commerce platform of FIG. 1, in accordance with at least one embodiment.

FIG. 20 depicts a tenth example screenshot presented by the e-commerce platform of FIG. 1, in accordance with at least one embodiment. Continuing the above discussion, FIG. 20 shows an example screenshot 2000 showing how the example screenshot 1900 changes in at least one embodiment responsive to actuation (e.g., clicking) via the user interface of the scroll-down arrow 1816, as highlighted in FIG. 20 at 2002. It can be seen that this actuation had at least two effects: first, the set of listings displayed in the comparable-listing display region 1812 has dynamically scrolled down in a "page down" fashion to then be centered on a comparable listing having a matching previous-appraisal amount of 810 credits; second, the amount of credits presently displayed in the Platform Credits field 1806 has been dynamically updated by the e-commerce platform 104 to then display that same number of credits (i.e., 810 credits) as the center-most-displayed listing in the comparable-listing display region 1812.

As such, it can be seen that, in at least one embodiment, a dynamically codependent relationship is provided by the e-commerce platform 104 between the Platform Credits field 1806 and the comparable-listing display region 1812, enhancing the ability of a user of the appraisal-tool user interface presented by the e-commerce platform 104 to achieve appraisal of fashion articles that remain in line with past appraisals of similar fashion articles, thus protecting and promoting the consistent relative-value relationships across the fashion articles listed in the browseable and searchable online catalog provided by the e-commerce platform 104 in accordance with the present methods and systems. And certainly numerous other implementation examples could be listed here as well. Moreover, those of skill in the art will understand that the vertically scrolling, number-line-like example of the comparable-listing display region 1812 that is depicted in and described herein in connection with FIGS. 18-20 is presented purely by way of example, and that other arrangements (e.g., horizontally scrolling displays) could be used as well.

Moreover, in at least one embodiment, the e-commerce platform 104 is equipped, programmed, and configured to handle situations in which various users decide for whatever reason to relist a fashion article that had previously been appraised and perhaps even listed in the online catalog of the e-commerce platform 104. This situation may arise when, for example, a first user of the e-commerce platform 104 acquires a fashion article that had been submitted for appraisal and then listed by a second user of the e-commerce platform 104. Thereafter, the first user may decide that they would like to acquire something else from the online catalog of the e-commerce platform 104, and therefore the first user decides to relist that particular fashion article in the online catalog, and accordingly submits to the e-commerce platform 104 a fashion-article-listing request associated with that particular fashion article. It may also occur that a given user may submit the same article for appraisal a number of times, perhaps hoping each time to get a more favorable appraisal then the one or more appraisals that had already been done for that fashion article. And certainly other example article-relisting scenarios could be described here.

In at least one embodiment, the e-commerce platform 104 carries out step 1304 at least in part by determining that the associated fashion-article-listing request is a fashion-article-relisting request, and responsively applying a depreciation schedule to a previous appraisal amount from a previous appraisal of the respective wearable fashion article to determine the respective appraised quantity of platform credit for the respective wearable fashion article. This approach may be appropriate, among other times, in instances where the listing user had previously acquired the given fashion article from another user of the e-commerce platform 104. In that case, the previous appraisal amount may be discounted by the e-commerce platform 104 due to factors such as the passage of time, a change in article condition, and/or one or more other factors.

In at least one embodiment, the e-commerce platform 104 determines that the associated fashion-article-listing request is a fashion-article-relisting request at least in part by (i) presenting posting-history data associated with the respective user account via the appraisal-tool user interface and (ii) receiving a relisting input via the appraisal-tool user interface, and responsively determining that the associated fashion-article-listing request is a fashion-article-relisting request. Thus, a presentation via an appraisal-tool user interface of a given user's appraisal-request history would show whether the current article being submitted for appraisal is of the same (or substantially similar) type, designer, etc. as previous appraisal submissions, thus indicating an increased likelihood that this is a duplicate listing of an article by the same user.

In at least one embodiment in which the e-commerce platform 104 applies a depreciation schedule to a previous appraisal amount of a given fashion article, doing so involves (i) identifying one or more percentage-based multipliers based on the depreciation schedule and (ii) applying the one or more identified percentage-based multipliers to the previous appraisal amount. As an example, the e-commerce platform 104 may identify that, between the previous appraisal and the current appraisal, the condition of the particular fashion article has changed from [VERY GOOD] to [GOOD]. The e-commerce platform 104 may reference a stored data table that indicates that a change in condition between those two values is associated with a 10% depreciation in appraisal amount, and may accordingly apply that 10% depreciation to the previous appraisal amount as part of deriving the current appraisal amount. And certainly numerous other examples could be listed.

As a general matter, in at least one embodiment in which the e-commerce platform 104 applies a depreciation schedule to a previous appraisal amount as at least part of deriving a current appraisal amount, that depreciation schedule is based on a set of one or more depreciation factors. In at least one embodiment, that set of depreciation factors includes an elapsed time since the respective wearable fashion article was most recently acquired from the online catalog. Thus, the e-commerce platform 104 may store different depreciation values (e.g., 5%, 10%, 15%, and/or the like) in respective association with various different time periods since the respective wearable fashion article was most recently acquired from the online catalog. Less than 30 days might correspond with no depreciation. Between 30 and 60 days might correspond with a depreciation value of 5%. Between 60 and 120 days might correspond with a depreciation value of 10%. And certainly numerous other possible examples could be listed here.

In at least one embodiment, the set of depreciation factors further includes a comparison of a current condition of the respective wearable fashion article with a previous condition of the respective wearable fashion article. That is, in some embodiments, the e-commerce platform 104 identifies a time lapse since the prior appraisal and identifies a first depreciation value based on that, and also identifies a condition change since the prior appraisal and identifies a second depreciation value based on that, and then proceeds to apply both the first and second depreciation values to the prior appraisal value when deriving the current appraisal value.

In some embodiments, when considering a change in article condition, rather than referencing a condition of the respective wearable fashion article at a time of the previous appraisal, the e-commerce platform 104 references a condition of the respective wearable fashion article a time that the respective fashion article was most recently acquired from the online catalog. And certainly numerous other possible implementations could be listed.

In some embodiments, rather than separately considering both a passage of time and a change in condition and applying a respective separate (i.e., independent) depreciation value based on each, the e-commerce platform 104 makes what is referred to herein as a time-lapse-dependent comparison of the current condition of the fashion article and the condition of the fashion article at a previous time. Thus, the e-commerce platform 104 may determine both the elapsed amount of time and the condition change, but may then reference a single table that correlates both pieces of data with a single depreciation value. Some examples could include: no condition change within 30 days correlates with 0% depreciation, condition change of one level (e.g., from [VERY GOOD] to [GOOD]) within 30 days correlates with 5% depreciation, condition change of one level between 30 and 60 days correlates with 10% depreciation, and so on. Certainly it is the case that numerous other possible implementations could be listed here.

In some embodiments, the e-commerce platform 104 conducts what is referred to herein as a designer-dependent comparison of the current condition of the fashion article to the condition of the fashion article at a previous time. In other words, the e-commerce platform 104 may maintain multiple depreciation-schedule data tables of any of the kinds described herein or of any other kinds deemed suitable by those of skill in the relevant art for a given implementation, where each of the multiple depreciation-schedule data tables is respectively associated with a given fashion-article designer. The e-commerce platform 104 may then use a provided article-designer indication to identify the appropriate depreciation-schedule data table, and then proceed to reference that identified designer-specific depreciation-schedule data table when determining a depreciation value to apply to a prior appraisal of the fashion article. If that designer-specific table were a time-lapse-dependent table such as that described in the preceding paragraph, the resulting comparison would amount to a designer-specific time-lapse-dependent comparison of a condition change of a given fashion article when determining a current appraisal amount of platform credit. Moreover, it is noted that this description of a designer-dependent comparison of the current condition of a fashion article to the condition of the fashion article at a previous time is presented by way of example, and that other attribute-dependent (e.g., article-type-dependent and/or one or more others) condition-change comparisons could be implemented in various different instances. In at least one embodiment, the e-commerce platform 104 makes one or more of a time-lapse-dependent comparison, a designer-dependent comparison, and an item-type-dependent comparison of the current condition of a fashion article to the condition of the fashion article at a previous time. In at least one embodiment, the set of depreciation factors that is implemented (i.e., considered) by the e-commerce platform 104 includes one or more of an elapsed time, a condition change, an item type of the respective wearable fashion article, and a designer of the respective wearable fashion article.

And certainly other implementations could be listed here. Furthermore, it will be apparent to those in the relevant art that any description of multiple data tables is purely by way of example and illustration, and that logically equivalent implementations involving, for example, a single large data table could be utilized as well in various different embodiments.

In addition to listing fashion articles in the online catalog of the e-commerce platform 104 and using platform credits to acquire listed (and appraised) fashion articles by way of the e-commerce platform 104, it is also the case that, from time to time, various users may acquire various fashion articles by way of monetary transactions with brick-and-mortar retail locations and/or e-commerce websites. A further set of aspects of the present disclosure involves systems and methods of integrating the e-commerce platform 104 with point-of-sale transactions, which as stated could occur at retail stores, online, and/or by some other mode of transaction. The ensuing portion of the present disclosure describes aspects of this integration.

Figure 21:
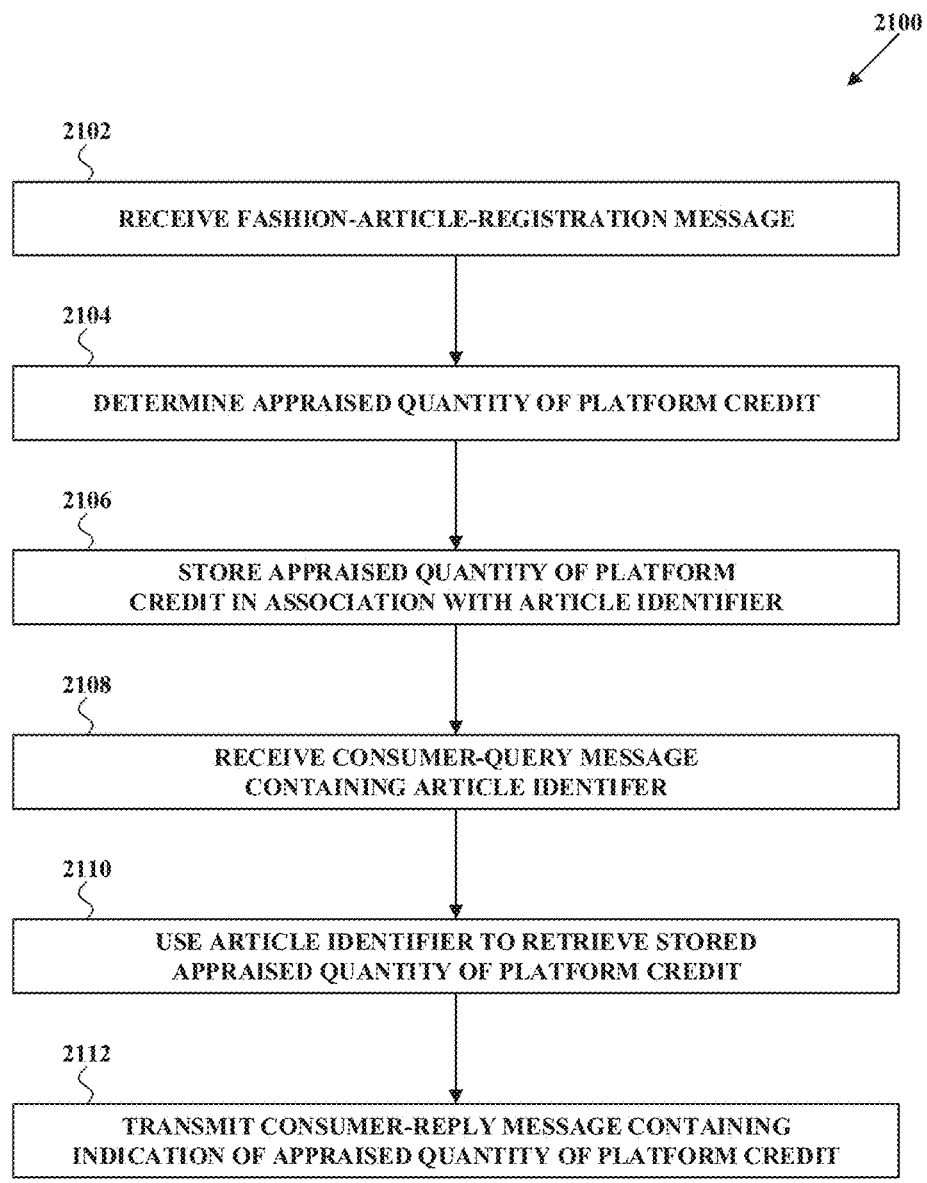
FIG. 21 depicts a third example method, in accordance with at least one embodiment.

FIG. 21 depicts a third example method, in accordance with at least one embodiment. In particular, FIG. 21 depicts an example method 2100 that may be carried out by the e-commerce platform 104 in accordance with the above mentioned integration of the e-commerce platform 104 with one or more point-of-sale systems associated with one or more respective brick-and-mortar and/or online merchants. As shown in FIG. 21, the method 2100 includes steps 2102, 2104, 2106, 2108, 2110, and 2112, each of which are described in turn below. Moreover, for clarity and simplicity of presentation, the steps of the method 2100 are described below in the context of a single example; it will be understood, however, that the method 2100 can be carried out repeatedly by the e-commerce platform 104 with respect to numerous fashion articles.

At step 2102, the e-commerce platform 104 receives a fashion-article-registration message that includes an article identifier and a set of article-characteristic data that both correspond to a particular wearable fashion article. In at least one embodiment, the e-commerce platform 104 receives the fashion-article-registration message from a merchant system such as the merchant server 120 or the merchant server 122 of FIG. 1. Moreover, it is noted that, as used herein, and unless context clearly dictates otherwise, a merchant (i.e., a merchant location, a merchant server, a merchant system, a merchant website, and/or the like) could refer to a third-party merchant, an entity associated with (e.g., that operates) the e-commerce platform 104, or any other merchant that suitably pertains to a given implementation or context.

In at least one embodiment, the received article identifier is a bar code. In other examples, the received article identifier is a QR code, a UPC, or the like. Furthermore, it will be understood that the disclosure that the article identifier could be or include a bar code, QR code, UPC, and/or the like is a disclosure that the received article identifier could be a transmitted data value indicative of the data that is encoded by one or more such identifiers. In an embodiment, a merchant uses a smart phone or similar CCD to scan a bar code, QR code, or the like using an app that is associated with (e.g., provided by) the e-commerce platform 104, and this app responsively transmits a corresponding fashion-article-registration message to the e-commerce platform 104. And certainly numerous other example implementations could be listed here.

Moreover, the received set of article-characteristic data could take any form deemed suitable by those having skill in the art for a given implementation, including but not limited to any of the forms described herein. In one example, the received set of article-characteristic data includes an article-type indication, an article-designer indication, and an article-condition indication. In other embodiments, the article condition is assumed to be [NEW WITH TAGS]. In at least one embodiment, the e-commerce platform 104 receives the article identifier and uses that article identifier to retrieve the set of article-characteristic data from one or more databases. And certainly numerous other possible implementations could be listed here as well.

At step 2104, the e-commerce platform 104 uses the set of article-characteristic data that was received at step 2102 to determine an appraised quantity of platform credit for the corresponding fashion article. In carrying out step 2104, the e-commerce platform 104 may use any technique deemed suitable by those having skill in the relevant art for a given implementation, including any of the techniques disclosed herein in connection with step 704 of the example method 700 of FIG. 7 and/or step 1304 of the example method 1300 of FIG. 13.

At step 2106, the e-commerce platform 104 stores the appraised quantity of platform credit that was determined at step 2104 in association with the article identifier that was received at step 2102. The e-commerce platform 104 may carry out step 2106 using any non-transitory data-storage technology deemed suitable by those having skill in the art for a given implementation.

At step 2108, the e-commerce platform 104 receives a consumer-query message from a consumer device, where the received consumer-query message includes the same article identifier that the e-commerce platform 104 received at step 2102 (i.e., the consumer-query message contains an article identifier that matches the article identifier that the e-commerce platform 104 received at step 2102). This could occur as a result of a shopper clicking on a link on a merchant's website, where that link is associated with the e-commerce platform 104.

As another possibility, a shopper could use a smart-phone app on their own device or a merchant-provided device (e.g., a kiosk, a bar-code scanner, a QR-code scanner, a cell phone, a smart phone, a tablet, and/or the like) at a brick-and-mortar retail location. And certainly numerous other possible implementations could be listed here as well. In at least one embodiment, responsive to receiving the consumer-query message at step 2108, the e-commerce platform 104 carries out the below-described steps 2110 and 2112.

At step 2110, the e-commerce platform 104 uses the article identifier from the received consumer-query message to retrieve the appraised quantity of platform credit for the corresponding fashion article that was stored at step 2106. At step 2112, the e-commerce platform 104 transmits a consumer-reply message to the consumer device from which the e-commerce platform 104 received the consumer-query message at step 2108. In at least one embodiment, the transmitted consumer-reply message includes (an indication of) the appraised quantity of platform credit for the corresponding fashion articles that was retrieved at step 2110.

In at least one embodiment, that appraised quantity of platform credit corresponds, according to a platform-credit-and-currency exchange rate, with a predetermined percentage of a monetary retail price being charged (e.g., by the merchant) for the corresponding fashion article. As an example, in an embodiment in which each platform credit is valued at one retail dollar, and assuming that the fashion article in question retails for $1000.00, and further assuming that the predetermined percentage was 80%, the appraised quantity of platform credit for the given article would be 800 platform credits. And certainly numerous other examples could be listed at various different exchange rates, predetermined percentages, and/or retail prices. Thus, upon receiving the consumer-reply message at the consumer device, the example shopper may be more likely to buy the fashion article for the $1000.00 with the comfort and knowledge that they could list that very article on the online catalog of the e-commerce platform 104 for 80% of its retail value. In various embodiments, the e-commerce platform 104 may put time and condition-change limitations on the relisting appraisal value of the article, some examples of which are explained above.

Relatedly, in at least one embodiment, the consumer-reply message that the e-commerce platform 104 transmits to the consumer device at step 2112 includes an indication of a post-purchase time period for which the respective retrieved appraised quantity of platform credit will be awarded (perhaps assuming no condition change) for listing the corresponding fashion article in the online catalog of the e-commerce platform 104. In various different embodiments, this post-purchase time period may have duration values such as one week, two weeks, thirty days, one month, and/or the like. And certainly numerous other implementation examples could be listed. Moreover, in some embodiments, the consumer-reply message that the e-commerce platform 104 transmits to the consumer device at step 2112 includes an indication of one or more post-purchase time periods during which various different amounts of platform credit would be awarded for listing the item in the event that certain different degrees of condition change had occurred. And certainly numerous other example implementations could be listed here as well. In general, the consumer-reply message could include a depreciation schedule; in other instances, a depreciation schedule may be posted in association with a given article in a store or on a website. Any such depreciation schedule could reflect different appraisal amounts that would be awarded by the e-commerce platform 104 in various different combinations of the passage of time and various different changes in condition of the article. Such information could be based on item-type-specific depreciation data, article-designer-specific depreciation data, and/or depreciation data that is specifically tailored to any one or more attributes of a given fashion article. And certainly numerous other examples could be listed here.

In some instances, perhaps after viewing the consumer-reply message that the e-commerce platform 104 transmits at step 2112, a shopper may go ahead and purchase the associated fashion article (referred to hereinafter as "the purchased article") from the merchant, which as stated could be an online transaction, a brick-and-mortar transaction, and/or any other type of transaction. Furthermore, that shopper is assumed in this example to have an account (referred to hereinafter as "the shopper account") as a user of the e-commerce platform 104.

Either as a programmatic result of the aforementioned transaction or as a result of an affirmative post-transaction action, or perhaps some other possibility, it may occur that what is referred to herein as a consumer-article-acquisition message is transmitted to the e-commerce platform 104, where this message essentially informs the e-commerce platform 104 that the user associated with the shopper account has acquired the purchased article. Some possible implementations that would result in this consumer-article-acquisition message being programmatically sent to the e-commerce platform 104 as a result of the purchase transaction occurring include the merchant's website (via, e.g., an installed widget, plug-in, extension, and/or the like) being integrated with the e-commerce platform 104. Other possibilities include a retail-store's point-of-sale technology (e.g., cash registers, tablets, smart phones, scanners, and/or the like) being equipped, programmed, and configured to be integrated with the e-commerce platform 104, or at least being configured to send the consumer-article-acquisition message to the e-commerce platform 104.

Another possibility would be that the form of payment could serve as a programmatic trigger for the consumer-article-acquisition message to be sent to the e-commerce platform 104. As one example, the shopper account could be associated with a payment account (e.g., a checking account, a credit-card account, an account on a particular payment-facilitation website, a particular payment-facilitation application and/or the like), and when that payment account is used to purchase a given fashion article for which an appraisal has been completed and stored by the e-commerce platform 104, the consumer-article-acquisition message may be programmatically sent to the e-commerce platform 104 by a merchant server, a point-of-sale system, a payment-account server, and/or the like.

In at least one embodiment, the received consumer-article-acquisition message includes (i) a user-account identifier associated with the shopper account and (ii) an article identifier associated with the purchased article, for which a corresponding appraised quantity of platform credit has been determined and stored by the e-commerce platform 104. In at least one embodiment, in response to receiving this consumer-article-acquisition message, the e-commerce platform 104 posts a listable article record associated with the purchased article to the shopper account. As shown in the example screenshot 902 of FIG. 9, the e-commerce platform 104 may present to a given logged-in user a user-interface element such as the My Closet display 924. Clicking on or otherwise selecting this user-interface element may take the user to a page or set of pages where some partial and/or complete article listings may be accessed.

Thus, a user's closet may include listings that have been started but not yet submitted for appraisal, listings that have been appraised but for which the user has not yet agreed to actually list the item on the online catalog, and/or the like.

In some embodiments, the user's closet may further include listings related to articles that the user has recently purchased from one or more merchants. In this case, most of the work would have been automatically done for the user, and the appraised amount of platform credit would have already been determined and displayed, and the user could simply decide whether to actuate the listing of the article on the online catalog with a simple click or similar simple user action. And certainly numerous other possible implementations could be listed.

In some cases, the given wearable fashion article may have been presented on the merchant's website or at the merchant's retail location, as examples, in association with both a monetary price (e.g., the $1000.00 purchase price from an above example) and with the determined corresponding appraised quantity of platform credit (e.g., the 800 platform credits from the same example above). As described above, this dual-price-tag-type presentation may enhance the merchant's sales by making the $1000.00 item seem more like a $200.00 item due to the option to relist the item on the e-commerce platform 104 as described herein. And in cases where the predetermined percentage is higher than 80%, this effect will be even more pronounced. And as also described above, there may be a limited post-purchase time period for which the associated appraised value (e.g., 800 platform credits for the example $1000.00 item) will be awarded (again, perhaps assuming no condition change). In some cases, this post-purchase time period may be presented along with the purchase price and platform appraised value.

If the user associated with the shopper account clicks on a link to go ahead and relist that purchased article on the online catalog, the e-commerce platform 104 may then programmatically receive what is referred to herein as a list-article message that indicates this command from the user. In response to receiving such a list-article message, the e-commerce platform 104 may then list the purchased article in the online catalog as being acquirable for corresponding appraised quantity of platform credit.

It has been described above that, in at least one embodiment, the e-commerce platform 104 is arranged to carry out the example method 2100. Moreover, the e-commerce platform 104 can be arranged in connection with various different embodiments to carry out one, two, or all three of the example methods 700, 1300, and 2100 that are described herein. For example, in an embodiment, the e-commerce platform 104 is equipped, programmed, and configured to carry out both the example method 700 and the example method 2100. In at least one such embodiment, with respect to substantially identical fashion articles, respective appraised quantities of platform credit resulting from received fashion-article-registration messages (i.e., from method 2100) exceed respective appraised quantities of platform credit resulting from received fashion-article-listing requests (i.e., from method 700). And certainly numerous other possible implementations could be listed as well.

First Additional Embodiments (Related to "Systems and Methods for Providing an E-Commerce Platform for Credit-Based Appraisals and Exchanges of Wearable Fashion Articles")

Overview of First Additional Embodiments

Presently disclosed are systems and methods for providing an e-commerce platform for credit-based appraisals and exchanges of wearable fashion articles.

One embodiment takes the form of a method carried out by an e-commerce platform executing stored program instructions. The method includes receiving fashion-article-listing requests that are each associated with a respective user account and that each include a respective set of article-characteristic data that corresponds to a respective wearable fashion article, where each respective user account has a respective platform-credit balance. The method also includes using the respective sets of article-characteristic data to determine respective appraised quantities of platform credit for the respective corresponding wearable fashion articles. The method also includes transmitting fashion-article-listing replies corresponding respectively to the received fashion-article-listing requests, where each transmitted fashion-article-listing reply offers the respective determined appraised quantity of platform credit in exchange for listing the corresponding wearable fashion article in a browseable and searchable online catalog. The method also includes receiving fashion-article-listing acceptances corresponding to at least some of the transmitted fashion-article-listing replies and, for each received fashion-article-listing acceptance, responsively (i) adding the corresponding appraised quantity of platform credit to the respective platform-credit balance of the corresponding user account and (ii) listing the corresponding fashion article in the online catalog as being acquirable for the corresponding appraised quantity of platform credit.

Another embodiment takes the form of an e-commerce platform that includes a communication interface, a processor, and data storage containing instructions executable by the processor for causing the e-commerce platform to carry out a set of functions, where the set of functions includes the method steps that are recited in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the e-commerce platform includes a web server, the respective fashion-article-listing requests include respective HyperText Markup Language (HTML) request messages, the respective fashion-article-listing replies include respective HTML reply messages, and the online catalog includes a web interface.

In at least one embodiment, the received set of article-characteristic data for at least one of the wearable fashion articles includes an article-type indication, an article-designer indication, and an article-condition indication. Such embodiments are referred to for brevity and clarity in the ensuing paragraphs as type-designer-condition embodiments.

In at least one type-designer-condition embodiment, at least one of the article-type indications has a value that is selected from the group consisting of clothing, footwear, dress, top, skirt, belt, pants, shorts, jumpsuit, outerwear, suit, jeans, swimwear, bag, accessory, and jewelry.

In at least one type-designer-condition embodiment, the received set of article-characteristic data for at least one of the wearable fashion articles further includes an article-subtype indication.

In at least one type-designer-condition embodiment, the received set of article-characteristic data for at least one of the wearable fashion articles further includes one or more of an article-size indication, an article-season indication, an article-color indication, an article-material indication, and an article-made-in-location indication.

In at least one type-designer-condition embodiment, the received set of article-characteristic data for at least one of the wearable fashion articles further includes a free-text narrative pertaining to the corresponding wearable fashion article.

In at least one type-designer-condition embodiment, the received set of article-characteristic data for at least one of the wearable fashion articles further includes at least one image of the corresponding fashion article, and the e-commerce platform lists the corresponding fashion article in the online catalog in association with the at least one image of the corresponding fashion article. In at least one such type-designer-condition embodiment, the at least one image of the corresponding fashion article includes at least one authenticating image of the corresponding fashion article.

In at least one type-designer-condition embodiment, at least one of the article-condition indications has a value that is selected from the group consisting of new with tags, new, mint, very good, and vintage.

In at least one embodiment, the method also includes receiving, in connection with respective user accounts, respective monetary payments for respective purchased quantities of platform credit, and adding the respective purchased quantities of platform credit to the respective platform-credit balances of the respective user accounts. Such embodiments are referred to for brevity and clarity in the ensuing paragraphs as purchased-credit embodiments.

In at least one purchased-credit embodiment, the method also includes maintaining a reserve-liquidity monetary account, maintaining a charitable-donations monetary account of funds that are designated for donation to one or more charitable organizations, and dividing each received monetary payment between the reserve-liquidity monetary account and the charitable-donations monetary account according to a predetermined ratio. In at least one such purchased-credit embodiment, the predetermined ratio is 1:1; in at least one other such purchased-credit embodiment, the predetermined ratio is not 1:1.

In at least one such purchased-credit embodiment, the reserve-liquidity monetary account is a monetary account of funds that are designated for a first set of uses that includes purchasing inventory of wearable fashion articles for listing in the online catalog.

In at least one such purchased-credit embodiment, the first set of uses further includes issuing refunds in instances of fraud. In at least one such purchased-credit embodiment, the method also includes adding to the reserve-liquidity monetary account at least a portion of funds collected to enforce purchasing of fraudulently spent platform credit; in another such purchased-credit embodiment, the method includes adding to the reserve-liquidity monetary account all funds collected to enforce purchasing of fraudulently spent platform credit.

In at least one purchased-credit embodiment, the method also includes transferring at least a portion of the funds in the charitable-donations monetary account to one or more charitable organizations. In at least one such purchased-credit embodiment, the method further includes maintaining a plurality of donor user accounts having respective charity-pool-share balances, and receiving donor-user-account-specific charitable-organization data specifying sets of one or more charitable organizations designated by respective different donor user accounts, where transferring at least a portion of the funds in the charitable-donations monetary account to one or more charitable organizations includes apportioning the transferred funds to the charitable organizations specified by the donor-user-account-specific charitable-organization data according to the respective charity-pool-share balances of the respective donor user accounts. In at least one such credit-purchasing embodiment, the respective charity-pool-share balances are determined at least in part by one or more of respective number of donated fashion articles and respective aggregate appraised value of donated fashion articles. In at least one other such purchased-credit embodiment, one or more of the donor user accounts are designated as being parent donor user accounts, one or more of the donor user accounts that are not designated as being parent donor user accounts are designated as being non-parent donor user accounts, a given one of the parent donor user accounts has a bundling association with a given plurality of non-parent donor user accounts, and apportioning the transferred funds to the charitable organizations specified by the donor-user-account-specific charitable-organization data according to the respective charity-pool-share balances of the respective donor user accounts includes apportioning the transferred funds according to an accounting that treats the respective charity-pool-share balances of the bundled non-parent donor user accounts as having been transferred to the charity-pool-share balance of the given parent donor user account.

In at least one embodiment, the respective platform-credit balance of each respective user account is demarcated into a verified-platform-credit balance of verified platform credit and an unverified-platform-credit balance of unverified platform credit, and the e-commerce platform converts given quantities of unverified credit to corresponding quantities of verified credit responsive to detecting occurrence of each and every credit-verifying event in a set of one or more credit-verifying events. Such embodiments are referred to for brevity and clarity in the ensuing paragraphs as verifiable-credit embodiments.

In at least one verifiable-credit embodiment, verified platform credit is redeemable for acquiring one or more fashion articles listed in the online catalog, and unverified credit is not redeemable for acquiring one or more fashion articles listed in the online catalog.

In at least one verifiable-credit embodiment, verified platform credit is redeemable for acquiring one or more fashion articles listed in the online catalog without creating a corresponding credit debt, and unverified platform credit is redeemable for acquiring one or more fashion articles listed in the online catalog with creation of a corresponding credit debt.

In at least one verifiable-credit embodiment, the method also includes receiving, in connection with respective user accounts, respective monetary payments for respective purchased quantities of platform credit, and adding the respective purchased quantities of platform credit as verified platform credit to the respective verified-platform-credit balances of the respective user accounts.

In at least one verifiable-credit embodiment, the set of one or more credit-verifying events includes an acquisition event associated with a listed fashion article. In at least one such credit-verifying embodiment, the set of one or more credit-verifying events further includes a confirmed delivery of the listed fashion article. In at least one such verifiable-credit embodiment, the set of one or more credit-verifying events further includes a confirmed surrender of the listed fashion article; in at least one other verifiable-credit embodiment, the set of one or more credit-verifying events further includes an elapsing of a fraud-complaint time period that begins at a time of the confirmed delivery of the listed fashion article.

In at least one verifiable-credit embodiment, the set of one or more credit-verifying events includes a confirmed surrender of a listed fashion article.

In at least one verifiable-credit embodiment, adding the corresponding appraised quantity of platform credit to the respective platform-credit balance of the corresponding user account includes adding the corresponding appraised quantity of platform credit as unverified platform credit to the respective unverified-platform-credit balance of the corresponding user account. In at least one such verifiable-credit embodiment, the corresponding user account has an unverified-platform-credit limit, and the corresponding user account has an available spending amount of platform credit equal to the sum of (i) the verified-platform-credit balance of the corresponding user account and (ii) the lesser of (a) the unverified-platform-credit balance of the corresponding user account and (b) the unverified-platform-credit limit. In at least one other such verifiable-credit embodiment, the method also includes detecting an acquisition event associated with the corresponding fashion article, and responsively converting the appraised quantity of platform credit from being unverified platform credit in the unverified-platform-credit balance of the corresponding user account to being verified platform credit in the verified-platform-credit balance of the corresponding user account. In at least one verifiable-credit embodiment, with respect to at least one transaction, platform credits are verified platform credits upon issue.

In at least one embodiment, adding the corresponding appraised quantity of platform credit to the respective platform-credit balance of the corresponding user account involves adding the corresponding appraised quantity of platform credit to the respective platform-credit balance of the corresponding user account as verified platform credit.

In at least one embodiment, the method further includes maintaining a respective karma-point balance of karma points for each respective user account; increasing the respective karma-point balance of one or more respective user accounts responsive to detecting one or more designated karma-point-earning events associated with the one or more respective user accounts; and detecting karma-point-redemption events associated with one or more of the respective user accounts, and responsively redeeming predetermined amounts of karma points from the respective karma-point balances of one or more respective user accounts by crediting predetermined amounts of platform credit to the respective platform-credit balances of the respective user accounts. In at least one such embodiment, at least one of the detected designated karma-point-earning events is an event selected from the group consisting of establishment of a referral user account and an initial fashion-article-listing event associated with a referral user account. In at least one such embodiment, the method further includes decreasing the respective karma-point balance of one or more respective user accounts responsive to detecting one or more designated karma-point-reduction events associated with the one or more respective user accounts; in at least one such embodiment, at least one of the detected designated karma-point-reduction events is an event selected from the group consisting of a failure to have a fashion item available for pickup at a scheduled time and a making of a misrepresentation with respect to a listed item.

In at least one embodiment, the method also includes detecting an acquisition event from an acquiring user account associated with the corresponding fashion article, and responsively debiting the platform-credit balance of the acquiring user account in the amount of a current listing quantity of platform credit for the corresponding fashion article. Such embodiments are referred to for brevity and clarity in the ensuing paragraphs as acquisition-event embodiments.

In at least one acquisition-event embodiment, debiting the platform-credit balance of the acquiring user account in the amount of a current listing quantity of platform credit for the corresponding fashion article includes debiting a verified-platform-credit balance of the acquiring user account in the amount of the current listing quantity of verified platform credit for the corresponding fashion article; in at least one such acquisition-event embodiment, the current listing quantity of platform credit for the corresponding fashion article is equal to the appraised quantity of platform credit for the corresponding fashion article; in at least one other such acquisition-event embodiment, the current listing quantity of platform credit for the corresponding fashion article is not equal to the appraised quantity of platform credit for the corresponding fashion article.

In at least one acquisition-event embodiment, the method also includes engaging in delivery-arrangement messaging with the acquiring user account. In at least one such acquisition-event embodiment, the method also includes engaging in at least one of delivery-arrangement messaging and delivery-confirmation messaging with a courier. In at least one other such acquisition-event embodiment, the method also includes engaging in pickup-arrangement messaging with the corresponding user account; in at least one such acquisition-event embodiment, the method also includes engaging in at least one of pickup-arrangement messaging and pickup-confirmation messaging with a courier.

In at least one embodiment, listing the corresponding fashion article in the online catalog includes indexing the corresponding fashion article in the online catalog. Such embodiments are referred to for brevity and clarity in the ensuing paragraphs as catalog-indexing embodiments.

In at least one catalog-indexing embodiment, the method also includes populating an attribute-tag set for the corresponding fashion article with one or more attribute tags for the corresponding fashion article, and indexing the corresponding fashion article in the online catalog includes indexing the corresponding fashion article in the online catalog according to the populated attribute-tag set. In at least one such catalog-indexing embodiment, the method also includes populating an energy-tag set for the corresponding fashion article with one or more energy tags for the corresponding fashion article, and indexing the corresponding fashion article in the online catalog includes indexing the corresponding fashion article in the online catalog according to the populated energy-tag set. Such embodiments are referred to for brevity and clarity in the ensuing paragraphs as attribute-and-energy embodiments.

In at least one attribute-and-energy embodiment, each of the energy tags in the populated energy-tag set has an energy-tag category selected from the group consisting of <style>, <mood>, and <occasion>.

In at least one attribute-and-energy embodiment, the e-commerce platform indexes the corresponding fashion article in the online catalog such that the indexing of the corresponding fashion article according to the populated energy-tag set is weighted more heavily with respect to search-result relevance than the indexing of the corresponding fashion article according to the populated attribute-tag set.

In at least one attribute-and-energy embodiment, populating the attribute-tag set for the corresponding fashion article includes initializing the attribute-tag set to be empty, and populating the energy-tag set for the corresponding fashion article includes initializing the energy-tag set to be empty. In at least one such attribute-and-energy embodiment, populating the attribute-tag set for the corresponding fashion article further includes populating the attribute-tag set based at least in part on the respective set of article-characteristic data for the corresponding fashion article, and populating the energy-tag set for the corresponding fashion article further includes populating the energy-tag set based at least in part on the populated attribute-tag set.

In at least one attribute-and-energy embodiment, the respective set of article-characteristic data for the corresponding fashion article includes a respective article-color indication, and populating the attribute-tag set based at least in part on the respective set of article-characteristic data for the corresponding fashion article includes adding to the attribute-tag set an attribute tag having a category equal to <color> and a value equal to the respective article-color indication.

In at least one attribute-and-energy embodiment, the respective set of article-characteristic data for the corresponding fashion article includes a respective article-color indication, and populating the attribute-tag set based at least in part on the respective set of article-characteristic data for the corresponding fashion article includes adding to the attribute-tag set an attribute tag having a category equal to <print> and a value equal to the respective article-color indication.

In at least one attribute-and-energy embodiment, the respective set of article-characteristic data for the corresponding fashion article includes a respective article-material indication, and populating the attribute-tag set based at least in part on the respective set of article-characteristic data for the corresponding fashion article includes adding to the attribute-tag set an attribute tag having a category equal to <material> and a value equal to the respective article-material indication.

In at least one attribute-and-energy embodiment, the respective set of article-characteristic data for the corresponding fashion article includes a respective article-season indication, and populating the attribute-tag set based at least in part on the respective set of article-characteristic data for the corresponding fashion article includes adding to the attribute-tag set an attribute tag having a category equal to <season> and a value equal to the respective article-season indication.

In at least one attribute-and-energy embodiment, the respective set of article-characteristic data for the corresponding fashion article includes one or more user-provided attribute tags for the corresponding fashion article, and populating the attribute-tag set based at least in part on the respective set of article-characteristic data for the corresponding fashion article includes (i) initializing the attribute-tag set to be empty and (ii) adding the one or more user-provided attribute tags to the initialized attribute-tag set.

In at least one attribute-and-energy embodiment, the respective set of article-characteristic data for the corresponding fashion article further includes a respective free-text narrative, and populating the attribute-tag set based at least in part on the respective set of article-characteristic data for the corresponding fashion article further includes (i) parsing the respective free-text narrative to identify therein one or more narrative attribute tags for the corresponding fashion article and (ii) further adding the one or more identified narrative attribute tags to the attribute-tag set.

In at least one attribute-and-energy embodiment, the respective set of article-characteristic data for the corresponding fashion article further includes a respective article-type indication for the corresponding fashion article, and parsing the respective free-text narrative to identify therein one or more narrative attribute tags for the corresponding fashion article includes (i) using the respective article-type indication to identify an article-type-specific list of candidate attribute tags, (ii) parsing the respective free-text narrative to identify therein one or more attribute tags that match respective candidate attribute tags in the identified article-type-specific list, and (iii) designating the one or more identified matching attribute tags as being the one or more identified narrative attribute tags for the corresponding fashion article.

In at least one attribute-and-energy embodiment, the respective set of article-characteristic data for the corresponding fashion article further includes a respective article-designer indication for the corresponding fashion article, and parsing the respective free-text narrative to identify therein one or more narrative attribute tags for the corresponding fashion article includes (i) using the respective article-designer indication to identify an article-designer-specific list of candidate attribute tags, (ii) parsing the respective free-text narrative to identify therein one or more attribute tags that match respective candidate attribute tags in the identified article-designer-specific list, and (iii) designating the one or more identified matching attribute tags as being the one or more identified narrative attribute tags for the corresponding fashion article.

In at least one attribute-and-energy embodiment, populating the attribute-tag set based at least in part on the respective set of article-characteristic data for the corresponding fashion article further includes (i) using the one or more identified narrative attribute tags to identify a set of sibling attribute tags of the one or more narrative attribute tags and (ii) further adding the identified set of sibling attribute tags to the attribute-tag set.

In at least one attribute-and-energy embodiment, populating the attribute-tag set based at least in part on the respective set of article-characteristic data for the corresponding fashion article further includes: after adding the one or more user-provided attribute tags to the initialized attribute-tag set and further adding the one or more identified narrative attribute tags to the attribute-tag set, removing any duplicate attribute tags from the attribute-tag set.

In at least one attribute-and-energy embodiment, the method further includes, after removing any duplicate attribute tags from the attribute-tag set, segmenting the attribute-tag set into (i) a core attribute-tag set of one or more attribute tags and (ii) a non-core attribute-tag set of one or more attribute tags, where the attribute tags in the non-core attribute-tag set are less specific than respective attribute tags in the core attribute-tag set with respect to one or more attributes of the corresponding fashion article, and where populating the energy-tag set based at least in part on the populated attribute-tag set includes populating the energy-tag set based on the one or more attribute tags in the core attribute-tag set and not on the one or more attribute tags in the non-core attribute-tag set.

In at least one attribute-and-energy embodiment, the method also includes counting respective occurrences of respective energy tags in the populated energy-tag set, removing duplicate energy tags from the populated energy-tag set, and weighting the remaining energy tags in the populated energy-tag set according to respective number of removed duplicate energy tags, where the weighting is with respect to search-result relevance, and in at least one such embodiment, indexing the corresponding fashion article in the online catalog according to the populated energy-tag set includes indexing the corresponding fashion article in the online catalog according to the weighted populated energy-tag set.

In at least one attribute-and-energy embodiment, the method also includes providing drop-down, click-on matching via a user interface between (i) the one or more attribute tags in the core attribute-tag set and (ii) the corresponding fashion article.

In at least one attribute-and-energy embodiment, the method also includes providing keyword-entry matching via the user interface between (i)(a) the one or more attribute tags in the core attribute-tag set and (b) the one or more attribute-tags in the non-core attribute-tag set and (ii) the corresponding fashion article. In at least one such embodiment, this includes tokenizing the one or more attribute tags in the core attribute-tag set and tokenizing the one or more attribute tags in the non-core attribute-tag set.

In at least one attribute-and-energy embodiment, the respective set of article-characteristic data for the corresponding fashion article includes a respective article-type indication and a respective article-designer indication, and populating the energy-tag set further includes populating the energy-tag set based at least in part on the respective article-type indication and at least in part on the respective article-designer indication.

In at least one attribute-and-energy embodiment, populating the energy-tag set based at least in part on the respective article-type indication includes (i) mapping the respective article-type indication to a stored first set of energy tags and (ii) adding the stored first set of energy tags to the energy-tag set.

In at least one attribute-and-energy embodiment, populating the energy-tag set based at least in part on the respective article-designer indication includes (i) mapping the respective article-designer indication to a stored second set of energy tags and (ii) adding the stored second set of energy tags to the energy-tag set.

In at least one attribute-and-energy embodiment, populating the energy-tag set based on the one or more attribute tags in the core attribute-tag set and not on the one or more attribute tags in the non-core attribute-tag set includes conducting an attribute-tag-category-limited population of the energy-tag set based on the one or more attribute tags in the core attribute-tag set. In at least one such embodiment, the attribute-tag-category-limited population of the energy-tag set is limited to one or more of the attribute-tag categories in the set consisting of <item type>, <designer>, <color>, and <material>.

Example Claims for First Additional Embodiments

A1. A method carried out by an e-commerce platform executing stored program instructions, the method comprising:

receiving fashion-article-listing requests that are each associated with a respective user account and that each comprise a respective set of article-characteristic data that corresponds to a respective wearable fashion article, wherein each respective user account has a respective platform-credit balance;

using the respective sets of article-characteristic data to determine respective appraised quantities of platform credit for the respective corresponding wearable fashion articles;

transmitting fashion-article-listing replies corresponding respectively to the received fashion-article-listing requests, wherein each transmitted fashion-article-listing reply offers the respective determined appraised quantity of platform credit in exchange for listing the corresponding wearable fashion article in a browseable and searchable online catalog; and receiving fashion-article-listing acceptances corresponding to at least some of the transmitted fashion-article-listing replies and, for each received fashion-article-listing acceptance, responsively:

adding the corresponding appraised quantity of platform credit to the respective platform-credit balance of the corresponding user account; and listing the corresponding fashion article in the online catalog as being acquirable for the corresponding appraised quantity of platform credit.

A2. The method of claim A1, wherein the e-commerce platform comprises a web server, the respective fashion-article-listing requests comprise respective HyperText Markup Language (HTML) request messages, the respective fashion-article-listing replies comprise respective HTML reply messages, and the online catalog comprises a web interface.

A3. The method of claim A1, wherein the received set of article-characteristic data for at least one of the wearable fashion articles comprises an article-type indication, an article-designer indication, and an article-condition indication.

A4. The method of claim A3, wherein at least one of the article-type indications has a value that is selected from the group consisting of clothing, footwear, dress, top, skirt, belt, pants, shorts, jumpsuit, outerwear, suit, jeans, swimwear, bag, accessory, and jewelry.

A5. The method of claim A3, wherein the received set of article-characteristic data for at least one of the wearable fashion articles further comprises an article-subtype indication.

A6. The method of claim A3, wherein the received set of article-characteristic data for at least one of the wearable fashion articles further comprises one or more of an article-size indication, an article-season indication, an article-color indication, an article-material indication, and an article-made-in-location indication.

A7. The method of claim A3, wherein the received set of article-characteristic data for at least one of the wearable fashion articles further comprises a free-text narrative pertaining to the corresponding wearable fashion article.

A8. The method of claim A3, wherein the received set of article-characteristic data for at least one of the wearable fashion articles further comprises at least one image of the corresponding fashion article, wherein the e-commerce platform lists the corresponding fashion article in the online catalog in association with the at least one image of the corresponding fashion article.

A9. The method of claim A8, wherein the at least one image of the corresponding fashion article comprises at least one authenticating image of the corresponding fashion article.

A10. The method of claim A3, wherein at least one of the article-condition indications has a value that is selected from the group consisting of new with tags, new, mint, very good, and vintage.

A11. The method of claim A1, further comprising:

receiving, in connection with respective user accounts, respective monetary payments for respective purchased quantities of platform credit; and adding the respective purchased quantities of platform credit to the respective platform-credit balances of the respective user accounts.

A12. The method of claim A11, further comprising:

maintaining a reserve-liquidity monetary account;

maintaining a charitable-donations monetary account of funds that are designated for donation to one or more charitable organizations; and dividing each received monetary payment between the reserve-liquidity monetary account and the charitable-donations monetary account according to a predetermined ratio.

A13. The method of claim A12, wherein the reserve-liquidity monetary account is a monetary account of funds that are designated for a first set of uses, wherein the first set of uses comprises purchasing inventory of wearable fashion articles for listing in the online catalog.

A14. The method of claim A13, wherein the first set of uses further comprises issuing refunds in instances of fraud.

A15. The method of claim A14, further comprising adding to the reserve-liquidity monetary account at least a portion of funds collected to enforce purchasing of fraudulently spent platform credit.

A16. The method of claim A14, further comprising adding to the reserve-liquidity monetary account all funds collected to enforce purchasing of fraudulently spent platform credit.

A17. The method of claim A12, wherein the predetermined ratio is 1:1.

A18. The method of claim A12, wherein the predetermined ratio is not 1:1.

A19. The method of claim A12, further comprising transferring at least a portion of the funds in the charitable-donations monetary account to one or more charitable organizations.

A20. The method of claim A19, further comprising:

maintaining a plurality of donor user accounts having respective charity-pool-share balances; and receiving donor-user-account-specific charitable-organization data specifying sets of one or more charitable organizations designated by respective different donor user accounts, wherein transferring at least a portion of the funds in the charitable-donations monetary account to one or more charitable organizations comprises apportioning the transferred funds to the charitable organizations specified by the donor-user-account-specific charitable-organization data according to the respective charity-pool-share balances of the respective donor user accounts.

A21. The method of claim A20, wherein the respective charity-pool-share balances are determined at least in part by one or more of (i) respective number of donated fashion articles and (ii) respective aggregate appraised value of donated fashion articles.

A22. The method of claim A20, wherein:

one or more of the donor user accounts are designated as being parent donor user accounts;

one or more of the donor user accounts that are not designated as being parent donor user accounts are designated as being non-parent donor user accounts;

a given one of the parent donor user accounts has a bundling association with a given plurality of non-parent donor user accounts; and apportioning the transferred funds to the charitable organizations specified by the donor-user-account-specific charitable-organization data according to the respective charity-pool-share balances of the respective donor user accounts comprises apportioning the transferred funds according to an accounting that treats the respective charity-pool-share balances of the bundled non-parent donor user accounts as having been transferred to the charity-pool-share balance of the given parent donor user account.

A23. The method of claim A1, wherein:

the respective platform-credit balance of each respective user account is demarcated into a verified-platform-credit balance of verified platform credit and an unverified-platform-credit balance of unverified platform credit; and the e-commerce platform converts given quantities of unverified credit to corresponding quantities of verified credit responsive to detecting occurrence of each and every credit-verifying event in a set of one or more credit-verifying events.

A24. The method of claim A23, wherein:

verified platform credit is redeemable for acquiring one or more fashion articles listed in the online catalog; and unverified credit is not redeemable for acquiring one or more fashion articles listed in the online catalog.

A25. The method of claim A23, wherein:

verified platform credit is redeemable for acquiring one or more fashion articles listed in the online catalog without creating a corresponding credit debt; and unverified platform credit is redeemable for acquiring one or more fashion articles listed in the online catalog with creation of a corresponding credit debt.

A26. The method of claim A23, further comprising:

receiving, in connection with respective user accounts, respective monetary payments for respective purchased quantities of platform credit; and adding the respective purchased quantities of platform credit as verified platform credit to the respective verified-platform-credit balances of the respective user accounts.

A27. The method of claim A23, wherein the set of one or more credit-verifying events comprises an acquisition event associated with a listed fashion article.

A28. The method of claim A27, wherein the set of one or more credit-verifying events further comprises a confirmed delivery of the listed fashion article.

A29. The method of claim A28, wherein the set of one or more credit-verifying events further comprises a confirmed surrender of the listed fashion article.

A30. The method of claim A28, wherein the set of one or more credit-verifying events further comprises an elapsing of a fraud-complaint time period that begins at a time of the confirmed delivery of the listed fashion article.

A31. The method of claim A23, wherein the set of one or more credit-verifying events comprises a confirmed surrender of a listed fashion article.

A32. The method of claim A23, wherein adding the corresponding appraised quantity of platform credit to the respective platform-credit balance of the corresponding user account comprises adding the corresponding appraised quantity of platform credit as unverified platform credit to the respective unverified-platform-credit balance of the corresponding user account.

A33. The method of claim A32, wherein:

the corresponding user account has an unverified-platform-credit limit; and the corresponding user account has an available spending amount of platform credit equal to the sum of (i) the verified-platform-credit balance of the corresponding user account and (ii) the lesser of (a) the unverified-platform-credit balance of the corresponding user account and (b) the unverified-platform-credit limit.

A34. The method of claim A32, further comprising detecting an acquisition event associated with the corresponding fashion article, and responsively converting the appraised quantity of platform credit from being unverified platform credit in the unverified-platform-credit balance of the corresponding user account to being verified platform credit in the verified-platform-credit balance of the corresponding user account.

A35. The method of claim A23, wherein, with respect to at least one transaction, platform credits are verified platform credits upon issue.

A36. The method of claim A1, wherein adding the corresponding appraised quantity of platform credit to the respective platform-credit balance of the corresponding user account comprises adding the corresponding appraised quantity of platform credit to the respective platform-credit balance of the corresponding user account as verified platform credit.

A37. The method of claim A1, further comprising:

maintaining a respective karma-point balance of karma points for each respective user account;

increasing the respective karma-point balance of one or more respective user accounts responsive to detecting one or more designated karma-point-earning events associated with the one or more respective user accounts; and detecting karma-point-redemption events associated with one or more of the respective user accounts, and responsively redeeming predetermined amounts of karma points from the respective karma-point balances of one or more respective user accounts by crediting predetermined amounts of platform credit to the respective platform-credit balances of the respective user accounts.

A38. The method of claim A37, wherein at least one of the detected designated karma-point-earning events is an event selected from the group consisting of establishment of a referral user account and an initial fashion-article-listing event associated with a referral user account.

A39. The method of claim A38, further comprising:

decreasing the respective karma-point balance of one or more respective user accounts responsive to detecting one or more designated karma-point-reduction events associated with the one or more respective user accounts.

A40. The method of claim A39, wherein at least one of the detected designated karma-point-reduction events is an event selected from the group consisting of a failure to have a fashion item available for pickup at a scheduled time and a making of a misrepresentation with respect to a listed item.

A41. The method of claim A1, further comprising detecting an acquisition event from an acquiring user account associated with the corresponding fashion article, and responsively debiting the platform-credit balance of the acquiring user account in the amount of a current listing quantity of platform credit for the corresponding fashion article.

A42. The method of claim A41, wherein debiting the platform-credit balance of the acquiring user account in the amount of the current listing quantity of platform credit for the corresponding fashion article comprises debiting a verified-platform-credit balance of the acquiring user account in the amount of the current listing quantity of platform credit for the corresponding fashion article.

A43. The method of claim A41, wherein the current listing quantity of platform credit for the corresponding fashion article is equal to the appraised quantity of platform credit for the corresponding fashion article.

A44. The method of claim A41, wherein the current listing quantity of platform credit for the corresponding fashion article is not equal to the appraised quantity of platform credit for the corresponding fashion article.

A45. The method of claim A41, further comprising engaging in delivery-arrangement messaging with the acquiring user account.

A46. The method of claim A45, further comprising engaging in at least one of delivery-arrangement messaging and delivery-confirmation messaging with a courier.

A47. The method of claim A45, further comprising engaging in pickup-arrangement messaging with the corresponding user account.

A48. The method of claim A47, further comprising engaging in at least one of pickup-arrangement messaging and pickup-confirmation messaging with a courier.

A49. The method of claim A1, wherein listing the corresponding fashion article in the online catalog comprises indexing the corresponding fashion article in the online catalog.

A50. The method of claim A49, further comprising:
populating an attribute-tag set for the corresponding fashion article with one or more attribute tags for the corresponding fashion article,
wherein indexing the corresponding fashion article in the online catalog comprises indexing the corresponding fashion article in the online catalog according to the populated attribute-tag set.

A51. The method of claim A50, further comprising:
populating an energy-tag set for the corresponding fashion article with one or more energy tags for the corresponding fashion article,
wherein indexing the corresponding fashion article in the online catalog comprises indexing the corresponding fashion article in the online catalog according to the populated energy-tag set.

A52. The method of claim A51, wherein each of the energy tags in the populated energy-tag set has an energy-tag category selected from the group consisting of <style>, <mood>, and <occasion>.

A53. The method of claim A51, wherein the e-commerce platform indexes the corresponding fashion article in the online catalog such that the indexing of the corresponding fashion article according to the populated energy-tag set is weighted more heavily with respect to search-result relevance than the indexing of the corresponding fashion article according to the populated attribute-tag set.

A54. The method of claim A51, wherein:
populating the attribute-tag set for the corresponding fashion article comprises initializing the attribute-tag set to be empty; and
populating the energy-tag set for the corresponding fashion article comprises initializing the energy-tag set to be empty.

A55. The method of claim A54, wherein:
populating the attribute-tag set for the corresponding fashion article further comprises populating the attribute-tag set based at least in part on the respective set of article-characteristic data for the corresponding fashion article; and
populating the energy-tag set for the corresponding fashion article further comprises populating the energy-tag set based at least in part on the populated attribute-tag set.

A56. The method of claim A55, wherein:
the respective set of article-characteristic data for the corresponding fashion article comprises a respective article-color indication; and
populating the attribute-tag set based at least in part on the respective set of article-characteristic data for the corresponding fashion article comprises adding to the attribute-tag set an attribute tag having a category equal to <color> and a value equal to the respective article-color indication.

A57. The method of claim A55, wherein:
the respective set of article-characteristic data for the corresponding fashion article comprises a respective article-print indication; and
populating the attribute-tag set based at least in part on the respective set of article-characteristic data for the corresponding fashion article comprises adding to the attribute-tag set an attribute tag having a category equal to <print> and a value equal to the respective article-print indication.

A58. The method of claim A55, wherein:
the respective set of article-characteristic data for the corresponding fashion article comprises a respective article-material indication; and
populating the attribute-tag set based at least in part on the respective set of article-characteristic data for the corresponding fashion article comprises adding to the attribute-tag set an attribute tag having a category equal to <material> and a value equal to the respective article-material indication.

A59. The method of claim A55, wherein:
the respective set of article-characteristic data for the corresponding fashion article comprises a respective article-season indication; and
populating the attribute-tag set based at least in part on the respective set of article-characteristic data for the corresponding fashion article comprises adding to the attribute-tag set an attribute tag having a category equal to <season> and a value equal to the respective article-season indication.

A60. The method of claim A55, wherein:
the respective set of article-characteristic data for the corresponding fashion article comprises one or more user-provided attribute tags for the corresponding fashion article; and
populating the attribute-tag set based at least in part on the respective set of article-characteristic data for the corresponding fashion article comprises:
  initializing the attribute-tag set to be empty; and
  adding the one or more user-provided attribute tags to the initialized attribute-tag set.

A61. The method of claim A60, wherein:
the respective set of article-characteristic data for the corresponding fashion article further comprises a respective free-text narrative; and
populating the attribute-tag set based at least in part on the respective set of article-characteristic data for the corresponding fashion article further comprises:
  parsing the respective free-text narrative to identify therein one or more narrative attribute tags for the corresponding fashion article; and
  further adding the one or more identified narrative attribute tags to the attribute-tag set.

A62. The method of claim A61, wherein:
the respective set of article-characteristic data for the corresponding fashion article further comprises a respective article-type indication for the corresponding fashion article; and
parsing the respective free-text narrative to identify therein one or more narrative attribute tags for the corresponding fashion article comprises:
  using the respective article-type indication to identify an article-type-specific list of candidate attribute tags;
  parsing the respective free-text narrative to identify therein one or more attribute tags that match respective candidate attribute tags in the identified article-type-specific list; and designating the one or more identified matching attribute tags as being the one or more identified narrative attribute tags for the corresponding fashion article.

A63. The method of claim A61, wherein:
the respective set of article-characteristic data for the corresponding fashion article further comprises a respective article-designer indication for the corresponding fashion article; and
parsing the respective free-text narrative to identify therein one or more narrative attribute tags for the corresponding fashion article comprises:
using the respective article-designer indication to identify an article-designer-specific list of candidate attribute tags;
parsing the respective free-text narrative to identify therein one or more attribute tags that match respective candidate attribute tags in the identified article-designer-specific list; and
designating the one or more identified matching attribute tags as being the one or more identified narrative attribute tags for the corresponding fashion article.

A64. The method of claim A61, wherein populating the attribute-tag set based at least in part on the respective set of article-characteristic data for the corresponding fashion article further comprises:
using the one or more identified narrative attribute tags to identify a set of sibling attribute tags of the one or more narrative attribute tags; and
further adding the identified set of sibling attribute tags to the attribute-tag set.

A65. The method of claim A61, wherein populating the attribute-tag set based at least in part on the respective set of article-characteristic data for the corresponding fashion article further comprises:
after adding the one or more user-provided attribute tags to the initialized attribute-tag set and further adding the one or more identified narrative attribute tags to the attribute-tag set, removing any duplicate attribute tags from the attribute-tag set.

A66. The method of claim A65, further comprising:
after removing any duplicate attribute tags from the attribute-tag set, segmenting the attribute-tag set into (i) a core attribute-tag set of one or more attribute tags and (ii) a non-core attribute-tag set of one or more attribute tags, wherein the attribute tags in the non-core attribute-tag set are less specific than respective attribute tags in the core attribute-tag set with respect to one or more attributes of the corresponding fashion article,
wherein populating the energy-tag set based at least in part on the populated attribute-tag set comprises populating the energy-tag set based on the one or more attribute tags in the core attribute-tag set and not on the one or more attribute tags in the non-core attribute-tag set.

A67. The method of claim A66, further comprising:
counting respective occurrences of respective energy tags in the populated energy-tag set;
removing duplicate energy tags from the populated energy-tag set; and
weighting the remaining energy tags in the populated energy-tag set according to respective number of removed duplicate energy tags, the weighting being with respect to search-result relevance,
wherein indexing the corresponding fashion article in the online catalog according to the populated energy-tag set comprises indexing the corresponding fashion article in the online catalog according to the weighted populated energy-tag set.

A68. The method of claim A66, further comprising providing drop-down, click-on matching via a user interface between (i) the one or more attribute tags in the core attribute-tag set and (ii) the corresponding fashion article.

A69. The method of claim A68, further comprising providing keyword-entry matching via the user interface between (i)(a) the one or more attribute tags in the core attribute-tag set and (b) the one or more attribute-tags in the non-core attribute-tag set and (ii) the corresponding fashion article.

A70. The method of claim A69, wherein providing keyword-entry matching via the user interface between (i)(a) the one or more attribute tags in the core attribute-tag set and (b) the one or more attribute tags in the non-core attribute-tag set and (ii) the corresponding fashion article comprises:
tokenizing the one or more attribute tags in the core attribute-tag set; and
tokenizing the one or more attribute tags in the non-core attribute-tag set.

A71. The method of claim A66, wherein:
the respective set of article-characteristic data for the corresponding fashion article comprises a respective article-type indication and a respective article-designer indication; and
populating the energy-tag set further comprises populating the energy-tag set based at least in part on the respective article-type indication and at least in part on the respective article-designer indication.

A72. The method of claim A71, wherein populating the energy-tag set based at least in part on the respective article-type indication comprises:
mapping the respective article-type indication to a stored first set of energy tags; and
adding the stored first set of energy tags to the energy-tag set.

A73. The method of claim A71, wherein populating the energy-tag set based at least in part on the respective article-designer indication comprises:
mapping the respective article-designer indication to a stored second set of energy tags; and
adding the stored second set of energy tags to the energy-tag set.

A74. The method of claim A66, wherein populating the energy-tag set based on the one or more attribute tags in the core attribute-tag set and not on the one or more attribute tags in the non-core attribute-tag set comprises conducting an attribute-tag-category-limited population of the energy-tag set based on the one or more attribute tags in the core attribute-tag set.

A75. The method of claim A66, wherein the attribute-tag-category-limited population of the energy-tag set is limited to one or more of the attribute-tag categories in the set consisting of <item type>, <designer>, <color>, and <material>.

A76. An e-commerce platform comprising:
a communication interface;
a processor; and
data storage containing instructions executable by the processor for causing the e-commerce platform to carry out a set of functions, the set of functions comprising:
receiving fashion-article-listing requests that are each associated with a respective user account and that each comprise a respective set of article-characteristic data that corresponds to a respective wearable fashion article, wherein each respective user account has a respective platform-credit balance;

using the respective sets of article-characteristic data to determine respective appraised quantities of platform credit for the respective corresponding wearable fashion articles;

transmitting fashion-article-listing replies corresponding respectively to the received fashion-article-listing requests, wherein each transmitted fashion-article-listing reply offers the respective determined appraised quantity of platform credit in exchange for listing the corresponding wearable fashion article in a browseable and searchable online catalog; and receiving fashion-article-listing acceptances corresponding to at least some of the transmitted fashion-article-listing replies and, for each received fashion-article-listing acceptance, responsively:

adding the corresponding appraised quantity of platform credit to the respective platform-credit balance of the corresponding user account; and listing the corresponding fashion article in the online catalog as being acquirable for the corresponding appraised quantity of platform credit.

Second Additional Embodiments (Related to "Systems and Methods for Providing an E-Commerce Platform for Credit-Based Appraisals of Wearable Fashion Articles")

Overview of Second Additional Embodiments

Presently disclosed are systems and methods for providing an e-commerce platform for credit-based appraisals of wearable fashion articles.

One embodiment takes the form of a method carried out by an e-commerce platform executing stored program instructions. The method includes receiving fashion-article-listing requests that are each associated with a respective user account and that each include a respective set of article-characteristic data that corresponds to a respective wearable fashion article, where each respective user account has a respective platform-credit balance. The method also includes using the respective sets of article-characteristic data to determine respective appraised quantities of platform credit for the respective corresponding wearable fashion articles. The method also includes transmitting fashion-article-listing replies corresponding respectively to the received fashion-article-listing requests, where each transmitted fashion-article-listing reply offers the respective determined appraised quantity of platform credit in exchange for listing the corresponding wearable fashion article in a browseable and searchable online catalog. The method also includes receiving fashion-article-listing acceptances corresponding to at least some of the transmitted fashion-article-listing replies and, for each received fashion-article-listing acceptance, responsively listing the corresponding fashion article in the online catalog as being acquirable for the corresponding appraised quantity of platform credit.

Another embodiment takes the form of an e-commerce platform that includes a communication interface, a processor, and data storage containing instructions executable by the processor for causing the e-commerce platform to carry out a set of functions, where the set of functions includes the method steps that are recited in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, using a respective set of article-characteristic data to determine a respective appraised quantity of platform credit for a respective wearable fashion article includes (i) presenting at least some of the respective set of article-characteristic data via an appraisal-tool user interface and (ii) receiving the respective appraised quantity of platform credit for the respective wearable fashion article via the appraisal-tool user interface. Such embodiments are referred to for brevity and clarity in the ensuing paragraphs as user-interface embodiments.

In at least one user-interface embodiment, the respective set of article-characteristic data for the respective wearable fashion article includes a respective article-type indication, a respective article-designer indication, and a respective article-condition indication; and presenting at least some of the respective set of article-characteristic data via the appraisal-tool user interface includes presenting the respective article-type indication, the respective article-designer indication, and the respective article-condition indication via the appraisal-tool user interface.

In at least one user-interface embodiment, the method further includes, prior to receiving the respective appraised quantity of platform credit for the respective wearable fashion article via the appraisal-tool user interface: (i) using the respective set of article-characteristic data to identify one or more listings in the online catalog of wearable fashion articles that are comparable to the respective wearable fashion article and (ii) presenting the one or more identified comparable listings via the appraisal-tool user interface. In at least one such user-interface embodiment, the respective set of article-characteristic data for the respective wearable fashion article includes a respective article-type indication, a respective article-designer indication, and a respective article-condition indication; and using the respective set of article-characteristic data to identify the one or more comparable listings in the online catalog includes using the respective article-type indication, the respective article-designer indication, and the respective article-condition indication to identify the one or more comparable listings in the online catalog.

In at least one user-interface embodiment, the method further includes, prior to receiving the respective appraised quantity of platform credit for the respective wearable fashion article via the appraisal-tool user interface, presenting one or more candidate appraisal-modification values via the appraisal-tool user interface. In at least one such user-interface embodiment, the method further includes, prior to presenting the one or more candidate appraisal-modification values via the appraisal-tool user interface, using the respective set of article-characteristic data to identify one or more of the candidate appraisal-modification values. In at least one such user-interface embodiment, the respective set of article-characteristic data for the respective wearable fashion article includes respective article-attribute data specifying one or more attributes of the respective wearable fashion article, and using the respective set of article-characteristic data to identify one or more of the candidate appraisal-modification values includes using the respective article-attribute data to identify one or more of the candidate appraisal-modification values. In at least one such user-interface embodiment, using the respective article-attribute data to identify one or more of the candidate appraisal-modification values involves conducting a designer-dependent selection of one or more of the candidate appraisal-modification values; in at least one such user-interface embodiment, the one or more attributes of the respective wearable fashion article include one or more of the attributes selected from the group consisting of an article color, an article detail, an article material, an article print, an article season, and an article silhouette.

In at least one user-interface embodiment, the respective set of article-characteristic data for the respective wearable fashion article includes a respective free-text narrative pertaining to the respective wearable fashion article, and using the respective set of article-characteristic data to identify one or more of the candidate appraisal-modification values includes (i) parsing the respective free-text narrative to identify one or more attributes of the respective wearable fashion article and (ii) using the one or more identified attributes to identify one or more of the candidate appraisal-modification values. Such user-interface embodiments are referred to for brevity and clarity in the ensuing paragraphs as free-text-narrative-user-interface embodiments.

In at least one free-text-narrative-user-interface embodiment, the one or more attributes of the respective wearable fashion article include one or more of the attributes selected from the group consisting of an article color, an article detail, an article material, an article print, an article season, and an article silhouette.

In at least one free-text-narrative-user-interface embodiment, the respective set of article-characteristic data for the respective wearable fashion article further includes a respective article-type indication, and parsing the respective free-text narrative to identify one or more attributes of the respective wearable fashion article includes (i) using the respective article-type indication to identify an article-type-specific set of attributes and (ii) parsing the respective free-text narrative to identify one or more attributes of the respective wearable fashion article that are attributes in the identified article-type-specific set of attributes.

In at least one free-text-narrative-user-interface embodiment, the respective set of article-characteristic data for the respective wearable fashion article further includes a respective article-designer indication, and parsing the respective free-text narrative to identify one or more attributes of the respective wearable fashion article includes (i) using the respective article-designer indication to identify an article-designer-specific set of attributes and (ii) parsing the respective free-text narrative to identify one or more attributes of the respective wearable fashion article that are attributes in the identified article-designer-specific set of attributes.

In at least one embodiment, using a respective set of article-characteristic data to determine a respective appraised quantity of platform credit for a respective wearable fashion article includes (i) using the respective set of article-characteristic data to identify a base appraisal amount of platform credit for the respective wearable fashion article, (ii) selecting one or more appraisal-modification values for the respective wearable fashion article, and (iii) determining the respective appraised quantity of platform credit for the respective wearable fashion article to be the identified base appraisal amount of platform credit as modified by the one or more selected appraisal-modification values. Such embodiments are referred to for brevity and clarity in the ensuing paragraphs as base-and-modifier embodiments.

In at least one base-and-modifier embodiment, the respective set of article-characteristic data for the respective wearable fashion article includes a respective article-type indication, a respective article-designer indication, and a respective article-condition indication; and using the respective set of article-characteristic data to identify the base appraisal amount of platform credit for the respective wearable fashion article includes using the respective article-type indication, the respective article-designer indication, and the respective article-condition indication to identify the base appraisal amount of platform credit for the respective wearable fashion article. In at least one such base-and-modifier embodiment, using the respective article-type indication, the respective article-designer indication, and the respective article-condition indication to identify the base appraisal amount of platform credit for the respective wearable fashion article includes retrieving and averaging a set of previously determined appraisal amounts having matching respective article-type indications, respective article-designer indications, and respective article-condition indications. In at least one such base-and-modifier embodiment, the respective set of article-characteristic data for the respective wearable fashion article further includes a respective article-subtype indication, and using the respective set of article-characteristic data to identify the base appraisal amount of platform credit for the respective wearable fashion article further includes using the respective article-subtype indication to identify the base appraisal amount of platform credit for the respective wearable fashion article.

In at least one base-and-modifier embodiment, selecting the one or more appraisal-modification values for the respective wearable fashion article includes receiving appraisal-modification-selection user input via an appraisal-tool user interface, the appraisal-modification-selection user input specifying the one or more selected appraisal-modification values. In at least one such base-and-modifier embodiment, the method further includes (i) identifying one or more candidate appraisal-modification values for the respective wearable fashion article and (ii) presenting the one or more identified candidate appraisal-modification values via the appraisal-tool user interface, where the appraisal-modification-selection user input specifies the one or more selected appraisal-modification values from among the one or more presented candidate appraisal-modification values; such base-and-modifier embodiments are referred to for brevity and clarity in the ensuing paragraphs as base-and-modifier-user-interface embodiments.

In at least one base-and-modifier-user-interface embodiment, the respective set of article-characteristic data for the respective wearable fashion article includes respective article-attribute data specifying one or more attributes of the respective wearable fashion article, and identifying the one or more candidate appraisal-modification values for the respective wearable fashion article includes identifying one or more of the candidate appraisal-modification values for the respective wearable fashion article based at least in part on the respective article-attribute data. In at least one such base-and-modifier-user-interface embodiment, the one or more attributes of the respective wearable fashion article includes one or more of the attributes selected from the group consisting of an article color, an article detail, an article material, an article print, an article season, and an article silhouette.

In at least one base-and-modifier-user-interface embodiment, the respective set of article-characteristic data for the respective wearable fashion article includes a respective free-text narrative pertaining to the respective wearable fashion article, and identifying the one or more candidate appraisal-modification values for the respective wearable fashion article includes (i) parsing the respective free-text narrative to identify one or more attributes of the respective wearable fashion article and (ii) using the one or more identified attributes to identify one or more of the candidate appraisal-modification values; in at least one such base-and-modifier-user-interface embodiment, the one or more attributes of the respective wearable fashion article includes one or more of the attributes selected from the group consisting of an article color, an article detail, an article material, an article print, an article season, and an article silhouette; in at least one other such base-and-modifier-user-interface embodiment, the respective set of article-characteristic data for the respective wearable fashion article further includes a respective article-type indication, and parsing the respective free-text narrative to identify one or more attributes of the respective wearable fashion article includes (i) using the respective article-type indication to identify an article-type-specific set of attributes and (ii) parsing the respective free-text narrative to identify one or more attributes of the respective wearable fashion article that are attributes in the identified article-type-specific set of attributes; in at least one other such base-and-modifier-user-interface embodiment, the respective set of article-characteristic data for the respective wearable fashion article further includes a respective article-designer indication, and parsing the respective free-text narrative to identify one or more attributes of the respective wearable fashion article includes (i) using the respective article-designer indication to identify an article-designer-specific set of attributes and (ii) parsing the respective free-text narrative to identify one or more attributes of the respective wearable fashion article that are attributes in the identified article-designer-specific set of attributes.

In at least one base-and-modifier embodiment, the method further includes identifying one or more attributes of the respective wearable fashion article, and selecting the one or more appraisal-modification values for the respective wearable fashion article includes selecting one or more of the appraisal-modification values for the respective wearable fashion article based at least in part on the one or more identified attributes of the respective wearable fashion article. In at least one such base-and-modifier embodiment, the one or more identified attributes of the respective wearable fashion article includes one or more of the attributes selected from the group consisting of an article color, an article detail, an article material, an article print, an article season, and an article silhouette. In at least one other such base-and-modifier embodiment, the respective set of article-characteristic data for the respective wearable fashion article includes respective article-attribute data specifying one or more attributes of the respective wearable fashion article, and identifying the one or more attributes of the respective wearable fashion article includes identifying the one or more attributes of the respective wearable fashion article based at least in part on the respective article-attribute data. In yet another such base-and-modifier embodiment, the respective set of article-characteristic data for the respective wearable fashion article includes a respective free-text narrative pertaining to the respective wearable fashion article, and identifying the one or more attributes of the respective wearable fashion article includes identifying the one or more attributes of the respective wearable fashion article at least in part by parsing the respective free-text narrative; in at least one such base-and-modifier embodiment, the respective set of article-characteristic data for the respective wearable fashion article further includes a respective article-type indication, and parsing the respective free-text narrative to identify one or more attributes of the respective wearable fashion article includes (i) using the respective article-type indication to identify an article-type-specific set of attributes and (ii) parsing the respective free-text narrative to identify one or more attributes of the respective wearable fashion article that are attributes in the identified article-type-specific set of attributes; in at least one such base-and-modifier embodiment, the respective set of article-characteristic data for the respective wearable fashion article further includes a respective article-designer indication, and parsing the respective free-text narrative to identify one or more attributes of the respective wearable fashion article includes (i) using the respective article-designer indication to identify an article-designer-specific set of attributes and (ii) parsing the respective free-text narrative to identify one or more attributes of the respective wearable fashion article that are attributes in the identified article-designer-specific set of attributes.

In at least one embodiment, the method further includes presenting, via an appraisal-tool user interface, a scrollable set of listings in the online catalog of wearable fashion articles that are comparable to the respective wearable fashion article set of comparable listings. In at least one such embodiment, the method further includes presenting, via the appraisal-tool user interface, an appraised-credits field that is dynamically codependent with the scrollable set of comparable listings; in at least one such embodiment, the method further includes receiving, via the appraisal-tool user interface, a scrolling command, and responsively (i) scrolling the scrollable set of comparable listings and (ii) updating the appraised-credits field to remain coordinated with the scrolling of the scrollable set of comparable listings; in at least one such embodiment, the method further includes receiving, via the appraisal-tool user interface, an update to the appraised-credits field, and responsively scrolling the scrollable set of comparable listings to remain coordinated with the updated appraised-credits field.

In at least one embodiment, using a respective set of article-characteristic data to determine a respective appraised quantity of platform credit for a respective wearable fashion article includes determining that the associated fashion-article-listing request is a fashion-article-relisting request, and responsively applying a depreciation schedule to a previous appraisal amount from a previous appraisal of the respective wearable fashion article to determine the respective appraised quantity of platform credit for the respective wearable fashion article. Such embodiments are referred to for brevity and clarity in the ensuing paragraphs as relisting embodiments.

In at least one relisting embodiment, determining that the associated fashion-article-listing request is a fashion-article-relisting request includes (i) presenting posting-history data associated with the respective user account via an appraisal-tool user interface and (ii) receiving a relisting input via the appraisal-tool user interface, and responsively determining that the associated fashion-article-listing request is a fashion-article-relisting request.

In at least one relisting embodiment, applying the depreciation schedule to the previous appraisal amount includes (i) identifying one or more percentage-based multipliers based on the depreciation schedule and (ii) applying the one or more identified percentage-based multipliers to the previous appraisal amount. In at least one such relisting embodiment, the depreciation schedule is based on a set of one or more depreciation factors; in at least one such relisting embodiment, the set of depreciation factors includes an elapsed time since the respective wearable fashion article was most recently acquired from the online catalog; in at least one such relisting embodiment, the set of depreciation factors further includes a comparison of a current condition of the respective wearable fashion article with a previous condition of the respective wearable fashion article; in at least one such relisting embodiment, the previous condition of the respective wearable fashion article is a condition of the respective wearable fashion article at a time of the previous appraisal; in another such relisting embodiment, the previous condition of the respective wearable fashion article is a condition of the respective wearable fashion article at a time that the respective wearable fashion article was most recently acquired from the online catalog.

In at least one relisting embodiment, the set of depreciation factors includes a comparison of a current condition of the respective wearable fashion article with a previous condition of the respective wearable fashion article. In at least one such relisting embodiment, the previous condition of the respective wearable fashion article is a condition of the respective wearable fashion article at a time of the previous appraisal; in at least one other such relisting embodiment, the previous condition of the respective wearable fashion article is a condition of the respective wearable fashion article at a time that the respective wearable fashion article was most recently acquired from the online catalog. In at least one relisting embodiment, the comparison is a time-lapse-dependent comparison. In at least one relisting embodiment, the comparison is a designer-dependent comparison. In at least one relisting embodiment, the comparison is one or more of a time-lapse-dependent comparison, a designer-dependent comparison, and an item-type-dependent comparison. In at least one relisting embodiment, the set of depreciation factors includes one or more of an elapsed time, a condition change, an item type of the respective wearable fashion article, and a designer of the respective wearable fashion article.

Example Claims for Second Additional Embodiments

B1. A method carried out by an e-commerce platform executing stored program instructions, the method comprising:

receiving fashion-article-listing requests that are each associated with a respective user account and that each comprise a respective set of article-characteristic data that corresponds to a respective wearable fashion article, wherein each respective user account has a respective platform-credit balance;

using the respective sets of article-characteristic data to determine respective appraised quantities of platform credit for the respective corresponding wearable fashion articles;

transmitting fashion-article-listing replies corresponding respectively to the received fashion-article-listing requests, wherein each transmitted fashion-article-listing reply offers the respective determined appraised quantity of platform credit in exchange for listing the corresponding wearable fashion article in a browseable and searchable online catalog; and receiving fashion-article-listing acceptances corresponding to at least some of the transmitted fashion-article-listing replies and, for each received fashion-article-listing acceptance, responsively listing the corresponding fashion article in the online catalog as being acquirable for the corresponding appraised quantity of platform credit.

B2. The method of claim B1, wherein using a respective set of article-characteristic data to determine a respective appraised quantity of platform credit for a respective wearable fashion article comprises:

presenting at least some of the respective set of article-characteristic data via an appraisal-tool user interface; and receiving the respective appraised quantity of platform credit for the respective wearable fashion article via the appraisal-tool user interface.

B3. The method of claim B2, wherein:

the respective set of article-characteristic data for the respective wearable fashion article comprises a respective article-type indication, a respective article-designer indication, and a respective article-condition indication; and presenting at least some of the respective set of article-characteristic data via the appraisal-tool user interface comprises presenting the respective article-type indication, the respective article-designer indication, and the respective article-condition indication via the appraisal-tool user interface.

B4. The method of claim B2, further comprising, prior to receiving the respective appraised quantity of platform credit for the respective wearable fashion article via the appraisal-tool user interface:

using the respective set of article-characteristic data to identify one or more listings in the online catalog of wearable fashion articles that are comparable to the respective wearable fashion article; and presenting the one or more identified comparable listings via the appraisal-tool user interface.

B5. The method of claim B4, wherein:

the respective set of article-characteristic data for the respective wearable fashion article comprises a respective article-type indication, a respective article-designer indication, and a respective article-condition indication; and using the respective set of article-characteristic data to identify the one or more comparable listings in the online catalog comprises using the respective article-type indication, the respective article-designer indication, and the respective article-condition indication to identify the one or more comparable listings in the online catalog.

B6. The method of claim B2, further comprising, prior to receiving the respective appraised quantity of platform credit for the respective wearable fashion article via the appraisal-tool user interface:

presenting one or more candidate appraisal-modification values via the appraisal-tool user interface.

B7. The method of claim B6, further comprising, prior to presenting the one or more candidate appraisal-modification values via the appraisal-tool user interface:

using the respective set of article-characteristic data to identify one or more of the candidate appraisal-modification values.

B8. The method of claim B7, wherein:

the respective set of article-characteristic data for the respective wearable fashion article comprises respective article-attribute data specifying one or more attributes of the respective wearable fashion article; and using the respective set of article-characteristic data to identify one or more of the candidate appraisal-modification values comprises using the respective article-attribute data to identify one or more of the candidate appraisal-modification values.

B9. The method of claim B8, wherein using the respective article-attribute data to identify one or more of the candidate appraisal-modification values comprises conducting a designer-dependent selection of one or more of the candidate appraisal-modification values.

B10. The method of claim B8, wherein the one or more attributes of the respective wearable fashion article comprise one or more of the attributes selected from the group consisting of an article color, an article detail, an article material, an article print, an article season, and an article silhouette.

B11. The method of claim B7, wherein:

the respective set of article-characteristic data for the respective wearable fashion article comprises a respective free-text narrative pertaining to the respective wearable fashion article; and using the respective set of article-characteristic data to identify one or more of the candidate appraisal-modification values comprises:

parsing the respective free-text narrative to identify one or more attributes of the respective wearable fashion article; and using the one or more identified attributes to identify one or more of the candidate appraisal-modification values.

B12. The method of claim B11, wherein the one or more attributes of the respective wearable fashion article comprise one or more of the attributes selected from the group consisting of an article color, an article detail, an article material, an article print, an article season, and an article silhouette.

B13. The method of claim B11, wherein:

the respective set of article-characteristic data for the respective wearable fashion article further comprises a respective article-type indication; and parsing the respective free-text narrative to identify one or more attributes of the respective wearable fashion article comprises:

using the respective article-type indication to identify an article-type-specific set of attributes; and parsing the respective free-text narrative to identify one or more attributes of the respective wearable fashion article that are attributes in the identified article-type-specific set of attributes.

B14. The method of claim B11, wherein:

the respective set of article-characteristic data for the respective wearable fashion article further comprises a respective article-designer indication; and parsing the respective free-text narrative to identify one or more attributes of the respective wearable fashion article comprises:

using the respective article-designer indication to identify an article-designer specific set of attributes; and parsing the respective free-text narrative to identify one or more attributes of the respective wearable fashion article that are attributes in the identified article-designer-specific set of attributes.

B15. The method of claim B1, wherein using a respective set of article-characteristic data to determine a respective appraised quantity of platform credit for a respective wearable fashion article comprises:

using the respective set of article-characteristic data to identify a base appraisal amount of platform credit for the respective wearable fashion article;

selecting one or more appraisal-modification values for the respective wearable fashion article; and determining the respective appraised quantity of platform credit for the respective wearable fashion article to be the identified base appraisal amount of platform credit as modified by the one or more selected appraisal-modification values.

B16. The method of claim B15, wherein:

the respective set of article-characteristic data for the respective wearable fashion article comprises a respective article-type indication, a respective article-designer indication, and a respective article-condition indication; and using the respective set of article-characteristic data to identify the base appraisal amount of platform credit for the respective wearable fashion article comprises using the respective article-type indication, the respective article-designer indication, and the respective article-condition indication to identify the base appraisal amount of platform credit for the respective wearable fashion article.

B17. The method of claim B16, wherein using the respective article-type indication, the respective article-designer indication, and the respective article-condition indication to identify the base appraisal amount of platform credit for the respective wearable fashion article comprises retrieving and averaging a set of previously determined appraisal amounts having matching respective article-type indications, respective article-designer indications, and respective article-condition indications.

B18. The method of claim B16, wherein:

the respective set of article-characteristic data for the respective wearable fashion article further comprises a respective article-subtype indication; and using the respective set of article-characteristic data to identify the base appraisal amount of platform credit for the respective wearable fashion article further comprises using the respective article-subtype indication to identify the base appraisal amount of platform credit for the respective wearable fashion article.

B19. The method of claim B15, wherein selecting the one or more appraisal-modification values for the respective wearable fashion article comprises receiving appraisal-modification-selection user input via an appraisal-tool user interface, the appraisal-modification-selection user input specifying the one or more selected appraisal-modification values.

B20. The method of claim B19, further comprising:

identifying one or more candidate appraisal-modification values for the respective wearable fashion article; and presenting the one or more identified candidate appraisal-modification values via the appraisal-tool user interface, wherein the appraisal-modification-selection user input specifies the one or more selected appraisal-modification values from among the one or more presented candidate appraisal-modification values.

B21. The method of claim B20, wherein:

the respective set of article-characteristic data for the respective wearable fashion article comprises respective article-attribute data specifying one or more attributes of the respective wearable fashion article; and identifying the one or more candidate appraisal-modification values for the respective wearable fashion article comprises identifying one or more of the candidate appraisal-modification values for the respective wearable fashion article based at least in part on the respective article-attribute data.

B22. The method of claim B21, wherein the one or more attributes of the respective wearable fashion article comprises one or more of the attributes selected from the group consisting of an article color, an article detail, an article material, an article print, an article season, and an article silhouette.

B23. The method of claim B20, wherein:

the respective set of article-characteristic data for the respective wearable fashion article comprises a respective free-text narrative pertaining to the respective wearable fashion article; and identifying the one or more candidate appraisal-modification values for the respective wearable fashion article comprises:

parsing the respective free-text narrative to identify one or more attributes of the respective wearable fashion article; and using the one or more identified attributes to identify one or more of the candidate appraisal-modification values.

B24. The method of claim B23, wherein the one or more attributes of the respective wearable fashion article comprises one or more of the attributes selected from the group consisting of an article color, an article detail, an article material, an article print, an article season, and an article silhouette.

B25. The method of claim B23, wherein:
the respective set of article-characteristic data for the respective wearable fashion article further comprises a respective article-type indication; and
parsing the respective free-text narrative to identify one or more attributes of the respective wearable fashion article comprises:
 using the respective article-type indication to identify an article-type-specific set of attributes; and
 parsing the respective free-text narrative to identify one or more attributes of the respective wearable fashion article that are attributes in the identified article-type-specific set of attributes.

B26. The method of claim B23, wherein:
the respective set of article-characteristic data for the respective wearable fashion article further comprises a respective article-designer indication; and
parsing the respective free-text narrative to identify one or more attributes of the respective wearable fashion article comprises:
 using the respective article-designer indication to identify an article-designer-specific set of attributes; and
 parsing the respective free-text narrative to identify one or more attributes of the respective wearable fashion article that are attributes in the identified article-designer-specific set of attributes.

B27. The method of claim B15, further comprising:
identifying one or more attributes of the respective wearable fashion article,
wherein selecting the one or more appraisal-modification values for the respective wearable fashion article comprises selecting one or more of the appraisal-modification values for the respective wearable fashion article based at least in part on the one or more identified attributes of the respective wearable fashion article.

B28. The method of claim B27, wherein the one or more identified attributes of the respective wearable fashion article comprises one or more of the attributes selected from the group consisting of an article color, an article detail, an article material, an article print, an article season, and an article silhouette.

B29. The method of claim B27, wherein:
the respective set of article-characteristic data for the respective wearable fashion article comprises respective article-attribute data specifying one or more attributes of the respective wearable fashion article; and
identifying the one or more attributes of the respective wearable fashion article comprises identifying the one or more attributes of the respective wearable fashion article based at least in part on the respective article-attribute data.

B30. The method of claim B27, wherein:
the respective set of article-characteristic data for the respective wearable fashion article comprises a respective free-text narrative pertaining to the respective wearable fashion article; and
identifying the one or more attributes of the respective wearable fashion article comprises identifying the one or more attributes of the respective wearable fashion article at least in part by parsing the respective free-text narrative.

B31. The method of claim B30, wherein:
the respective set of article-characteristic data for the respective wearable fashion article further comprises a respective article-type indication; and
parsing the respective free-text narrative to identify one or more attributes of the respective wearable fashion article comprises:
 using the respective article-type indication to identify an article-type-specific set of attributes; and
 parsing the respective free-text narrative to identify one or more attributes of the respective wearable fashion article that are attributes in the identified article-type-specific set of attributes.

B32. The method of claim B30, wherein:
the respective set of article-characteristic data for the respective wearable fashion article further comprises a respective article-designer indication; and
parsing the respective free-text narrative to identify one or more attributes of the respective wearable fashion article comprises:
 using the respective article-designer indication to identify an article-designer-specific set of attributes; and
 parsing the respective free-text narrative to identify one or more attributes of the respective wearable fashion article that are attributes in the identified article-designer-specific set of attributes.

B33. The method of claim B1, further comprising:
presenting, via an appraisal-tool user interface, a scrollable set of listings in the online catalog of wearable fashion articles that are comparable to the respective wearable fashion article set of comparable listings.

B34. The method of claim B33, further comprising:
presenting, via the appraisal-tool user interface, an appraised-credits field that is dynamically codependent with the scrollable set of comparable listings.

B35. The method of claim B34, further comprising:
receiving, via the appraisal-tool user interface, a scrolling command, and responsively (i) scrolling the scrollable set of comparable listings and (ii) updating the appraised-credits field to remain coordinated with the scrolling of the scrollable set of comparable listings.

B36. The method of claim B34, further comprising:
receiving, via the appraisal-tool user interface, an update to the appraised-credits field, and responsively scrolling the scrollable set of comparable listings to remain coordinated with the updated appraised-credits field.

B37. The method of claim B1, wherein using a respective set of article-characteristic data to determine a respective appraised quantity of platform credit for a respective wearable fashion article comprises:
determining that the associated fashion-article-listing request is a fashion-article-relisting request, and responsively applying a depreciation schedule to a previous appraisal amount from a previous appraisal of the respective wearable fashion article to determine the respective appraised quantity of platform credit for the respective wearable fashion article.

B38. The method of claim B37, wherein determining that the associated fashion-article-listing request is a fashion-article-relisting request comprises:
presenting posting-history data associated with the respective user account via an appraisal-tool user interface; and
receiving a relisting input via the appraisal-tool user interface, and responsively determining that the associated fashion-article-listing request is a fashion-article-relisting request.

B39. The method of claim B37, wherein applying the depreciation schedule to the previous appraisal amount comprises:

identifying one or more percentage-based multipliers based on the depreciation schedule; and applying the one or more identified percentage-based multipliers to the previous appraisal amount.

B40. The method of claim B37, wherein the depreciation schedule is based on a set of one or more depreciation factors.

B41. The method of claim B40, wherein the set of depreciation factors includes an elapsed time since the respective wearable fashion article was most recently acquired from the online catalog.

B42. The method of claim B41, wherein the set of depreciation factors further includes a comparison of a current condition of the respective wearable fashion article with a previous condition of the respective wearable fashion article.

B43. The method of claim B42, wherein the previous condition of the respective wearable fashion article is a condition of the respective wearable fashion article at a time of the previous appraisal.

B44. The method of claim B42, wherein the previous condition of the respective wearable fashion article is a condition of the respective wearable fashion article at a time that the respective wearable fashion article was most recently acquired from the online catalog.

B45. The method of claim B40, wherein the set of depreciation factors includes a comparison of a current condition of the respective wearable fashion article with a previous condition of the respective wearable fashion article.

B46. The method of claim B45, wherein the previous condition of the respective wearable fashion article is a condition of the respective wearable fashion article at a time of the previous appraisal.

B47. The method of claim B45, wherein the previous condition of the respective wearable fashion article is a condition of the respective wearable fashion article at a time that the respective wearable fashion article was most recently acquired from the online catalog.

B48. The method of claim B45, wherein the comparison is a time-lapse-dependent comparison.

B49. The method of claim B45, wherein the comparison is a designer-dependent comparison.

B50. The method of claim B45, wherein the comparison is one or more of a time-lapse-dependent comparison, a designer-dependent comparison, and an item-type-dependent comparison.

B51. The method of claim B40, wherein the set of depreciation factors includes one or more of an elapsed time, a condition change, an item type of the respective wearable fashion article, and a designer of the respective wearable fashion article.

B52. An e-commerce platform comprising:

a communication interface;

a processor; and data storage containing instructions executable by the processor for causing the e-commerce platform to carry out a set of functions, the set of functions comprising:

receiving fashion-article-listing requests that are each associated with a respective user account and that each comprise a respective set of article-characteristic data that corresponds to a respective wearable fashion article, wherein each respective user account has a respective platform-credit balance;

using the respective sets of article-characteristic data to determine respective appraised quantities of platform credit for the respective corresponding wearable fashion articles;

transmitting fashion-article-listing replies corresponding respectively to the received fashion-article-listing requests, wherein each transmitted fashion-article-listing reply offers the respective determined appraised quantity of platform credit in exchange for listing the corresponding wearable fashion article in a browseable and searchable online catalog; and receiving fashion-article-listing acceptances corresponding to at least some of the transmitted fashion-article-listing replies and, for each received fashion-article-listing acceptance, responsively listing the corresponding fashion article in the online catalog as being acquirable for the corresponding appraised quantity of platform credit.

Additional Example Claims for "Systems and Methods of Integrating an E-Commerce Platform with Point-of-Sale Technology"

C1. A method carried out by an e-commerce platform executing stored program instructions, the method comprising:

receiving fashion-article-registration messages, wherein each received fashion-article-registration message comprises (i) a respective article identifier that corresponds to a respective wearable fashion article and (ii) a respective set of article-characteristic data that also corresponds to the respective wearable fashion article;

using the respective sets of article-characteristic data to determine respective appraised quantities of platform credit for the corresponding fashion articles;

storing the respective appraised quantities of platform credit in association with the respective article identifiers; and receiving consumer-query messages from respective consumer devices, wherein the respective consumer-query messages comprise respective article identifiers, and responsively:

using the respective article identifiers from the respective consumer-query messages to retrieve the respective stored appraised quantities of platform credit for the corresponding fashion articles; and transmitting respective consumer-reply messages to the respective consumer devices, wherein the respective consumer-reply messages comprise the respective retrieved appraised quantities of platform credit for the corresponding fashion articles.

C2. The method of claim C1, wherein receiving the fashion-article-registration messages comprises receiving the fashion-article-registration messages from respective merchant systems.

C3. The method of claim C1, wherein one or more of the respective article identifiers are respective bar codes.

C4. The method of claim C1, wherein one or more of the respective article identifiers are respective Quick Response (QR) codes.

C5. The method of claim C1, wherein one or more of the respective article identifiers are respective Universal Product Codes (UPCs).

C6. The method of claim C1, wherein one or more of the respective sets of article-characteristic data comprise one or more of an article-type indication, an article-subtype indication, an article-designer indication, an article-condition indication, an article-size indication, an article-season indication, an article-color indication, an article-material indication, and an article-made-in-location indication.

C7. The method of claim C1, wherein at least one of the respective consumer devices is a device selected from the group consisting of a cell phone, a smart phone, and a tablet.

C8. The method of claim C1, wherein at least one of the respective consumer devices is a merchant-provided consumer device.

C9. The method of claim C8, wherein at least one of the merchant-provided consumer devices is a device selected from the group consisting of a kiosk, a bar-code scanner, a Quick-Response-(QR)-code scanner, a cell phone, a smart phone, and a tablet.

C10. The method of claim C1, further comprising receiving a consumer-article-acquisition message, wherein the received consumer-article-acquisition message comprises (i) a given user-account identifier associated with a given user account and (ii) a given article identifier associated with a given wearable fashion article for which a corresponding appraised quantity of platform credit has been determined and stored by the e-commerce platform, and responsively posting a listable article record associated with the given wearable fashion article to the given user account.

C11. The method of claim C10, wherein receiving the consumer-article-acquisition message comprises receiving the consumer-article-acquisition message from a merchant retail location.

C12. The method of claim C11, wherein the given wearable fashion article was presented at the merchant retail location in association with both a monetary price and with the determined corresponding appraised quantity of platform credit.

C13. The method of claim C12, wherein the given wearable fashion article was further presented at the merchant retail location in association with a post-purchase time period for which the determined corresponding appraised quantity of platform credit is awarded for listing the corresponding fashion article in an online catalog.

C14. The method of claim C13, wherein a corresponding depreciation schedule was further presented at the merchant retail location in association with the post-purchase time period.

C15. The method of claim C14, wherein the depreciation schedule was based on one or more of item type, designer, passage of time, and condition change.

C16. The method of claim C14, wherein the depreciation schedule presented multiple different depreciation values based on multiple different combinations of passage of time and condition change.

C17. The method of claim C10, wherein receiving the consumer-article-acquisition message comprises receiving the consumer-article-acquisition message from a merchant website.

C18. The method of claim C17, wherein the merchant website comprised a listing of the given wearable fashion article in association with both a monetary price and with the determined corresponding appraised quantity of platform credit.

C19. The method of claim C18, wherein the given wearable fashion article was further presented on the merchant website in association with a post-purchase time period for which the determined corresponding appraised quantity of platform credit is awarded for listing the corresponding fashion article in an online catalog.

C20. The method of claim C19, wherein a corresponding depreciation scheduled was further presented on the merchant website in association with the post-purchase time period.

C21. The method of claim C20, wherein the depreciation schedule was based on one or more of item type, designer, passage of time, and condition change.

C22. The method of claim C20, wherein the depreciation schedule presented multiple different depreciation values based on multiple different combinations of passage of time and condition change.

C23. The method of claim C10, further comprising receiving a list-article message associated with the listable article record, and responsively listing the given wearable fashion article in an online catalog as being acquirable for corresponding appraised quantity of platform credit.

C24. The method of claim C10, wherein receiving the consumer-article-acquisition message comprises receiving the consumer-article-acquisition message as a result of a particular form of payment being used to acquire the given wearable fashion article.

C25. The method of claim C24, wherein the particular form of payment involves a particular payment card.

C26. The method of claim C24, wherein the particular form of payment involves a particular payment-facilitation application.

C27. The method of claim C24, wherein the particular form of payment involves a particular payment-facilitation website.

C28. The method of claim C1, further comprising:
receiving fashion-article-listing requests that are each associated with a respective user account and that each comprise a respective set of article-characteristic data that corresponds to a respective wearable fashion article;
using the respective sets of article-characteristic data from the fashion-article-listing requests to determine respective appraised quantities of platform credit for the respective corresponding wearable fashion articles;
transmitting fashion-article-listing replies corresponding respectively to the received fashion-article-listing requests, wherein each transmitted fashion-article-listing reply offers the respective determined appraised quantity of platform credit in exchange for listing the corresponding wearable fashion article in a browseable and searchable online catalog; and
receiving fashion-article-listing acceptances corresponding to at least some of the transmitted fashion-article-listing replies and, for each received fashion-article-listing acceptance, responsively listing the corresponding fashion article in the online catalog as being acquirable for the corresponding appraised quantity of platform credit.

C29. The method of claim C28, wherein, with respect to substantially identical fashion articles, respective appraised quantities of platform credit resulting from received fashion-article-registration messages exceed respective appraised quantities of platform credit resulting from received fashion-article-listing requests.

C30. The method of claim C1, wherein the respective consumer-reply messages further comprise respective indications of post-purchase time periods for which the respective retrieved appraised quantities of platform credit are awarded for listing the corresponding fashion articles in an online catalog.

C31. The method of claim C1, wherein at least one of the respective consumer-reply messages comprises a depreciation schedule corresponding to listing the corresponding fashion article in an online catalog.

C32. The method of claim C31, wherein the depreciation schedule is based on one or more of item type, designer, passage of time, and condition change.

C33. The method of claim C31, wherein the depreciation schedule presents multiple different depreciation values based on multiple different combinations of passage of time and condition change.

C34. The method of claim C1, wherein the respective retrieved appraised quantity of platform credit for at least one fashion article corresponds according to a platform-credit-and-currency exchange rate with a predetermined percentage of a monetary retail price being charged for the corresponding fashion article.

C35. An e-commerce platform comprising:
a communication interface;
a processor; and
data storage containing instructions executable by the processor for causing the e-commerce platform to carry out a set of functions, the set of functions comprising:
 receiving fashion-article-registration messages, wherein each received fashion-article-registration message comprises (i) a respective article identifier that corresponds to a respective wearable fashion article and (ii) a respective set of article-characteristic data that also corresponds to the respective wearable fashion article;
 using the respective sets of article-characteristic data to determine respective appraised quantities of platform credit for the corresponding fashion articles;
 storing the respective appraised quantities of platform credit in association with the respective article identifiers; and
 receiving consumer-query messages from respective consumer devices, wherein the respective consumer-query messages comprise respective article identifiers, and responsively:
  using the respective article identifiers from the respective consumer-query messages to retrieve the respective stored appraised quantities of platform credit for the corresponding fashion articles; and
  transmitting respective consumer-reply messages to the respective consumer devices, wherein the respective consumer-reply messages comprise the respective retrieved appraised quantities of platform credit for the corresponding fashion articles.

What is claimed is:

1. A method carried out by an e-commerce platform executing stored program instructions, the method comprising:
 receiving fashion-article-registration messages, wherein each received fashion-article-registration message comprises (i) a respective article identifier that corresponds to a respective wearable fashion article and (ii) a respective set of article-characteristic data that also corresponds to the respective wearable fashion article;
 using the respective sets of article-characteristic data to determine respective appraised quantities of platform credit for the corresponding fashion articles;
 storing the respective appraised quantities of platform credit in association with the respective article identifiers; and
 receiving consumer-query messages from respective consumer devices, wherein the respective consumer-query messages comprise respective article identifiers, and responsively:
  using the respective article identifiers from the respective consumer-query messages to retrieve the respective stored appraised quantities of platform credit for the corresponding fashion articles; and
  transmitting respective consumer-reply messages to the respective consumer devices, wherein the respective consumer-reply messages comprise the respective retrieved appraised quantities of platform credit for the corresponding fashion articles.

2. The method of claim 1, wherein receiving the fashion-article-registration messages comprises receiving the fashion-article-registration messages from respective merchant systems.

3. The method of claim 1, wherein at least one of the respective consumer devices is a merchant-provided consumer device.

4. The method of claim 1, further comprising receiving a consumer-article-acquisition message, wherein the received consumer-article-acquisition message comprises (i) a given user-account identifier associated with a given user account and (ii) a given article identifier associated with a given wearable fashion article for which a corresponding appraised quantity of platform credit has been determined and stored by the e-commerce platform, and responsively posting a listable article record associated with the given wearable fashion article to the given user account.

5. The method of claim 4, wherein receiving the consumer-article-acquisition message comprises receiving the consumer-article-acquisition message from a merchant retail location.

6. The method of claim 5, wherein the given wearable fashion article was presented at the merchant retail location in association with both a monetary price and with the determined corresponding appraised quantity of platform credit.

7. The method of claim 6, wherein the given wearable fashion article was further presented at the merchant retail location in association with a post-purchase time period for which the determined corresponding appraised quantity of platform credit is awarded for listing the corresponding fashion article in an online catalog.

8. The method of claim 7, wherein a corresponding depreciation schedule was further presented at the merchant retail location in association with the post-purchase time period.

9. The method of claim 4, wherein receiving the consumer-article-acquisition message comprises receiving the consumer-article-acquisition message from a merchant website.

10. The method of claim 9, wherein the merchant website comprised a listing of the given wearable fashion article in association with both a monetary price and with the determined corresponding appraised quantity of platform credit.

11. The method of claim 10, wherein the given wearable fashion article was further presented on the merchant website in association with a post-purchase time period for which the determined corresponding appraised quantity of platform credit is awarded for listing the corresponding fashion article in an online catalog.

12. The method of claim 11, wherein a corresponding depreciation scheduled was further presented on the merchant website in association with the post-purchase time period.

13. The method of claim 4, further comprising receiving a list-article message associated with the listable article record, and responsively listing the given wearable fashion article in an online catalog as being acquirable for corresponding appraised quantity of platform credit.

14. The method of claim 4, wherein receiving the consumer-article-acquisition message comprises receiving the consumer-article-acquisition message as a result of a particular form of payment being used to acquire the given wearable fashion article.

15. The method of claim 1, further comprising:
receiving fashion-article-listing requests that are each associated with a respective user account and that each comprise a respective set of article-characteristic data that corresponds to a respective wearable fashion article;
using the respective sets of article-characteristic data from the fashion-article-listing requests to determine respective appraised quantities of platform credit for the respective corresponding wearable fashion articles;
transmitting fashion-article-listing replies corresponding respectively to the received fashion-article-listing requests, wherein each transmitted fashion-article-listing reply offers the respective determined appraised quantity of platform credit in exchange for listing the corresponding wearable fashion article in a browseable and searchable online catalog; and
receiving fashion-article-listing acceptances corresponding to at least some of the transmitted fashion-article-listing replies and, for each received fashion-article-listing acceptance, responsively listing the corresponding fashion article in the online catalog as being acquirable for the corresponding appraised quantity of platform credit.

16. The method of claim 15, wherein, with respect to substantially identical fashion articles, respective appraised quantities of platform credit resulting from received fashion-article-registration messages exceed respective appraised quantities of platform credit resulting from received fashion-article-listing requests.

17. The method of claim 1, wherein the respective consumer-reply messages further comprise respective indications of post-purchase time periods for which the respective retrieved appraised quantities of platform credit are awarded for listing the corresponding fashion articles in an online catalog.

18. The method of claim 1, wherein at least one of the respective consumer-reply messages comprises a depreciation schedule corresponding to listing the corresponding fashion article in an online catalog.

19. The method of claim 1, wherein the respective retrieved appraised quantity of platform credit for at least one fashion article corresponds according to a platform-credit-and-currency exchange rate with a predetermined percentage of a monetary retail price being charged for the corresponding fashion article.

20. An e-commerce platform comprising:
a communication interface;
a processor; and
data storage containing instructions executable by the processor for causing the e-commerce platform to carry out a set of functions, the set of functions comprising:
receiving fashion-article-registration messages, wherein each received fashion-article-registration message comprises (i) a respective article identifier that corresponds to a respective wearable fashion article and (ii) a respective set of article-characteristic data that also corresponds to the respective wearable fashion article;
using the respective sets of article-characteristic data to determine respective appraised quantities of platform credit for the corresponding fashion articles;
storing the respective appraised quantities of platform credit in association with the respective article identifiers; and
receiving consumer-query messages from respective consumer devices, wherein the respective consumer-query messages comprise respective article identifiers, and responsively:
using the respective article identifiers from the respective consumer-query messages to retrieve the respective stored appraised quantities of platform credit for the corresponding fashion articles; and
transmitting respective consumer-reply messages to the respective consumer devices, wherein the respective consumer-reply messages comprise the respective retrieved appraised quantities of platform credit for the corresponding fashion articles.

\* \* \* \* \*